United States Patent
Park

(10) Patent No.: US 9,934,918 B2
(45) Date of Patent: Apr. 3, 2018

(54) APPARATUS AND METHODS FOR REMOTE CONTROL OF INPUT DEVICES

(71) Applicant: Naran Inc., Paju-si (KR)

(72) Inventor: Taehyun Park, Paju-si (KR)

(73) Assignee: NARAN INC., Paju-si (KR)

(*) Notice: Subject to any disclaimer, the term of this patent is extended or adjusted under 35 U.S.C. 154(b) by 0 days.

(21) Appl. No.: 15/624,536

(22) Filed: Jun. 15, 2017

(65) Prior Publication Data

US 2017/0287658 A1 Oct. 5, 2017

Related U.S. Application Data

(63) Continuation of application No. PCT/IB2016/001654, filed on Oct. 31, 2016.

(60) Provisional application No. 62/249,084, filed on Oct. 30, 2015, provisional application No. 62/268,944, filed on Dec. 17, 2015.

(51) Int. Cl.
| | |
|---|---|
| *H01H 23/16* | (2006.01) |
| *H01H 23/24* | (2006.01) |
| *G08C 17/02* | (2006.01) |
| *D06F 39/00* | (2006.01) |
| *A47L 15/42* | (2006.01) |

(52) U.S. Cl.
CPC .......... *H01H 23/16* (2013.01); *G08C 17/02* (2013.01); *H01H 23/24* (2013.01); *A47L 15/4293* (2013.01); *D06F 39/005* (2013.01); *H01H 2221/05* (2013.01); *H01H 2231/032* (2013.01); *H01H 2300/032* (2013.01)

(58) Field of Classification Search
CPC .... H01H 23/16; H01H 23/24; H01H 2221/05; H01H 2231/032; H01H 2300/032; G08C 17/02; A47L 15/4293; D06F 39/005
See application file for complete search history.

(56) References Cited

U.S. PATENT DOCUMENTS

| | | | |
|---|---|---|---|
| 5,923,007 A | 7/1999 | Emmert | |
| 2003/0016136 A1* | 1/2003 | Harvey | H01H 9/167 340/686.1 |
| 2004/0005950 A1* | 1/2004 | Tetsuka | B62M 25/02 474/80 |
| 2005/0082150 A1 | 4/2005 | Gray | |
| 2005/0194243 A1 | 9/2005 | Prineppi | |

(Continued)

OTHER PUBLICATIONS

Naran Inc., International Search Report and Written Opinion, PCT/IB2016/001654, dated May 30, 2017, 11 pgs.

*Primary Examiner* — Mohamed Barakat
(74) *Attorney, Agent, or Firm* — Morgan, Lewis & Bockius LLP

(57) ABSTRACT

An apparatus includes communication circuit; an actuator electrically coupled with the communication circuit; and a switch engagement component mechanically coupled with the actuator. The apparatus is configured for mounting adjacent to a switch (e.g., a rocker switch, a toggle switch, a button switch, etc.). The communication circuit is configured to activate the actuator in response to one or more instructions received by the communication circuit. The actuator is configured to rotate the switch engagement component. Rotating the switch engagement component while the switch is in a first state places the switch in a second state that is distinct from the first state.

22 Claims, 42 Drawing Sheets

(56) References Cited

U.S. PATENT DOCUMENTS

| | | | |
|---|---|---|---|
| 2007/0017310 A1* | 1/2007 | Matsuzaki | F16H 59/105 |
| | | | 74/335 |
| 2007/0216318 A1* | 9/2007 | Altonen | G02B 6/0001 |
| | | | 315/209 R |
| 2008/0202909 A1 | 8/2008 | Agronin et al. | |
| 2012/0292174 A1* | 11/2012 | Mah | H01H 3/227 |
| | | | 200/573 |

* cited by examiner

| Device Identifier 612-1 | Name 614-1 | Type 616-1 | Location 618-1 |
| --- | --- | --- | --- |
| Device Identifier 612-2 | Name 614-2 | Type 616-2 | Location 618-2 |

| Rule Identifier 622-1 | # of Conditions 624-1 | Condition Pointer(s) 626-1 | # of Actions 628-1 | Action Pointer(s) 630-1 |
|---|---|---|---|---|
| Rule Identifier 622-2 | # of Conditions 624-2 | Condition Pointer(s) 626-2 | # of Actions 628-2 | Action Pointer(s) 630-2 |

| Condition Identifier 632-1 | Source Type 634-1 | Device Identifier 636-1 | Condition Type 638-1 | Parameter(s) 640-1 |
|---|---|---|---|---|
| Condition Identifier 632-2 | Source Type 634-1 | Device Identifier 636-2 | Condition Type 638-2 | Parameter(s) 640-2 |

| Action Identifier 642-1 | Actor Type 644-1 | Device Identifier 646-1 | Action Type 648-1 | Parameter(s) 650-1 |
|---|---|---|---|---|
| Action Identifier 642-2 | Actor Type 644-1 | Device Identifier 646-2 | Action Type 648-2 | Parameter(s) 650-2 |

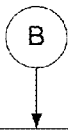

732 Store the automation rule that includes the selected candidate in the first set of one or more candidates in the condition phrase and the selected in the second set of one or more candidates in the action phrase 734 Execute an action defined in the action phrase of the automation rule in accordance with a determination that a condition defined in the condition phrase of the automation rule is satisfied 736 In response to detecting an error in the condition phrase and/or the action phrase in the automation rule, provide to the display device for display the stored automation rule. One or more portions of the stored automation rule that correspond to the detected error are visually distinguished.

738 The condition phrase of the automation rule identifies one or more sensors. Receive one or more inputs from the one or more sensors identified in the condition phrase of the automation rule.

740 The action phrase of the automation rule identifies one or more actuators. Conditionally activating the one or more actuators.

Figure 7C

APPARATUS AND METHODS FOR REMOTE CONTROL OF INPUT DEVICES

RELATED APPLICATIONS

This application is a continuation of International Patent Application Serial No. PCT/IB2016/001654, filed Oct. 31, 2016, which claims priority to, and benefit of, U.S. Provisional Patent Application Ser. No. 62/249,084, filed Oct. 30, 2015 and U.S. Provisional Patent Application Ser. No. 62/268,944, filed Dec. 17, 2015. All of these applications are incorporated by reference herein in their entireties.

TECHNICAL FIELD

This application relates generally to remotely controlled actuators, and more particularly, remotely controlled actuators that actuate switches.

BACKGROUND

Buttons and switches are widely used. Computers, electronics, appliances, machines, and vehicles have buttons and/or switches to allow human control of such devices.

There have been needs for remotely activating buttons or switches (e.g., a person in bed wanting to turn off the room light, the need for activating an emergency stop button located across a room, and the need for automatically activating a button). However, allowing remote control of buttons or switches conventionally requires replacing traditional mechanical buttons and/or switches with electronic buttons and/or switches with remote control capabilities. This often requires taking out already-installed mechanical buttons and/or switches and installing new electronic buttons and/or switches, which is cumbersome and tedious. Furthermore, the electronic buttons and/or switches need to be customized to replace the mechanical buttons and/or switches that they are to replace (e.g., the size and shape of the electronic buttons and/or switches need to match the size and shape of the mechanical buttons and/or switches). Thus, it is often challenging to find electronic buttons and switches that are compatible with, and can replace, existing mechanical buttons and switches.

SUMMARY

Accordingly, there is a need for devices and methods that can remotely actuate physical switches. Such devices and related methods optionally complement or replace conventional devices and methods for remotely actuating physical switches. Such devices and methods provide performance, versatility, and convenience that are not available from conventional devices and methods.

The above deficiencies and other problems associated with conventional devices and corresponding methods are reduced or eliminated by the disclosed devices and methods.

As described in more detail below, some embodiments involve an apparatus that includes communication circuit; and a first actuator and a second actuator, that is distinct from the first actuator, configured for mounting adjacent to a rocker switch or a toggle switch. The first actuator is configured for mounting at a first mounting position adjacent to the switch (e.g., the rocker switch or the toggle switch) and the second actuator is configured for mounting at a second mounting potion, distinct from the first mounting position, adjacent to the switch. The first actuator is configured to actuate the switch to place the switch in a first state. The second actuator is configured to actuate the switch to place the switch in a second state that is distinct from the first state. The communication circuit is configured to activate the first actuator or the second actuator in response to one or more instructions received by the communication circuit.

In some embodiments, the first actuator and the second actuator are configured to prevent concurrent activation of the first actuator and the second actuator.

In some embodiments, the first actuator is not configured to actuate the switch to place the switch in the second state; and the second actuator is not configured to actuate the switch to place the switch in the first state.

In some embodiments, the apparatus includes a first actuator device and a second actuator device that is distinct from the first actuator device. The first actuator device includes first communication circuit, the first actuator, and a first set of one or more processors. The second actuator device includes second communication circuit, the second actuator, and a second set of one or more processors.

In some embodiments, each of the first actuator device and the second actuator device includes a direct current motor.

In some embodiments, each of the first actuator device and the second actuator device includes a push pin and a gear assembly coupled with the respective actuator device and configured to move the push pin between a first pin position (e.g., a "down" position) and a second pin position (e.g., an "up" position) that is distinct from the first pin position. The push pin is configured to be in contact with the switch at the first pin position. The push pin is configured to cease contact with the switch at the second pin position.

In some embodiments, activating a particular actuator includes: moving the push pin of the particular actuator to the first pin position; and subsequent to moving the push pin to the first pin position, retracting the push pin to the second pin position.

In some embodiments, activating a particular actuator includes: moving the push pin of the particular actuator to the first pin position; and retracting the push pin of the other actuator to the second pin position.

In some embodiments, the push pin of the other actuator is retracted to the second pin position concurrently with moving the push pin of the particular actuator to the first pin position.

In some embodiments, the gear assembly has a gear ratio of at least 100.

In some embodiments, the apparatus includes determining whether the push pin of the respective actuator device is at the first pin position or the second pin position at least in part on monitoring a current provided to a direct current motor in the respective actuation device.

In some embodiments, each of the first actuator device and the second actuator device includes an input device for activating a respective actuator in the respective actuation device.

In some embodiments, the input device is a push button.

In some embodiments, the respective actuator device is further configured to activate the respective actuator in response to an input on the input device of the respective actuation device.

In some embodiments, the apparatus includes a third actuator device and a fourth actuation device. The third actuator device includes third communication circuit, a third actuator, and a third set of one or more processors. The fourth actuator device includes fourth communication circuit, a fourth actuator, and a fourth set of one or more processors. The third actuator is configured for mounting at a third mounting position, distinct from the first and second mounting positions, adjacent to the switch. The fourth actuator is configured for mounting at a fourth mounting potion, distinct from the first, second, and third mounting positions, adjacent to the switch. The third actuator is configured to actuate the switch, in conjunction with the first actuator, to place the switch in the first state (e.g., the "on" state). The fourth actuator is configured to actuate the switch, in conjunction with the second actuator, to place the switch in the second state (e.g., the "off" state).

In some embodiments, the first actuator and the second actuator are configured for removably mounting adjacent to the switch.

In some embodiments, the first actuator and the second actuator are configured for removably mounting adjacent to the switch with one or more adhesive tapes.

In some embodiments, the one or more adhesive tapes include a foam tape with an adhesive layer including acrylic.

In accordance with some embodiments, an apparatus includes communication circuit; an actuator configured for mounting adjacent to a rocker switch or a toggle switch and for actuating the switch (e.g., the rocker switch or the toggle switch); and one or more processors coupled with the communication circuit and the actuator. The one or more processors are configured to activate the actuator in response to one or more instructions received by the communication circuit.

Thus, an apparatus that includes both the first actuator and the second actuator is provided with more versatile and convenient methods for remotely controlling rocker switches and/or toggle switches, thereby increasing the effectiveness, efficiency, and user satisfaction with such devices. Such devices and corresponding methods may complement or replace conventional methods for remotely controlling rocker switches and/or toggle switches.

In accordance with some embodiments, an apparatus includes first communication circuit; and a first actuator coupled with the first communication circuit and configured for mounting adjacent to a rotary control knob. The first actuator is configured for mounting at a first mounting position adjacent to the rotary control knob; and the first actuator is configured to rotate the rotary control knob. The first communication circuit is configured to activate the first actuator in response to one or more instructions received by the first communication circuit.

In some embodiments, the first communication circuit is configured to: rotate the rotary control knob in a clockwise direction in response to a first signal from the first communication circuit; and rotate the rotary control knob in a counterclockwise direction in response to a second signal, distinct from the first signal, from the first communication circuit.

In some embodiments, the first actuator includes a direct current motor.

In some embodiments, the apparatus includes a rotary control knob cover that is configured for mounting on the rotary control knob. The rotary control knob cover has a cylindrical shape and the rotary control knob has a non-cylindrical shape.

In some embodiments, the rotary control knob cover includes a clamp for mounting on the rotary control knob.

In some embodiments, the rotary control knob cover includes: one or more fasteners configured for holding the rotary control knob; and one or more springs configured for pressing the one or more fasteners against the rotary control knob.

In some embodiments, the apparatus includes a first wheel that is coupled with the first actuator and remains in contact with the rotary control knob cover.

In some embodiments, the apparatus includes a first wheel that is coupled with the first actuator and remains in contact with the rotary control knob.

In some embodiments, the apparatus includes a gear assembly coupled with the first actuator and the first wheel and configured to rotate the first wheel.

In some embodiments, the gear assembly has a gear ratio of at least 100.

In some embodiments, the apparatus includes a second actuator configured for mounting adjacent to a rotary control knob. The second actuator is configured for mounting at a second mounting position, that is distinct from the first mounting position, adjacent to the rotary control knob. The second actuator is configured to rotate the rotary control knob.

In some embodiments, the first actuator and the second actuator are configured to concurrently rotate the rotary control knob.

In some embodiments, the apparatus includes a first actuator device and a second actuation device. The first actuator device includes the first communication circuit, the first actuator, and a first set of one or more processors. The second actuator device includes second communication circuit, the second actuator, and a second set of one or more processors.

In some embodiments, the apparatus includes a second wheel that is coupled with the second actuator.

In some embodiments, the first actuator and the second actuator are configured to prevent activation of only one of the first actuator and the second actuator.

In some embodiments, the apparatus includes a third actuator device. The third actuator device includes third communication circuit, a third actuator, and a third set of one or more processors. The third actuator is configured for mounting at a third mounting position, distinct from the first and second mounting positions, adjacent to the rotary control knob. The third actuator is configured to rotate the rotary control knob in conjunction with the first and second actuators.

In some embodiments, the apparatus includes an input device for activating the first actuator.

In some embodiments, the input device is a push button.

In some embodiments, the first actuator is further configured to activate in response to an input on the input device. In some embodiments, activating the first actuator includes rotating a wheel coupled with the first actuator for rotating the rotary control knob.

In some embodiments, the first actuator is configured for removably mounting adjacent to the rotary control knob.

In some embodiments, the first actuator is configured for removably mounting adjacent to the rotary control knob with one or more adhesive tapes.

In some embodiments, the one or more adhesive tapes include a foam tape with an adhesive layer including acrylic.

In some embodiments, the first actuator is mounted adjacent to a rocker switch or a toggle switch. The first actuator is configured to actuate the switch to place the switch in a first state when the first actuator is in a first position. The first actuator is configured to actuate the switch to place the switch in a second state that is distinct from the first state when the first actuator is in a second position that is distinct from the first position.

In some embodiments, a rotational axis of the first actuator is substantially parallel to a rotational axis of the switch.

Thus, an apparatus that includes an actuator are provided with more versatile and convenient methods for remotely controlling a rotary control knob, thereby increasing the effectiveness, efficiency, and user satisfaction with such devices. Such devices and corresponding methods may complement or replace conventional methods for remotely controlling rotary control knobs.

In addition, composing an automation rule for controlling actuators, such as the above-described apparatuses with the first actuator and the second actuator, can be cumbersome, inefficient, and technically challenging for users who do not have programming background. For example, learning how to program an automation system is tedious and creates a significant cognitive burden on a user. In addition, conventional methods take longer than necessary, thereby wasting time and energy. This latter consideration is particularly important in battery-operated devices.

Accordingly, there is a need for electronic devices with faster, more efficient methods and interfaces for composing automation rules. Such methods and interfaces optionally complement or replace conventional methods for composing automation rules. Such methods and interfaces reduce the cognitive burden on a user and produce a more efficient human-machine interface. For battery-operated devices, such methods and interfaces conserve power and increase the time between battery charges.

These deficiencies and other problems associated with conventional devices and corresponding methods are reduced or eliminated by the disclosed devices and methods.

As described in more detail below, some embodiments involve a method performed at an electronic device with one or more processors and memory and coupled with a display device. The method includes providing to the display device a user interface for composing an automation rule. The automation rule is configured to include a condition phrase and an action phrase. The method also includes, while providing the user interface, receiving a first input for the condition phrase; providing to the display device for display in the user interface a first set of one or more candidates, for the condition phrase, that correspond to the first input; receiving a selection of a candidate in the first set of one or more candidates; providing to the display device for display in the user interface the selected candidate in the first set of one or more candidates; receiving a second input for the action phrase; providing to the display device for display in the user interface a second set of one or more candidates, for the action phrase, that correspond to the second input; receiving a selection of a candidate in the second set of one or more candidates; and providing to the display device for display in the user interface the selected candidate in the second set of one or more candidates. The method further includes storing the automation rule that includes the selected candidate in the first set of one or more candidates in the condition phrase and the selected in the second set of one or more candidates in the action phrase.

In accordance with some embodiments, an electronic device includes one or more programs and memory storing one or more programs for execution by the one or more processors. The one or more programs include instructions for providing to a display device a user interface for composing an automation rule. The automation rule is configured to include a condition phrase and an action phrase. The one or more programs also include instructions for, while providing the user interface, receiving a first input for the condition phrase; providing to the display device for display in the user interface a first set of one or more candidates, for the condition phrase, that correspond to the first input; receiving a selection of a candidate in the first set of one or more candidates; providing to the display device for display in the user interface the selected candidate in the first set of one or more candidates; receiving a second input for the action phrase; providing to the display device for display in the user interface a second set of one or more candidates, for the action phrase, that correspond to the second input; receiving a selection of a candidate in the second set of one or more candidates; and providing to the display device for display in the user interface the selected candidate in the second set of one or more candidates. The one or more programs further include instructions for storing the automation rule that includes the selected candidate in the first set of one or more candidates in the condition phrase and the selected in the second set of one or more candidates in the action phrase.

In accordance with some embodiments, a computer-readable storage medium (e.g., a transitory or non-transitory computer-readable storage medium) stores one or more programs. The one or more programs include instructions, which, when executed by one or more processors of an electronic device, cause the electronic device to provide to a display device a user interface for composing an automation rule. The automation rule is configured to include a condition phrase and an action phrase. The instructions, when executed by the one or more processors, also cause the electronic device to, while providing the user interface, receive a first input for the condition phrase; provide to the display device for display in the user interface a first set of one or more candidates, for the condition phrase, that correspond to the first input; receive a selection of a candidate in the first set of one or more candidates; provide to the display device for display in the user interface the selected candidate in the first set of one or more candidates; receive a second input for the action phrase; provide to the display device for display in the user interface a second set of one or more candidates, for the action phrase, that correspond to the second input; receive a selection of a candidate in the second set of one or more candidates; and provide to the display device for display in the user interface the selected candidate in the second set of one or more candidates. The instructions, when executed by the one or more processors, further cause the electronic device to store the automation rule that includes the selected candidate in the first set of one or more candidates in the condition phrase and the selected in the second set of one or more candidates in the action phrase.

In accordance with some embodiments, an electronic device includes an input device; and means for providing to a display device a user interface for composing an automation rule. The automation rule is configured to include a condition phrase and an action phrase. The electronic device also includes means enabled, while providing the user interface, including means for receiving a first input for the condition phrase; means for providing to the display device for display in the user interface a first set of one or more candidates, for the condition phrase, that correspond to the first input; means for receiving a selection of a candidate in the first set of one or more candidates; means for providing to the display device for display in the user interface the selected candidate in the first set of one or more candidates; means for receiving a second input for the action phrase; means for providing to the display device for display in the user interface a second set of one or more candidates, for the action phrase, that correspond to the second input; means for receiving a selection of a candidate in the second set of one or more candidates; and means for providing to the display device for display in the user interface the selected candidate in the second set of one or more candidates. The electronic device further includes means for storing the automation rule that includes the selected candidate in the first set of one or more candidates in the condition phrase and the selected in the second set of one or more candidates in the action phrase.

In accordance with some embodiments, an information processing apparatus for use in an electronic device with an input device includes means for providing to a display device a user interface for composing an automation rule. The automation rule is configured to include a condition phrase and an action phrase. The information processing apparatus also includes means enabled, while providing the user interface, including means for receiving a first input for the condition phrase; means for providing to the display device for display in the user interface a first set of one or more candidates, for the condition phrase, that correspond to the first input; means for receiving a selection of a candidate in the first set of one or more candidates; means for providing to the display device for display in the user interface the selected candidate in the first set of one or more candidates; means for receiving a second input for the action phrase; means for providing to the display device for display in the user interface a second set of one or more candidates, for the action phrase, that correspond to the second input; means for receiving a selection of a candidate in the second set of one or more candidates; and means for providing to the display device for display in the user interface the selected candidate in the second set of one or more candidates. The information processing apparatus further includes means for storing the automation rule that includes the selected candidate in the first set of one or more candidates in the condition phrase and the selected in the second set of one or more candidates in the action phrase.

In accordance with some embodiments, an electronic device comprising an input receiving unit configured to receive user selections and a processing unit coupled with a display device and the input unit, the processing unit configured to provide to the display device a user interface for composing an automation rule. The automation rule is configured to include a condition phrase and an action phrase. The processing unit is also configured to, while providing the user interface, receive a first input for the condition phrase; provide to the display device for display in the user interface a first set of one or more candidates, for the condition phrase, that correspond to the first input; receive a selection of a candidate in the first set of one or more candidates; provide to the display device for display in the user interface the selected candidate in the first set of one or more candidates; receive a second input for the action phrase; provide to the display device for display in the user interface a second set of one or more candidates, for the action phrase, that correspond to the second input; receive a selection of a candidate in the second set of one or more candidates; and provide to the display device for display in the user interface the selected candidate in the second set of one or more candidates. The processing unit is further configured to store the automation rule that includes the selected candidate in the first set of one or more candidates in the condition phrase and the selected in the second set of one or more candidates in the action phrase.

Thus, electronic devices are provided with faster, more efficient methods and interfaces for composing automation rules, thereby increasing the effectiveness, efficiency, and user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 6A is a block diagram illustrating an exemplary structure of device data in accordance with some embodiments.

FIG. 6B is a block diagram illustrating an exemplary structure of rule data in accordance with some embodiments.

FIG. 6C is a block diagram illustrating an exemplary structure of condition data in accordance with some embodiments.

FIG. 6D is a block diagram illustrating an exemplary structure of action data in accordance with some embodiments.

FIGS. 7A-7C are flowcharts representing a method of preparing an automation rule in accordance with some embodiments.

DESCRIPTION OF EMBODIMENTS

Figure 1A:
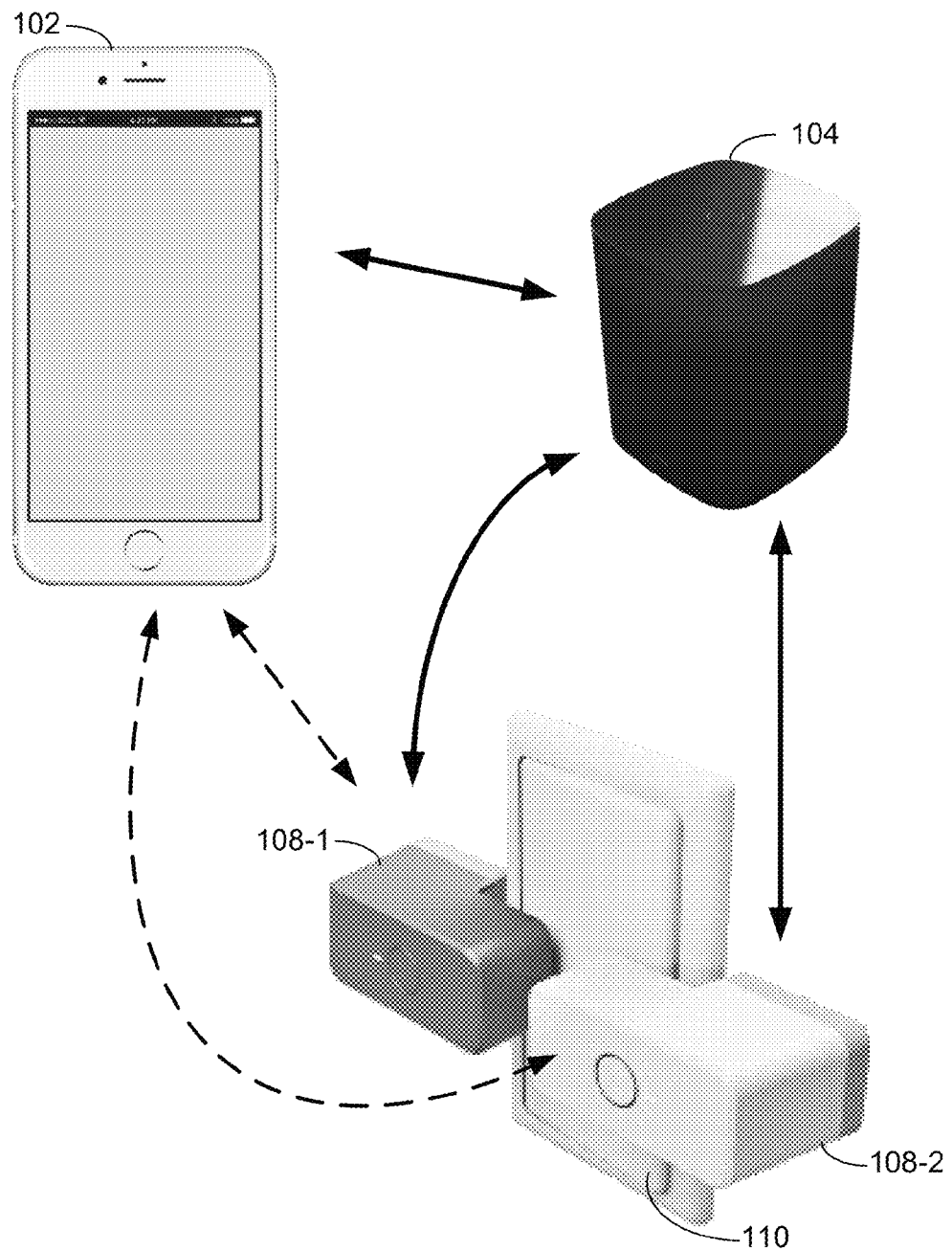
FIG. 1A illustrates an exemplary distributed computer system in accordance with some embodiments.

There have been needs for remotely activating buttons or switches (e.g., a person in bed wanting to turn off the room light, the need for activating an emergency stop button located across a room, and the need for automatically activating a button). However, allowing a remote control of buttons or switches conventionally requires replacing traditional mechanical buttons and/or switches with electronic buttons and/or switches with remote control capabilities. This often requires taking out already-installed mechanical buttons and/or switches and installing new electronic buttons and/or switches, which is cumbersome and tedious. Furthermore, the electronic buttons and/or switches need to be customized to replace the mechanical buttons and/or switches that they are to replace (e.g., the size and shape of the electronic buttons and/or switches need to be match the size and shape of the mechanical buttons and/or switches). Thus, it is often challenging to find electronic buttons and switches that are compatible with, and can replace, existing mechanical buttons and switches. In the embodiments described below, an improved method for remotely actuating a rocker switch is achieved by mounting a pair of actuators on the rocker switch. A first actuator is configured to actuate the rocker switch to place the rocker switch in an on state, and a second actuator is configured to actuate the rocker switch to place the rocker switch in an off state. This method streamlines making the existing mechanical switch (e.g., the rocker switch) remote-controllable, thereby eliminating the needs for extra, separate steps of removing the already-installed mechanical switch and having to install a new electronic switch. Oftentimes, the actuators can be simply attached by double-sided tapes, thereby enabling a fast installation of the actuators on the rocker switch.

Reference will be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these particular details. In other instances, methods, procedures, components, circuits, and networks that are well-known to those of ordinary skill in the art are not described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first actuator could be termed a second actuator, and, similarly, a second actuator could be termed a first actuator, without departing from the scope of the various described embodiments. The first actuator and the second actuator are both actuators, but they are not the same actuator.

The terminology used in the description of the embodiments herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

FIG. 1A illustrates an exemplary distributed computer system in accordance with some embodiments. In FIG. 1A, client device 102 (e.g., a mobile phone) is used to control one or more actuators (e.g., actuator 108-1 and actuator 108-2 mounted adjacent to rocker switch 110). As shown in FIG. 1A, in some embodiments, instructions from client device 102 is sent to server 104, which subsequently sends instructions to actuator 108-1 and/or actuator 108-2 to activate one or both of actuator 108-1 and actuator 108-2. Alternatively, in some other embodiments, instructions from client device 102 are sent directly to actuator 108-1 and/or actuator 108-2 to activate one or both of actuator 108-1 and actuator 108-2. In some embodiments, actuators different from actuators 108-1 and 108-2 (e.g., actuators 908-1 and 908-2 configured for actuating a rotary control knob, as described below with respect to FIGS. 9A-9H) are used instead of, or in addition to, actuators 108-1 and 108-2.

Figure 1B:
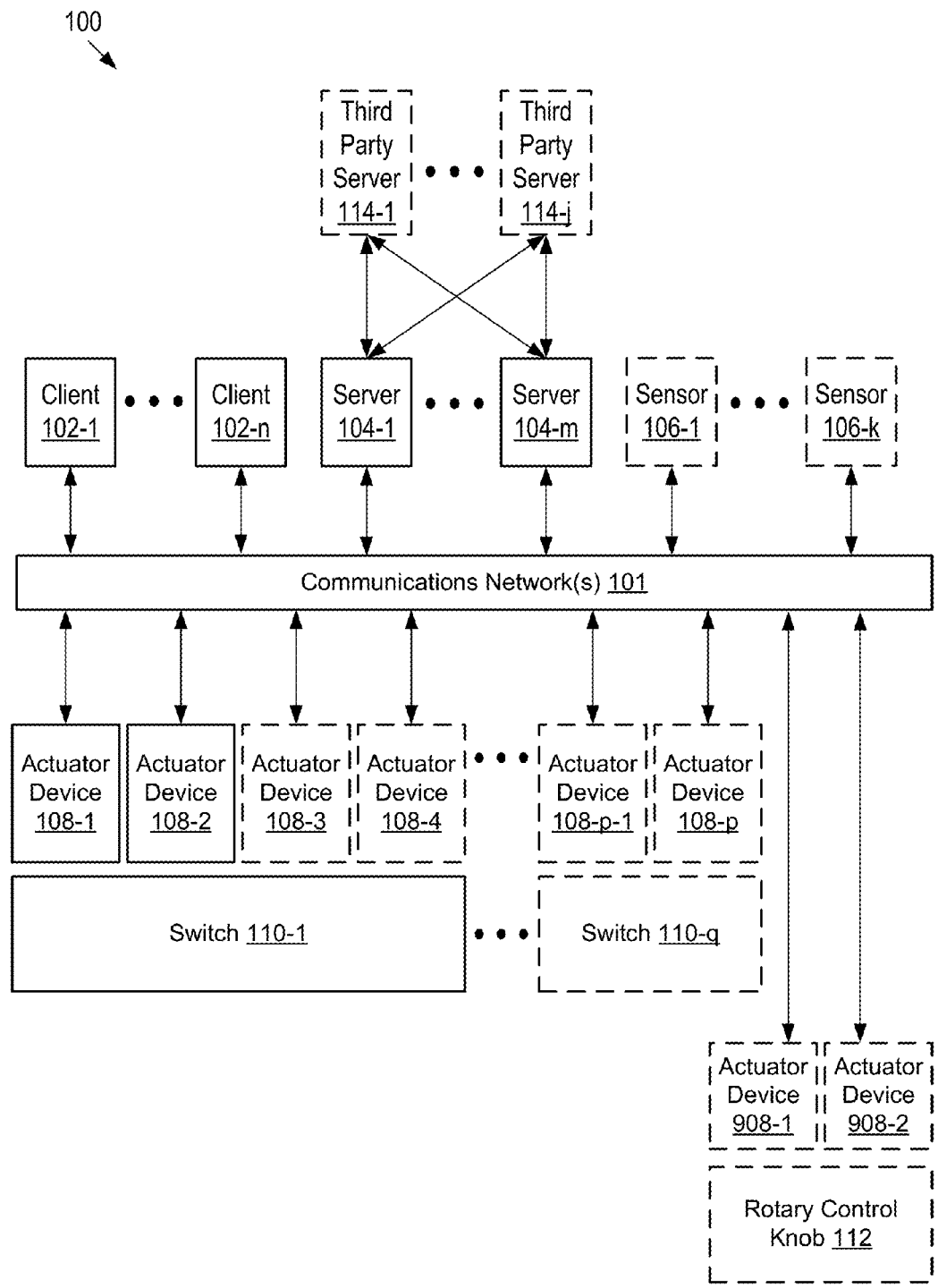
FIG. 1B is a block diagram illustrating an exemplary distributed computer system in accordance with some embodiments.

FIG. 1B is a block diagram illustrating exemplary distributed computer system 100 in accordance with some embodiments.

In FIG. 1B, distributed computing system 100 includes one or more client computers 102 (e.g., 102-1 through 102-n), one or more server systems 104 (e.g., 104-1 through 104-m), one or more sensors (e.g., 106-1 through 106-k), communications network 101, and a plurality of actuator devices 108 (e.g., 108-1 through 108-p and/or 908-1 and 908-2).

Client computers 102 can be any of a number of computing devices (e.g., Internet kiosk, personal digital assistant, cell phone, smart phone, gaming device, desktop computer, laptop computer, handheld computer, or combinations thereof) used to enable the activities described below. Client computer(s) 102 is also referred to herein as client(s). Client 102 typically includes a graphical user interface (GUI). In some embodiments, client 102 is connected to one or more servers 104 and/or actuator devices 108 via communications network 101. As described in more detail below, the graphical user interface is used to display information from servers 104 and/or actuator devices 108.

In some embodiments, distributed computing system 100 includes one or more server systems (also called server computers or servers) 104 connected to communications network 101. One or more server systems 104 receive inputs from clients 102, send instructions to actuator device 108 (and a plurality of similar devices), and/or store automation rules. In some embodiments, one or more server systems 104 are configured to communicate with one or more third party servers 114 (e.g., 114-1 through 114-j). In some embodiments, one or more third party servers 114 include servers that provide messaging services (e.g., emails, short-message services, instant messages, etc.), weather services (e.g., providing a current weather), map services (e.g., providing traffic information), and/or security services.

In some embodiments, distributed computing system 100 includes one or more sensors 106 (e.g., visible and/or infrared (IR) cameras, motion sensors, light sensors, door sensors, window sensors, water sensors, leak sensors, thermostats, smoke detectors, carbon monoxide detectors, glass break sensors, and/or energy meters, etc.).

In some embodiments, communications networks 101 are the Internet. In other embodiments, the communications networks 101 can be any local area network (LAN), wide area network (WAN), metropolitan area network, or a combination of such networks. In some embodiments, communications networks 101 include a wired network and/or a wireless network (e.g., Wi-Fi, Bluetooth, ZigBee, etc.).

Actuator devices 108 and 908 include actuators to perform mechanical operations (e.g., moving or controlling a mechanical component). In some embodiments, as shown in FIG. 1B, multiple actuator devices 108 (e.g., 108-1 and 108-2, or 108-1 through 108-4) are mounted on, or adjacent to, switch 110-1 (e.g., a rocker switch or a toggle switch) to actuate switch 110-1. In some embodiments, one or more actuator devices 908 (e.g., 908-1 and 908-2) are mounted on, or adjacent to, rotary control knob 112 to rotate rotary control knob 112. As used herein, actuating a switch refers to either turning on or off the switch. Actuator devices 108 are described in detail below with respect to FIGS. 4A-4K. Actuator devices 908 are described in detail below with respect to FIGS. 9A-9H.

Figure 2:
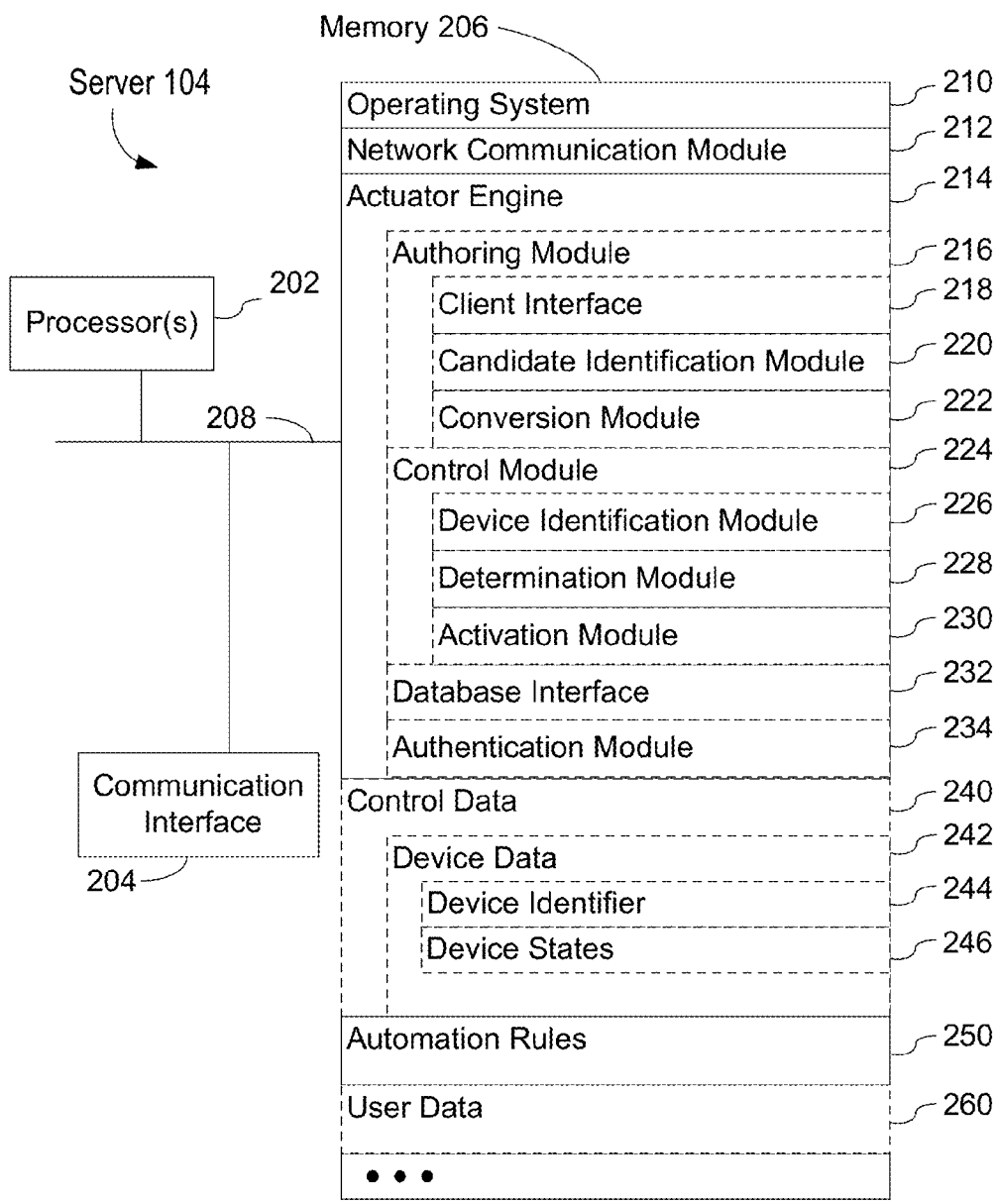
FIG. 2 is a block diagram illustrating a server system in accordance with some embodiments.

FIG. 2 is a block diagram illustrating server system 104 in accordance with some embodiments.

Server system 104 typically includes one or more processors 202 (e.g., microprocessors, central processing units (CPUs), accelerated processing units (APU), etc.), one or more network or other communications interfaces 204, memory 206, and one or more communication buses 208 for interconnecting these components. In some embodiments, one or more processors 202 and memory 206 are integrated (e.g., application-specific integrated circuit or field-programmable gate array). In some embodiments, the communication buses 208 include circuitry (sometimes called a chipset) that interconnects and controls communications between system components. In some other embodiments, server system 104 includes a user interface (e.g., a user interface having a display device, a keyboard, and a mouse or other pointing device), but more typically server system 104 is controlled from and accessed by various client systems.

Communication interfaces 204 include one or more circuits for wired and/or wireless communications. In some embodiments, communication interfaces 204 include radio frequency (RF) circuit. The RF circuit receives and sends RF signals, also called electromagnetic signals. The RF circuit converts electrical signals to/from electromagnetic signals and communicates with communications networks and other communications devices via the electromagnetic signals. The RF circuit optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuit optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Memory 206 of server system 104 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from processor(s) 202. Memory 206, or alternately the non-volatile memory device(s) within memory 206, comprises a computer readable storage medium. In some embodiments, memory 206, or the non-volatile memory device(s) within memory 206, comprises a non-transitory computer readable storage medium. In some embodiments, memory 206 or the computer readable storage medium of memory 206 stores the following programs, modules and data structures, or a subset thereof:

- Operating System 210 that includes procedures for handling various basic system services and for performing hardware dependent tasks;
- Network Communication Module (or instructions) 212 that is used for connecting server system 104 to other computers (e.g., clients 102) or devices (e.g., sensors 106 and/or actuator devices 108) via one or more network interfaces 204 and one or more communications networks 101 (FIG. 1), such as the Internet, other wide area networks, local area networks, metropolitan area networks, and so on;
- Actuator Engine 214 (also called herein an automation engine) that receives requests and/or user inputs from clients 102 and sends instructions to actuator devices 108; and
- Data, such as Control Data 240, Automation rules 250, and User Data 260, for the operation of actuator engine 214.

In some embodiments, actuator engine 214 includes the following programs, modules and data structures, or a subset or superset thereof:

- Authoring Module 216 for composing automation rules (which is described below with respect to FIGS. 5A-5O), certain aspects of authoring module 216 including client interface 218 for receiving user inputs from clients 102 and sending data for display in user interfaces of clients 102, candidate identification module 220 for identifying one or more candidate entries, and optionally, conversion module 222 for converting automation rules into machine-executable instructions;

Control Module 224 for controlling actuator devices 108 by sending instructions to actuator devices 108, certain aspects of control module 224 including device identification module 226 for identifying one or more actuator devices 108 to which the instructions will be sent, determination module 228 for determining states of one or more actuator devices 108, and activation module 230 for sending instructions to one or more actuator devices 108;

Database Interface 232 for storing data to, and retrieving data from, one or more databases (e.g., control data 240, automation rules 250, and/or user data 260); and optionally, Authentication Module 234 for authenticating clients 102 and/or their users to prevent activation of actuator devices 108 by unauthorized users.

In some embodiments, memory 206 includes the following data structures, or a subset or superset thereof:

Control Data 240 that stores device data 242, which includes device identifiers 244 and device states 246, for actuating one or more actuator devices 108 (e.g., by control module 224);

Automation rules 250, which identifies conditions and actions for actuating one or more actuator devices 108 (e.g., by control module 224); and User Data 260 that stores user identifiers and authentication information (e.g., user names, passwords, client identifiers, etc.) for authenticating clients 102 and/or their users (e.g., by authentication module 234).

Each of the above identified software systems, procedures, modules, and applications correspond to a set of instructions for performing one or more functions described above. These modules (i.e., sets of instructions) need not be implemented as separate software programs, procedures, or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

The actual number of servers used to implement distributed computing system 100 and how features are allocated among them will vary from one implementation to another, and may depend in part on the amount of data traffic that the system must handle during peak usage periods as well as during average usage periods, and may also depend on the amount of data stored by the distributed computing system. Moreover, one or more of the blocks in FIG. 2 may be implemented on one or more servers designed to provide the described functionality (e.g., authoring module 216 and control module 224 may be implemented on two separate servers).

Figure 3:
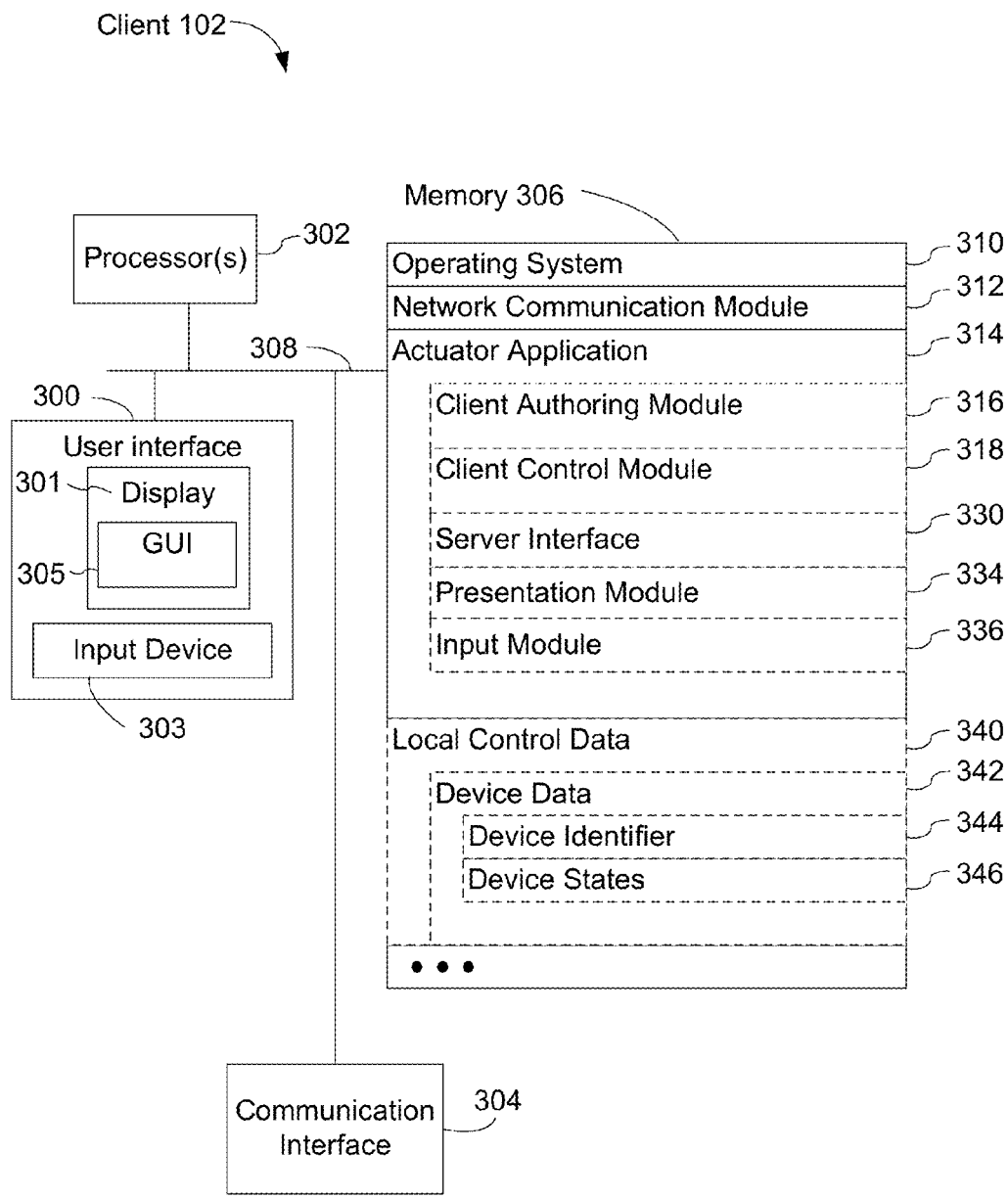
FIG. 3 is a block diagram illustrating a client in accordance with some embodiments.

FIG. 3 is a block diagram illustrating client 102 in accordance with some embodiments.

In some embodiments, client 102 is a desktop computer. In some embodiments, client 102 is portable (e.g., a notebook computer, tablet computer, or handheld device, such as a mobile phone).

Client 102 includes user interface 300, which typically includes display device 301 and one or more input devices 303, such as a keyboard, a mouse, a pointing device (e.g., a stylus), and/or a touch-sensitive surface. Client 102 includes graphical user interface 305, which is displayed on display device 301. In some embodiments, the touch-sensitive surface is integrated with display device 301 (in which case, the touch-sensitive surface and display device 301 are collectively called herein a touch-sensitive display). In some other embodiments, the touch-sensitive surface (e.g., a trackpad) is separate from display device 301.

Client 102 typically includes one or more processors 302 (e.g., microprocessors, central processing units (CPUs), accelerated processing units (APU), etc.), one or more network or other communications interfaces 304, memory 306, and one or more communication buses 308 for interconnecting these components. In some embodiments, one or more processors 302 and memory 306 are integrated (e.g., application-specific integrated circuit or field-programmable gate array). In some embodiments, the communication buses 308 include circuitry (sometimes called a chipset) that interconnects and controls communications between system components.

Communication interfaces 304 include one or more circuits for wired and/or wireless communications. In some embodiments, communication interfaces 304 include radio frequency (RF) circuit. The RF circuit receives and sends RF signals, also called electromagnetic signals. The RF circuit converts electrical signals to/from electromagnetic signals and communicates with communications networks and other communications devices via the electromagnetic signals. The RF circuit optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuit optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Memory 306 of server system 104 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from processor(s)

302. Memory 306, or alternately the non-volatile memory device(s) within memory 306, comprises a computer readable storage medium. In some embodiments, memory 306, or the non-volatile memory device(s) within memory 306, comprises a non-transitory computer readable storage medium. In some embodiments, memory 306 or the computer readable storage medium of memory 306 stores the following programs, modules and data structures, or a subset thereof:

- Operating System 310 that includes procedures for handling various basic system services and for performing hardware dependent tasks;
- Network Communication Module (or instructions) 312 that is used for connecting clients 102 to other computers (e.g., server system 104) or devices (e.g., sensors 106 and/or actuator devices 108) via one or more network interfaces 304 and one or more communications networks 101 (FIG. 1), such as the Internet, other wide area networks, local area networks, metropolitan area networks, and so on;
- Actuator Application 314 that receives user inputs from input device 303 and relays the user inputs, or sends corresponding commands, to servers 104; and
- Data, such as Local Control Data 340, for the operation of actuator application 314.

In some embodiments, actuator application 314 includes the following programs, modules and data structures, or a subset or superset thereof:

- Client Authoring Module 316 for composing automation rules by providing user interfaces (e.g., in conjunction with presentation module 334) and receiving user inputs (e.g., in conjunction with input module 336);
- Client Control Module 318 for controlling actuator devices 108 by sending user inputs and/or requests to server 104 (or optionally, to one or more actuator devices 108), and optionally, receiving state information from server (or one or more actuator devices 108);
- Server Interface 330 for sending data, commands, and/or information to, and retrieving data and/or information from, server 104;
- Presentation module 220 that formats data from server 104 for display; for example, presentation module 220 may generate a web page or XML document that includes a list of associated devices (e.g., devices in communication with client 102 and/or server 104) and their states; and
- Input Module 336 for receiving user inputs (e.g., in conjunction with input device 303).

In some embodiments, local control data 340 includes Device Data 342, which includes the following data structures, or a subset or superset thereof:

- Device Identifier(s) 344 that identifies devices to be controlled by client 102 (e.g., devices in communication with client 102 and/or server 104, devices with which client 102 and/or server 104 is waiting to establish communication); and
- Device States 346, which identifies current and/or possible states for each device identified by device identifiers 344.

Each of the above identified software systems, procedures, modules, and applications correspond to a set of instructions for performing one or more functions described above. These modules (i.e., sets of instructions) need not be implemented as separate software programs, procedures, or modules, and thus various subsets of these modules may be combined or otherwise re-arranged in various embodiments. In some embodiments, memory 306 may store a subset of the modules and data structures identified above. Furthermore, memory 306 may store additional modules and data structures not described above.

Figure 4A:
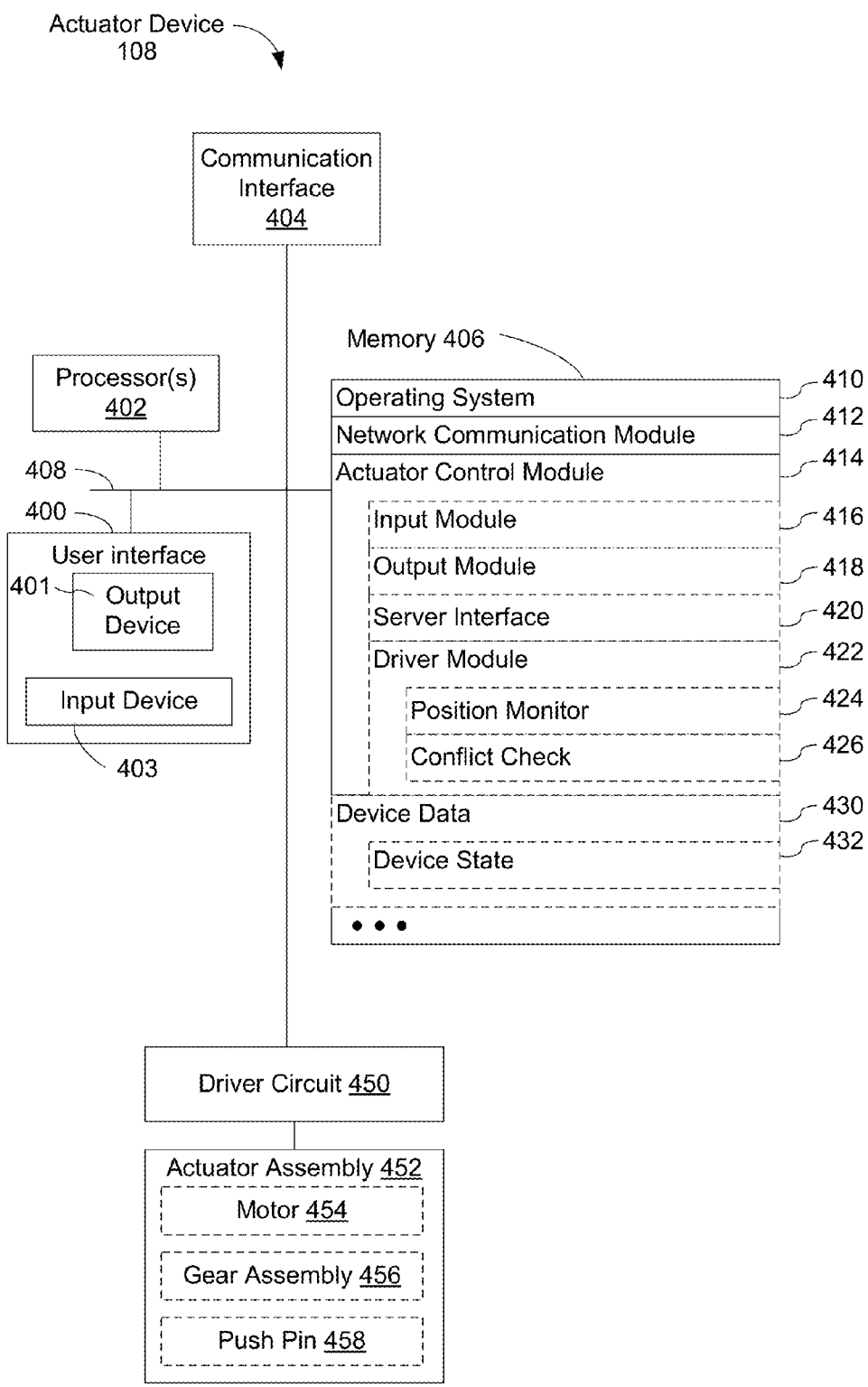
FIG. 4A is a block diagram illustrating an actuator device in accordance with some embodiments.

FIG. 4A is a block diagram illustrating actuator device 108 in accordance with some embodiments.

Actuator device 108 typically includes one or more processors 402 (e.g., microprocessors, central processing units (CPUs), accelerated processing units (APU), etc.), one or more network or other communications interfaces 404, memory 406, driver circuit 450, and one or more communication buses 408 for interconnecting these components. In some embodiments, one or more processors 402 and memory 406 are integrated (e.g., application-specific integrated circuit or field-programmable gate array). In some embodiments, the communication buses 408 include circuitry (sometimes called a chipset) that interconnects and controls communications between system components.

Communication interfaces 404 include one or more circuits for wired and/or wireless communications. In some embodiments, communication interfaces 404 include radio frequency (RF) circuit. The RF circuit receives and sends RF signals, also called electromagnetic signals. The RF circuit converts electrical signals to/from electromagnetic signals and communicates with communications networks and other communications devices via the electromagnetic signals. The RF circuit optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuit optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In some embodiments, actuator device 108 includes user interface 400. User interface 400 includes output device 401 and/or input device 403. Output device 401 typically provides a simple output interface. For example, output device 401 includes an audible indicator (e.g., a bell or an alarm) or a visual indicator (e.g., a status light) to indicate the status of actuator device 108 (e.g., whether actuator device 108 is powered on, whether a battery of actuator device 108 needs charging or replacement, whether actuator device 108 is actuating a switch, etc.). Similarly, input device 403 typically provides a simple input interface. For example, input device 403 includes a button, which, when pressed, activates actuator device 108 (e.g., actuator device 108 operates an actuator to turn on or off a switch). In some other embodiments, user interface 400 includes a touch-sensitive surface, such as a touch-sensitive display.

Memory 406 of server system 104 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from processor(s) 402. Memory 406, or alternately the non-volatile memory device(s) within memory 406, comprises a computer readable storage medium. In some embodiments, memory 406, or the non-volatile memory device(s) within memory 406, comprises a non-transitory computer readable storage medium. In some embodiments, memory 406 or the computer readable storage medium of memory 406 stores the following programs, modules and data structures, or a subset thereof:

- Operating System 410 that includes procedures for handling various basic system services and for performing hardware dependent tasks;
- Network Communication Module (or instructions) 412 that is used for connecting clients 102 to other computers (e.g., server system 104) or devices (e.g., sensors 106 and/or actuator devices 108) via one or more network interfaces 404 and one or more communications networks 101 (FIG. 1), such as the Internet, other wide area networks, local area networks, metropolitan area networks, and so on;
- Actuator Control Module 414 for controlling actuator assembly 452; and
- Device Data 430, which includes device state 432 representing the state of actuator device (e.g., last time of activating actuator assembly 452).

In some embodiments, actuator application 414 includes the following programs, modules and data structures, or a subset or superset thereof:

- Input Module 416 for receiving user inputs from input device 403;
- Output Module 418 for outputting information to output device 401;
- Server Interface 420 for receiving instructions from, and optionally sending results of operations to, server 104;
- Driver Module 422 for activating driver circuit 450, which, in turn, activates actuator assembly 452.

In some embodiments, driver module 422 includes the following data structures, or a subset or superset thereof:

- Position Monitor 424 that monitors the position of push pin 458 (e.g., by using a separate sensor, such as a contact sensor, and/or monitoring a current load on motor 454); and
- Conflict Check 426 that checks whether another actuator device coupled (or paired) with actuator device 108 is already operating its actuator assembly (e.g., by communicating with the other actuator device using communication interface 404 and/or network communication module 412).

Each of the above identified software systems, procedures, modules, and applications correspond to a set of instructions for performing one or more functions described above. These modules (i.e., sets of instructions) need not be implemented as separate software programs, procedures, or modules, and thus various subsets of these modules may be combined or otherwise re-arranged in various embodiments. In some embodiments, memory 406 may store a subset of the modules and data structures identified above. Furthermore, memory 406 may store additional modules and data structures not described above.

Driver circuit 450 conditionally provides power to activate actuator assembly 452. In some embodiments, actuator assembly 452 includes motor 454, gear assembly 456, push pin 458, or a subset or superset thereof. In some embodiments, in response to one or more instructions from driver module 422, driver circuit 450 provides electrical power to actuator assembly 452 (e.g., in particular, motor 454 in actuator assembly 452). Motor 454 rotates gears in gear assembly 456, which moves push pin 458. In response to an instruction from driver module 422 to bring push pin 458 up, driver circuit 450 provides electrical power in a first polarity, which causes motor 454 to rotate in a first direction (e.g., clockwise) to move push pin 458 up. In response to an instruction from driver module 422 to bring push pin 458 down, driver circuit 450 provides electrical power in a second polarity that is distinct from the first polarity, which causes motor 454 to rotate in a second direction (e.g., counterclockwise) that is opposite to the first direction to move push pin 458 down.

In some embodiments, driver circuit 450 monitors its current load, which is, in some embodiments, used by position monitor 424 and/or driver circuit 450 to determine whether push pin 458 has reached a terminal position. In some embodiments, driver circuit 450 and/or position monitor 424 ceases to provide power to actuator assembly 452 based on its current load (e.g., based on a determination that push pin 458 has reached a terminal position).

Although the description herein refers to certain features implemented in client 102, certain features implemented in server 104, and certain features implemented in actuation device 108, the embodiments are not limited to such distinctions. For example, at least some of the features described herein as being part of server 104 can be implemented in whole or in part in client 102, and vice versa. For example, at least some of the features described herein as being part of server 104 can be implemented in whole or in part in actuation device 108, and vice versa.

Notwithstanding the discrete blocks of memory 206, 306, and 406 in FIGS. 2, 3, and 4A, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated.

Figure 4B:
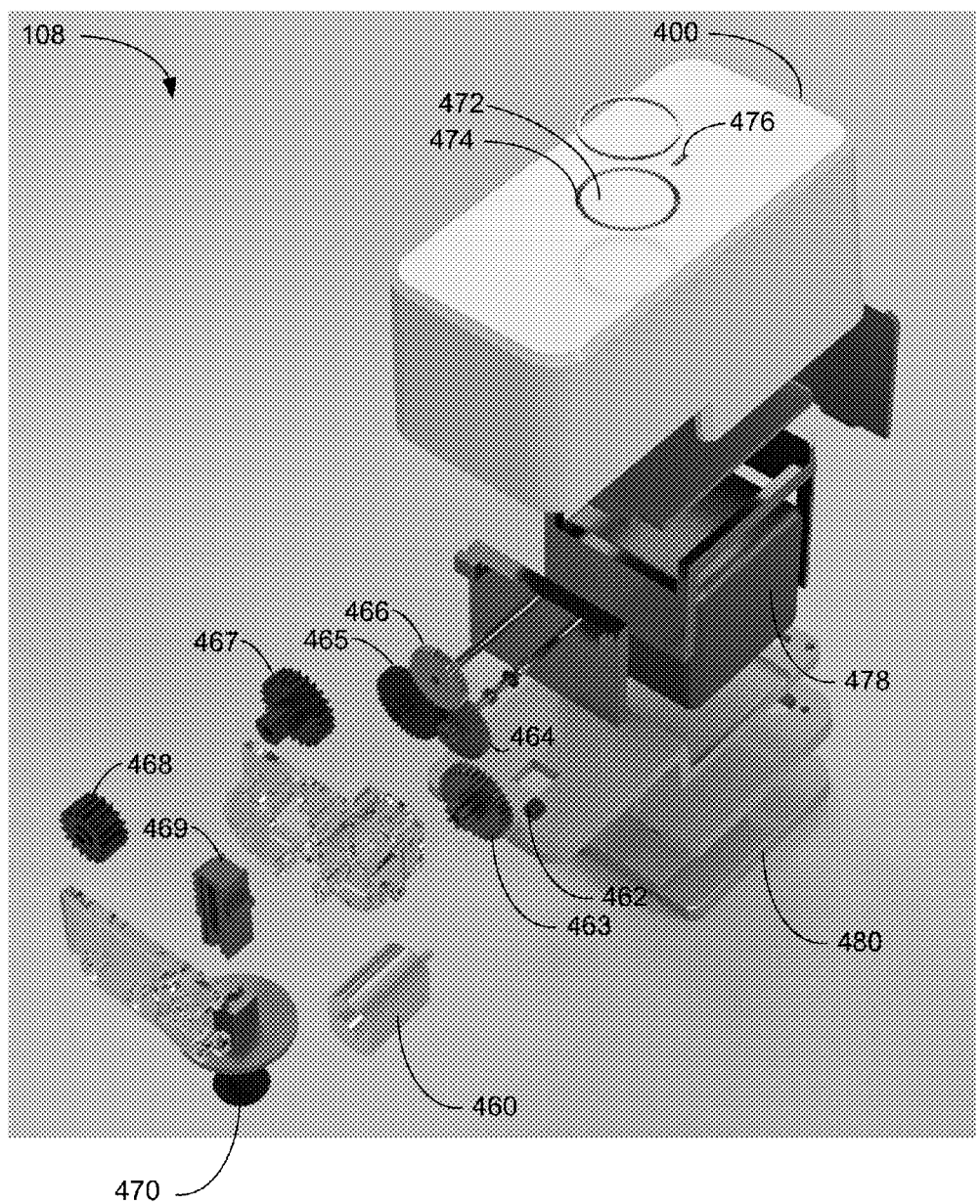
FIG. 4B is an exploded view of the actuator device in accordance with some embodiments.

FIG. 4B is an exploded view of actuator device 108 in accordance with some embodiments.

Actuator device 108 includes housing 100, in which electrical circuits (e.g., processors 402, communication interface 404, memory 406, and driver circuit 450) are typically located.

Actuator device 108 includes motor 460, which corresponds to motor 454 in FIG. 4A. In some embodiments, motor 460 is a direct current (DC) motor. A DC motor typically has a high speed and a low torque. Thus, in some embodiments, a gear assembly (e.g., gear assembly 456 in FIG. 4A) is used to convert the high-speed, low-torque rotation of the DC motor to a low-speed, high-torque rotation. The gear assembly typically includes a plurality of gears, such as gears 462 through 469. In some embodiments, the gear ratio is 100 (and the speed is reduced by a factor of 100). In some embodiments, the gear ratio is between 20 and 500. In some other embodiments, motor 460 is a stepper motor.

In FIG. 4B, the gear assembly includes rack gear 469, which converts the rotation of pinion gear 468 into a linear movement. Rack gear 469 is coupled with push pin 470 (which corresponds to push pin 458 in FIG. 4A). Thus, the rotation of motor 460 turns gears in the gear assembly, which moves rack gear 469 linearly (e.g., up or down) and also moves push pin 470 linearly.

FIG. 4B also shows that housing 400 is configured to contain battery 478, which provides electrical power to electrical circuits of actuator device 108 and motor 460. In some embodiments, battery 478 is a rechargeable battery.

Actuator device 108 includes base plate 480, which is used to mount actuator device 108 on a switch or a surface adjacent to a switch.

In FIG. 4B, actuator device 108 includes push button 472, which, when pressed, activates motor 460. For example, in response to detecting that push button 472 has been pressed, actuator device 108 moves push pin 470 down.

In FIG. 4B, actuator device 108 also includes visual indicator 474, which indicates whether motor 460 is turning (e.g., visual indicator 474 is lit when motor 460 is turning and visual indicator 474 is turned off when motor 460 is not turning).

In some embodiments, actuator device 108 includes visual indicator 476, which indicates whether actuator device 108 is powered on (e.g., visual indicator 476 is lit when battery 478 provides sufficient power, visual indicator 476 is turned off when battery 478 provides no power, etc.).

Figure 4C:
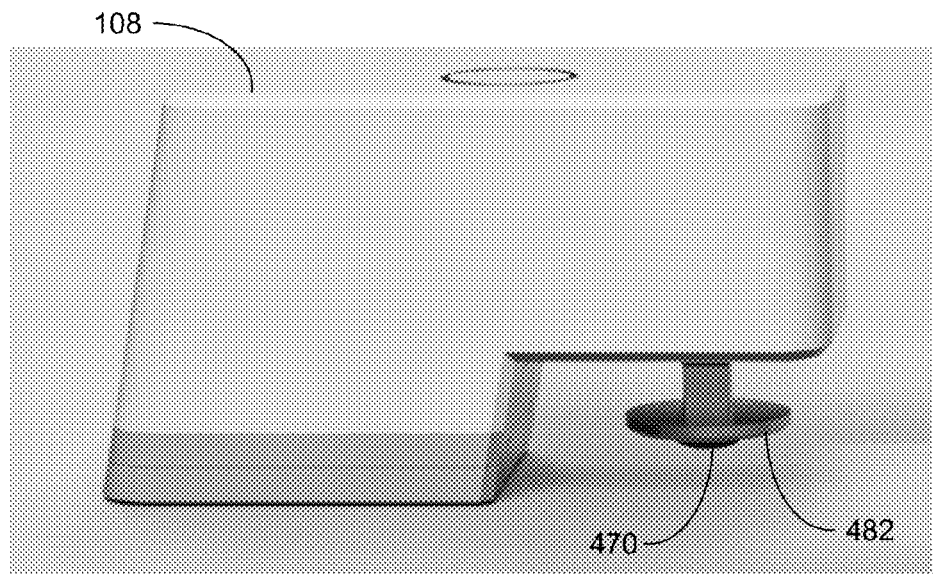
FIGS. 4C and 4D are front views of the actuator device in accordance with some embodiments.
Figure 4D:
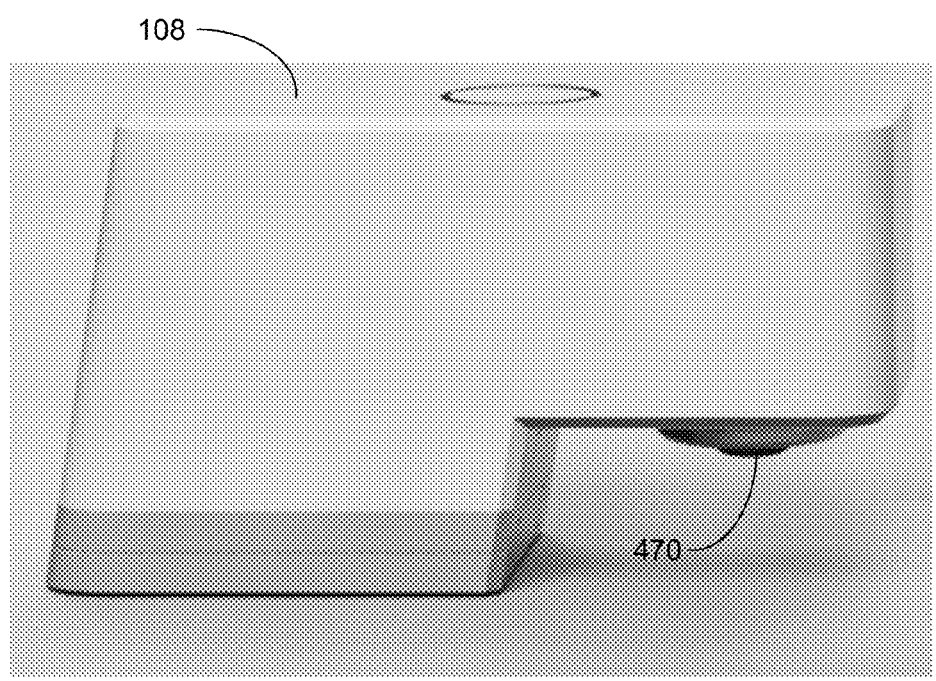

FIGS. 4C and 4D are front views of actuator device 108 in accordance with some embodiments. Actuator device 108 can be used with various switches, such as a push button or a rocker switch.

A rocker switch is an electronic on/off switch. The rocker switch has two sides, one of which is raised while the other side is depressed. When a raised side is pressed, the rocker switch rocks by moving the pressed side down and raising the other side up.

FIG. 4C shows actuator 108 with push pin 470 in a down position. When actuator 108 is mounted adjacent to a rocker switch (in particular, over a raised side of the rocker switch), moving push pin 470 to the down position switches the rocker switch (e.g., the rocker switch rocks and its on/off state changes).

FIG. 4D shows actuator 108 with push pin 470 in an up position. When push pin 480 is in an up position, push pin 470 is not in contact with a rocker switch.

In some embodiments, as shown in FIGS. 4C and 4D, push pin 470 includes bumper 482. In some embodiments, bumper 482 serves as a stopper for push pin 470 when push pin 470 moves up. In some embodiments, bumper 482 increases a contact with a rocker switch, as a contact surface of the rocker switch is typically sloped.

As shown in FIGS. 4C and 4D, in accordance with some embodiments, an apparatus includes communication circuit (located inside the housing); an actuator configured for mounting adjacent to a rocker switch and for actuating the rocker switch; and one or more processors coupled with the communication circuit and the actuator. The one or more processors are configured to activate the actuator in response to one or more instructions received by the communication circuit.

Figure 4E:
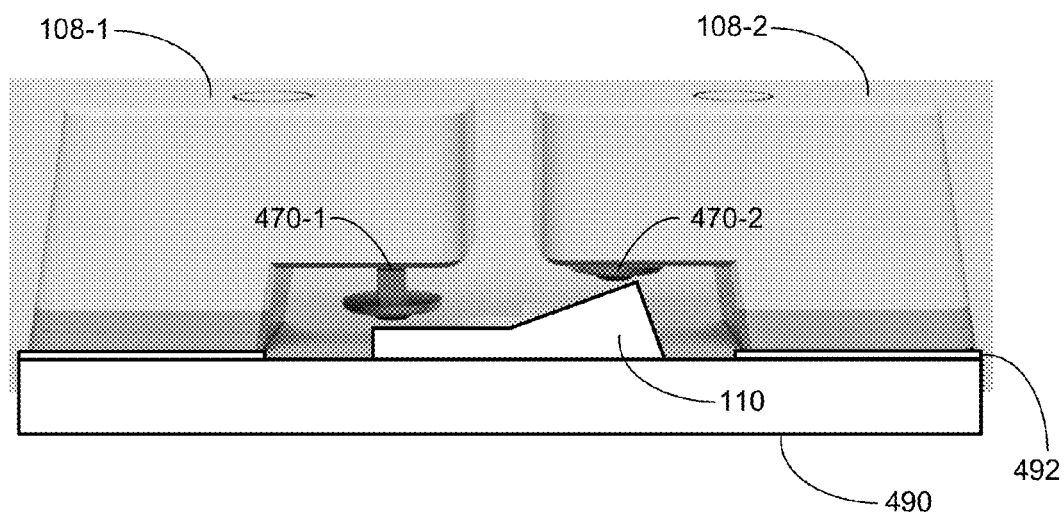
FIGS. 4E and 4F are front views of a pair of actuator devices in accordance with some embodiments.
Figure 4F:
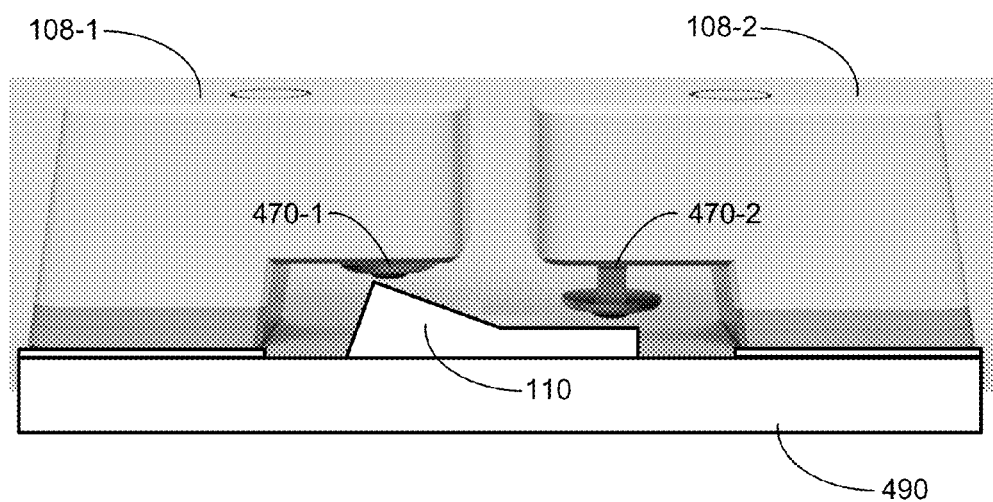

FIGS. 4E and 4F are front views of a pair of actuator devices 108-1 and 108-2 in accordance with some embodiments. In FIGS. 4E and 4F, actuator devices 108-1 and 108-2 are mounted, on switch plate 490, adjacent to rocker switch 110. Alternatively, actuator devices 108-1 and 108-2 are mounted on a wall around rocker switch 110. In some embodiments, actuator devices 108-1 and 108-2 are mounted removably using an adhesive tape (e.g., a double-sided tape).

In FIG. 4E, when push pin 470-1 of actuator device 108-1 moves down, push pin 470-1 comes in contact with rocker switch 110 and presses a previously raised side (e.g., a left side) of rocker switch 110.

As shown in FIG. 4E, while push pin 470-1 of actuator device 108-1 moves down, push pin 470-2 of actuator device 108-2 is maintained at an up position so that both push pins 470-1 and 470-2 do not press on rocker switch 110 concurrently. In FIG. 4E, pressing on the left side of rocker switch 110 places rocker switch 110 in a first state (e.g., an "on" state).

In FIG. 4F, when push pin 470-2 of actuator device 108-2 moves down, push pin 470-2 comes in contact with rocker switch 110 and presses the right side of rocker switch 110.

As shown in FIG. 4F, while push pin 470-2 of actuator device 108-2 moves down, push pin 470-1 of actuator device 108-1 is maintained at an up position so that both push pins 470-1 and 470-2 do not press on rocker switch 110 concurrently. In FIG. 4F, pressing on the right side of rocker switch 110 places rocker switch 110 in a second state (e.g., an "off" state) that is distinct from the first state.

Figure 4G:
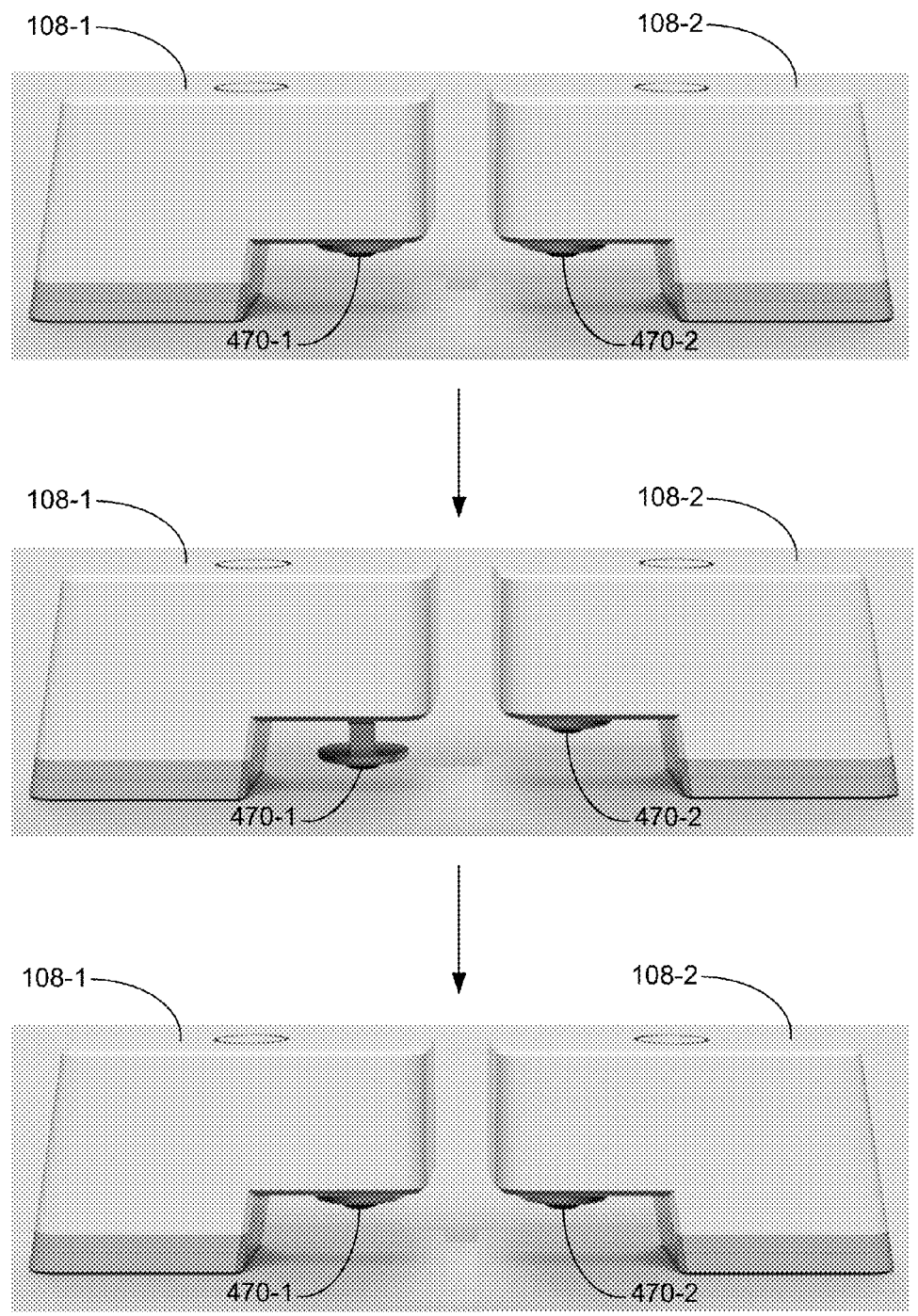
FIG. 4G illustrates front views of a pair of actuator devices in accordance with some embodiments.

FIG. 4G illustrates front views of a pair of actuator devices in accordance with some embodiments.

FIG. 4G shows that both push pins 470-1 and 470-2 are maintained at up positions. When a rocker switch needs to be switched, one of the push pins (e.g., push pin 470-1) moves down to switch the rocker switch, and retracts. Thus, after the rocker switch is switched, both push pins are maintained at the up positions. This reduces interference by push pins 470-1 and 470-2 in operation of the rocker switch. For example, a user may manually turn on and off the rocker switch without having the rocker switch come in contact with either push pin 470-1 or 470-2.

Although FIGS. 4E-4G illustrate the use of separate actuator devices 108-1 and 108-2, in some embodiments, a single apparatus with two or more actuators (e.g., a single apparatus with two separate push pins) is used.

Figure 4H:
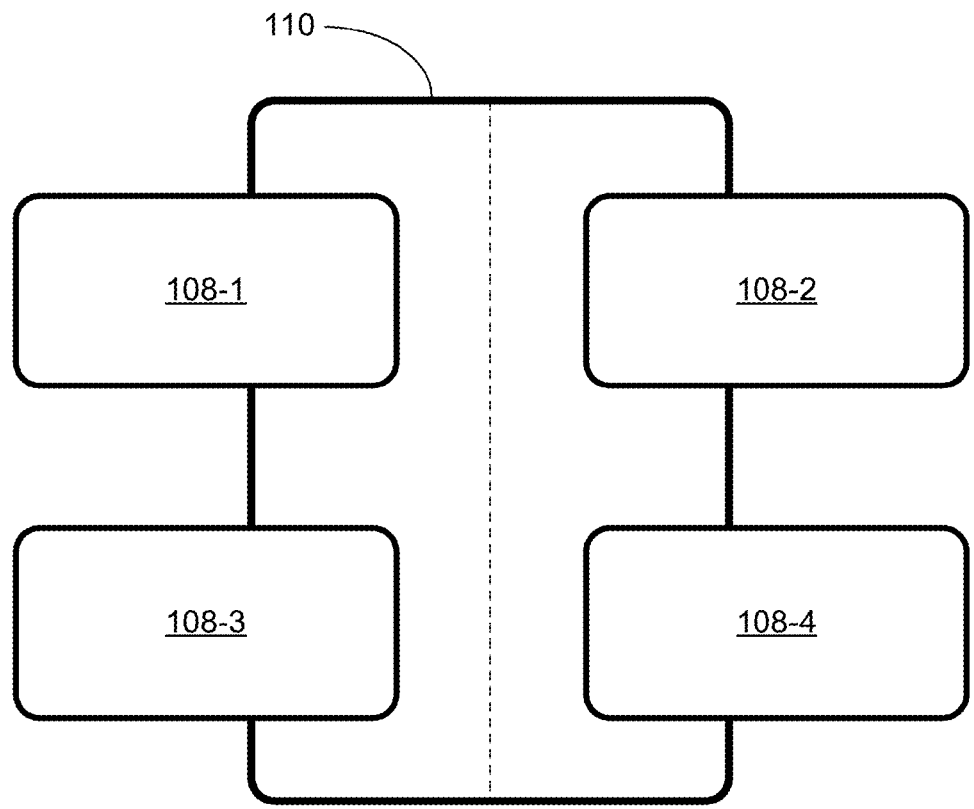
FIG. 4H is a block diagram illustrating mounting of four actuator devices adjacent to a rocker switch in accordance with some embodiments.

FIG. 4H is a block diagram illustrating mounting of four actuator devices 108-1, 108-2, 108-3, and 108-4 adjacent to rocker switch 110 in accordance with some embodiments. As shown in FIG. 4H, two actuator devices 108-1 and 108-3 are located at least partially over one side (e.g., a left side) of rocker switch 110, and two actuator devices 108-2 and 108-4 are located at least partially over the other side (e.g., a right side) of rocker switch 110. This allows multiple actuator devices to press on the same side of rocker switch 110, thereby increasing the force applied on rocker switch 110. This is useful when rocker switch 110 requires a force, more than what a single actuator device can provide (e.g., due to the motor and/or the gear assembly within the single actuator device, and/or a mounting mechanism, such as a double-sided tape), to switch. For example, when actuator device 108 is mounted with a double-sided tape, actuator device 108 cannot provide a force more than a force provided by the double-sided tape for holding the actuator device 108 in place. However, when multiple actuator devices 108 are used, the multiple actuator devices 108 can collectively provide a force more than the force provided by the double-sided tape for holding a single actuator device 108.

Figure 4I:
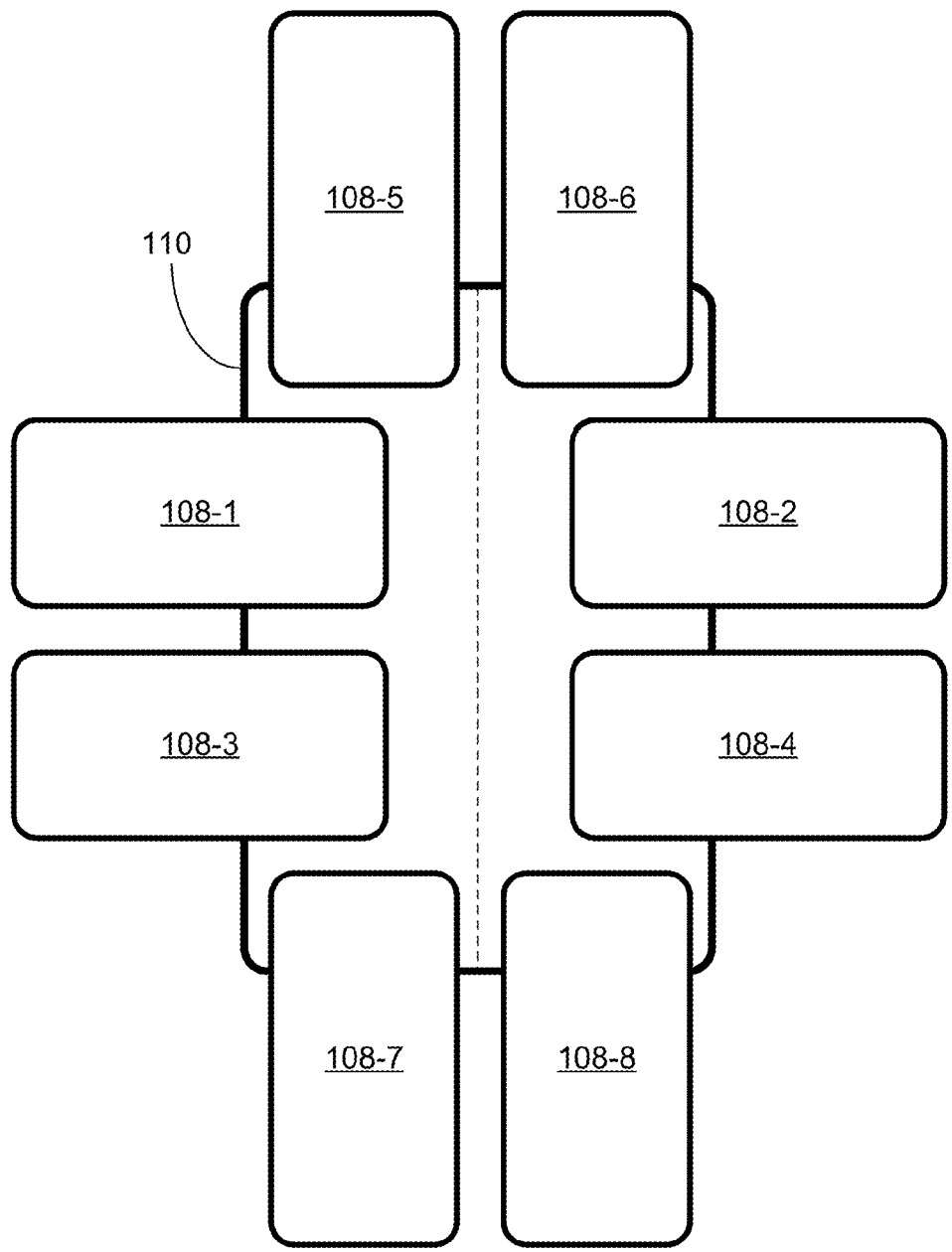
FIG. 4I is a block diagram illustrating mounting of eight actuator devices adjacent to a rocker switch in accordance with some embodiments.

FIG. 4I is a block diagram illustrating mounting of eight actuator devices adjacent to rocker switch 110 in accordance with some embodiments. In FIG. 4I, four actuator devices 108-1, 108-3, 108-5, and 108-7 are located at least partially over one side (e.g., a left side) of rocker switch 110, and four actuator devices 108-2, 108-4, 108-6, and 108-8 are located at least partially over the other side (e.g., a right side) of rocker switch 110. In some embodiments, a subset of the actuator devices shown in FIG. 4I (e.g., actuator devices 108-1 through 108-8) and/or additional actuator devices not shown in FIG. 4I are used. For example, in some cases, actuator devices 108-5 and 108-6 are mounted adjacent to rocker switch 110.

Figure 4J:
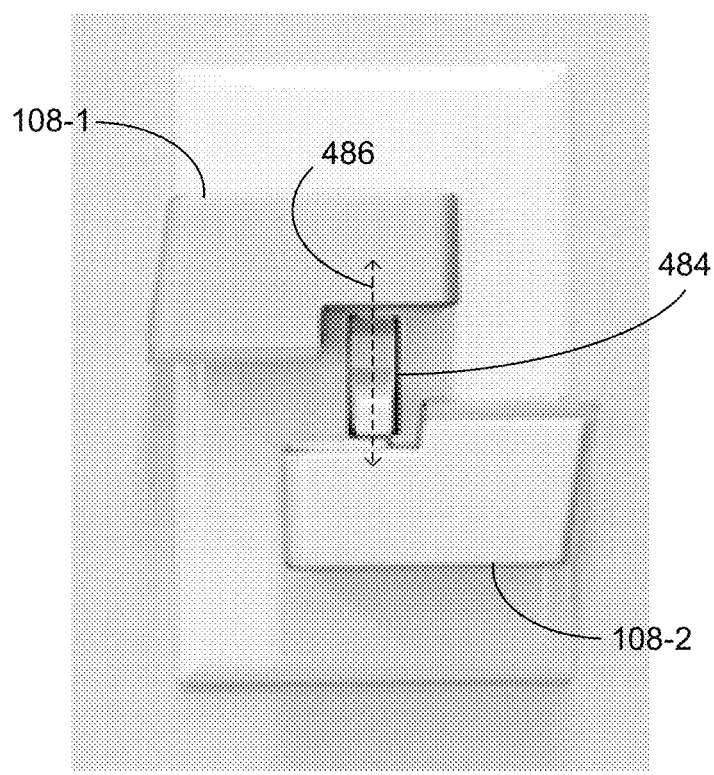
FIG. 4J illustrates a front view of a toggle switch with two actuators in accordance with some embodiments.

FIG. 4J illustrates a front view of toggle switch 484 with two actuators 108-1 and 108-2 mounted adjacent to the toggle switch in accordance with some embodiments. In FIG. 4J, actuators 108-1 and 108-2 are mounted in such a way that each actuator is configured to switch a state of toggle switch 484. In some embodiments, the push pin of each actuator is substantially aligned with respective switching direction 486 of toggle switch 484 (e.g., up or down direction in FIG. 4J). A push pin is deemed to be substantially aligned with a respective switching direction when an angle between an axis of the push pin and the switching direction of toggle switch 484 is 45 degrees or less.

Figure 4K:
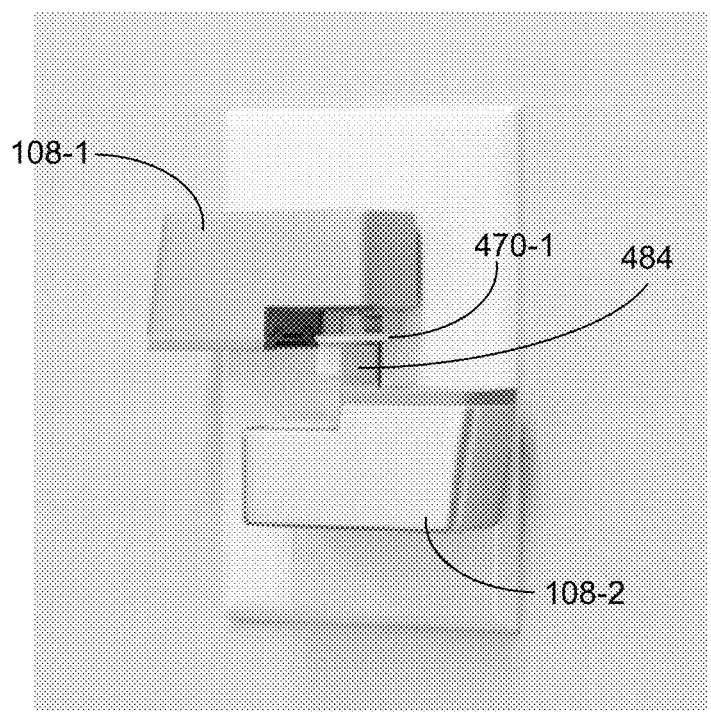
FIG. 4K illustrates switching of a toggle switch an actuator in accordance with some embodiments.

FIG. 4K illustrates switching of toggle switch 484 with actuator 108-1 in accordance with some embodiments. In FIG. 4K, toggle switch 484 is initially in an "up" state, and push pin 470-1 of actuator device 108-1 moves down and pushes toggle switch 484 to a "down" state. Similarly, when toggle switch 484 is in the "down" state, a push pin of actuator device 108-2 moves up and pushes toggle switch 484 to the "up" state.

Details of the actuator devices described below with respect to FIGS. 9A-9H are also applicable in an analogous manner to the actuator devices described above with respect to FIGS. 4A-4K. For brevity, these details are not repeated herein.

Figure 5A:
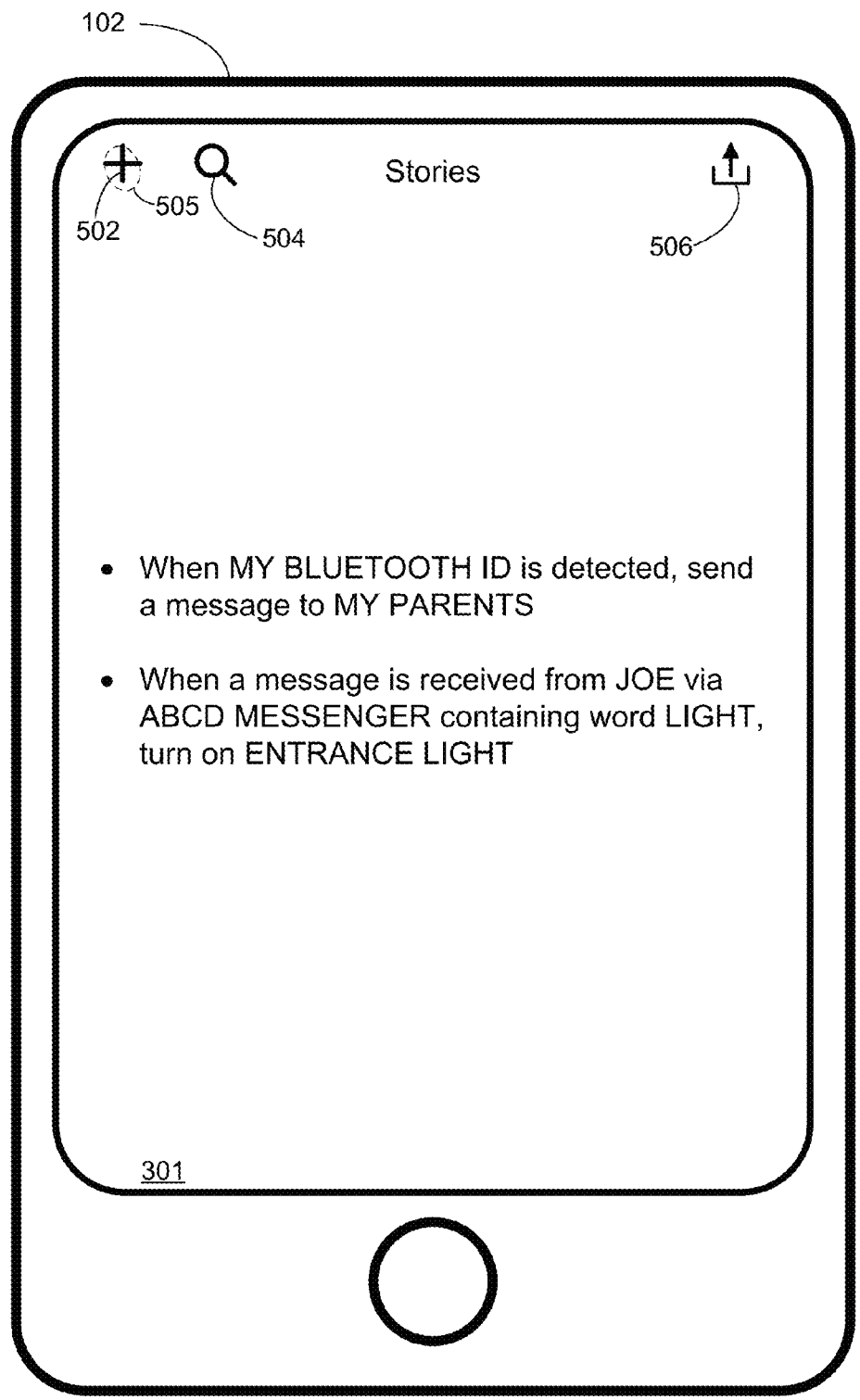
FIG. 5A-5O illustrate exemplary user interfaces in accordance with some embodiments.
Figure 5B:
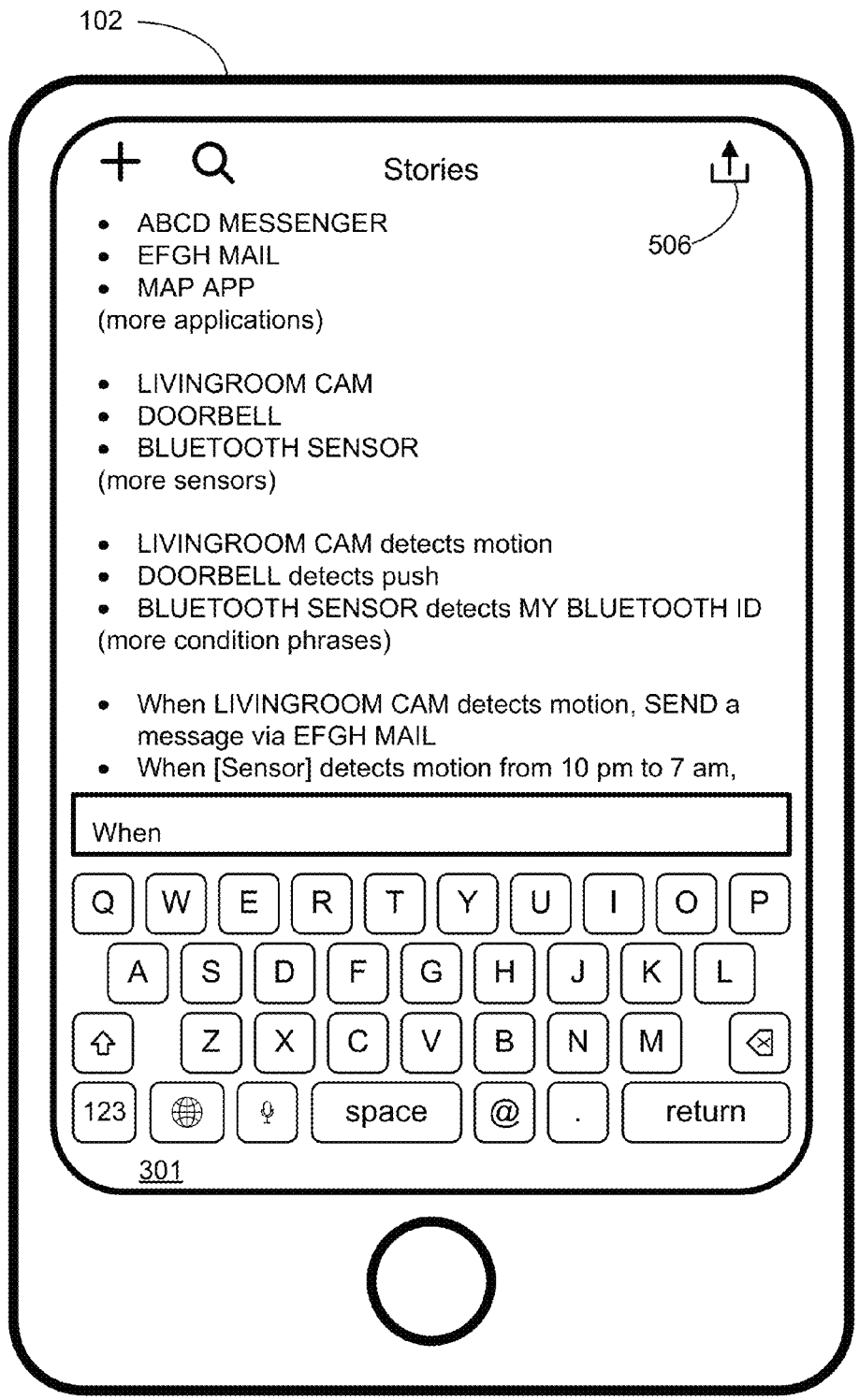
Figure 5C:
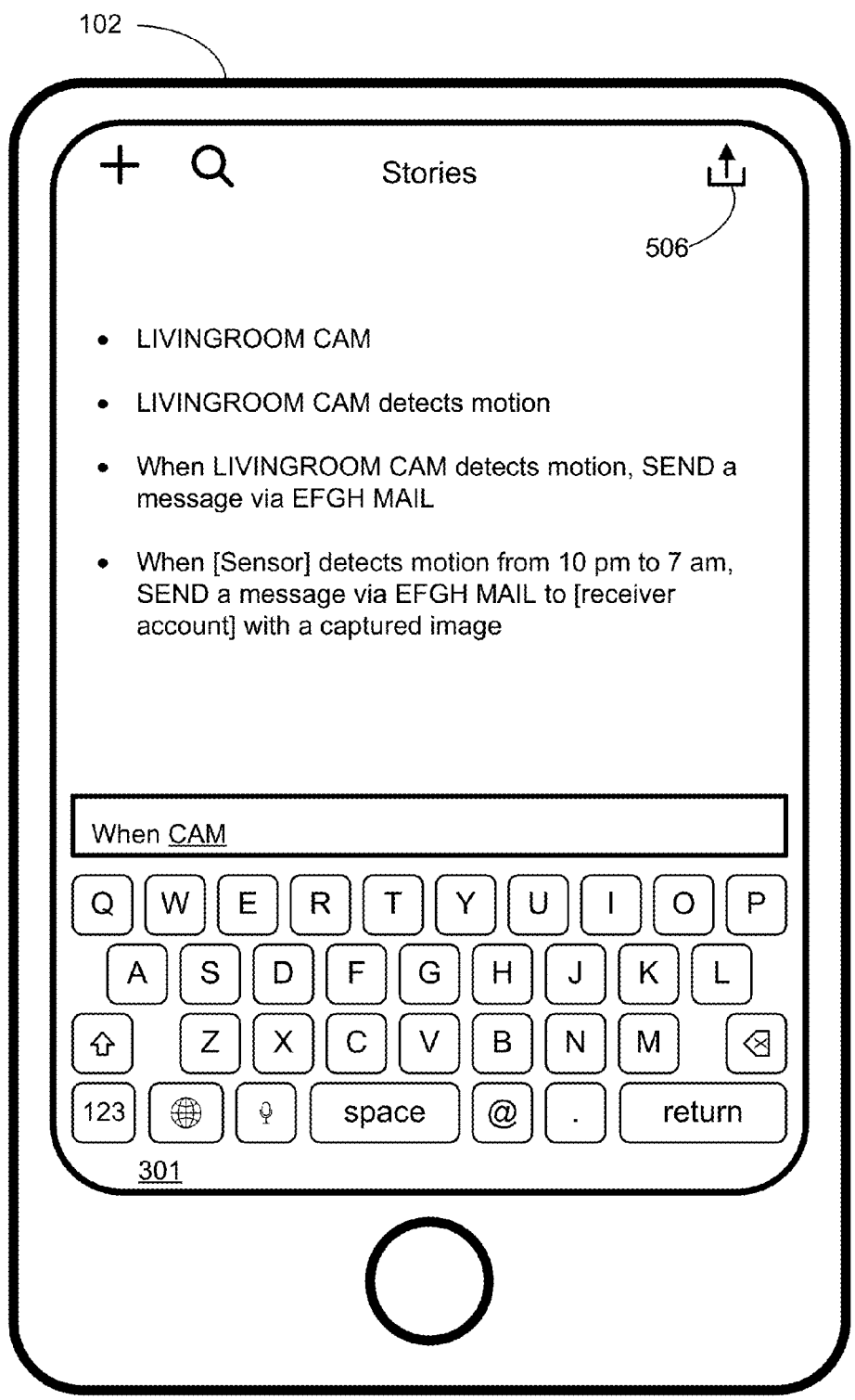
Figure 5D:
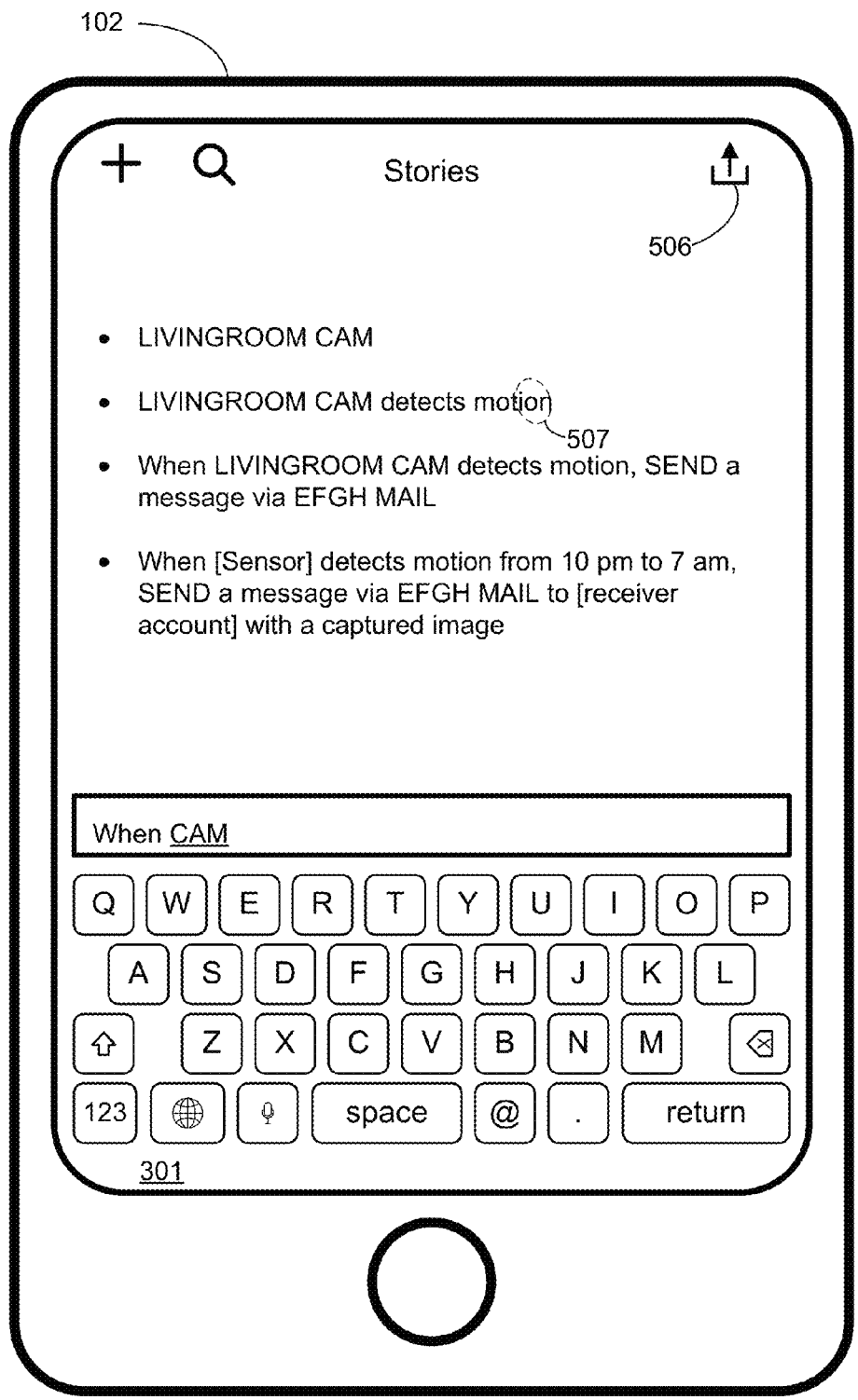
Figure 5E:
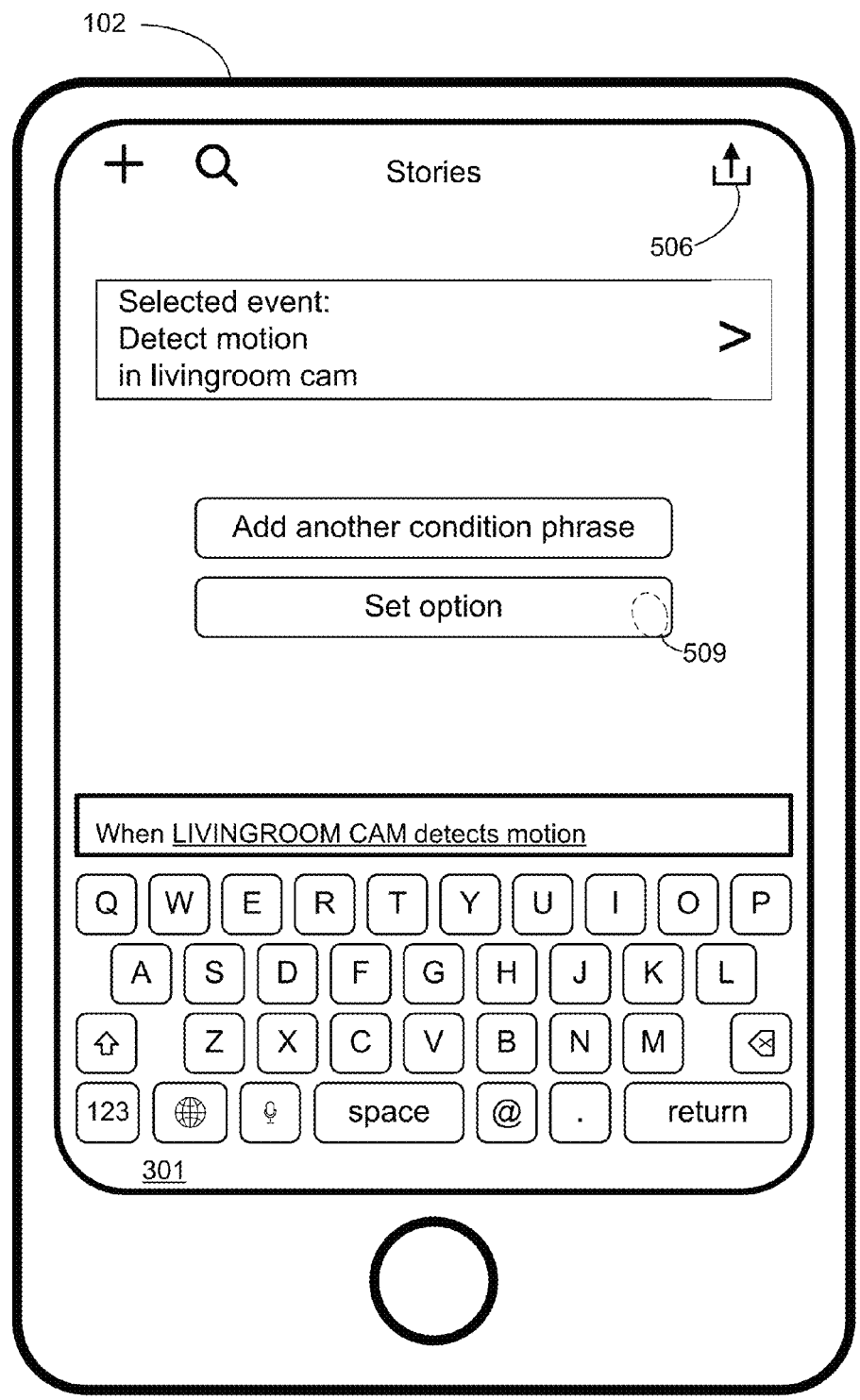
Figure 5F:
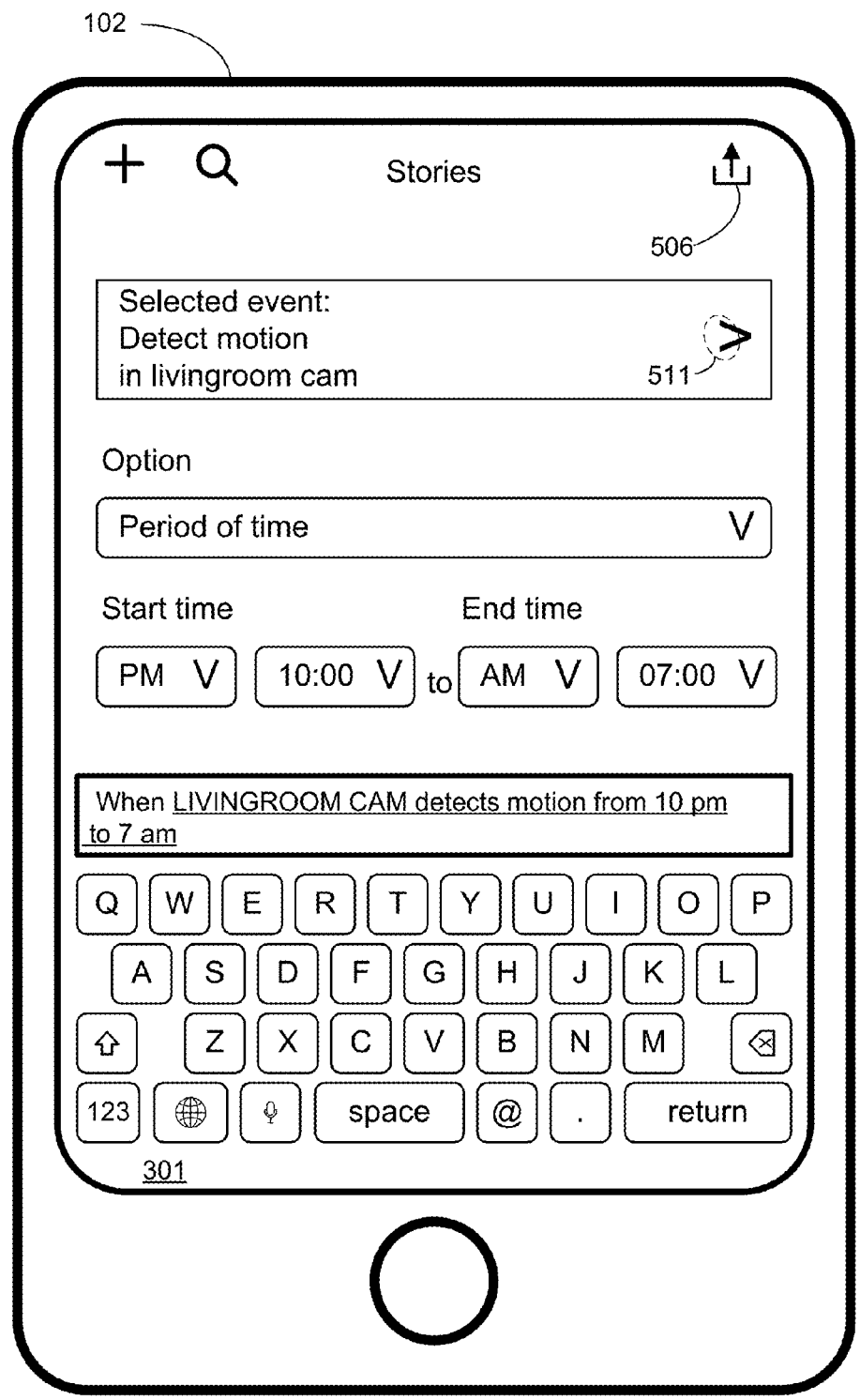
Figure 5G:
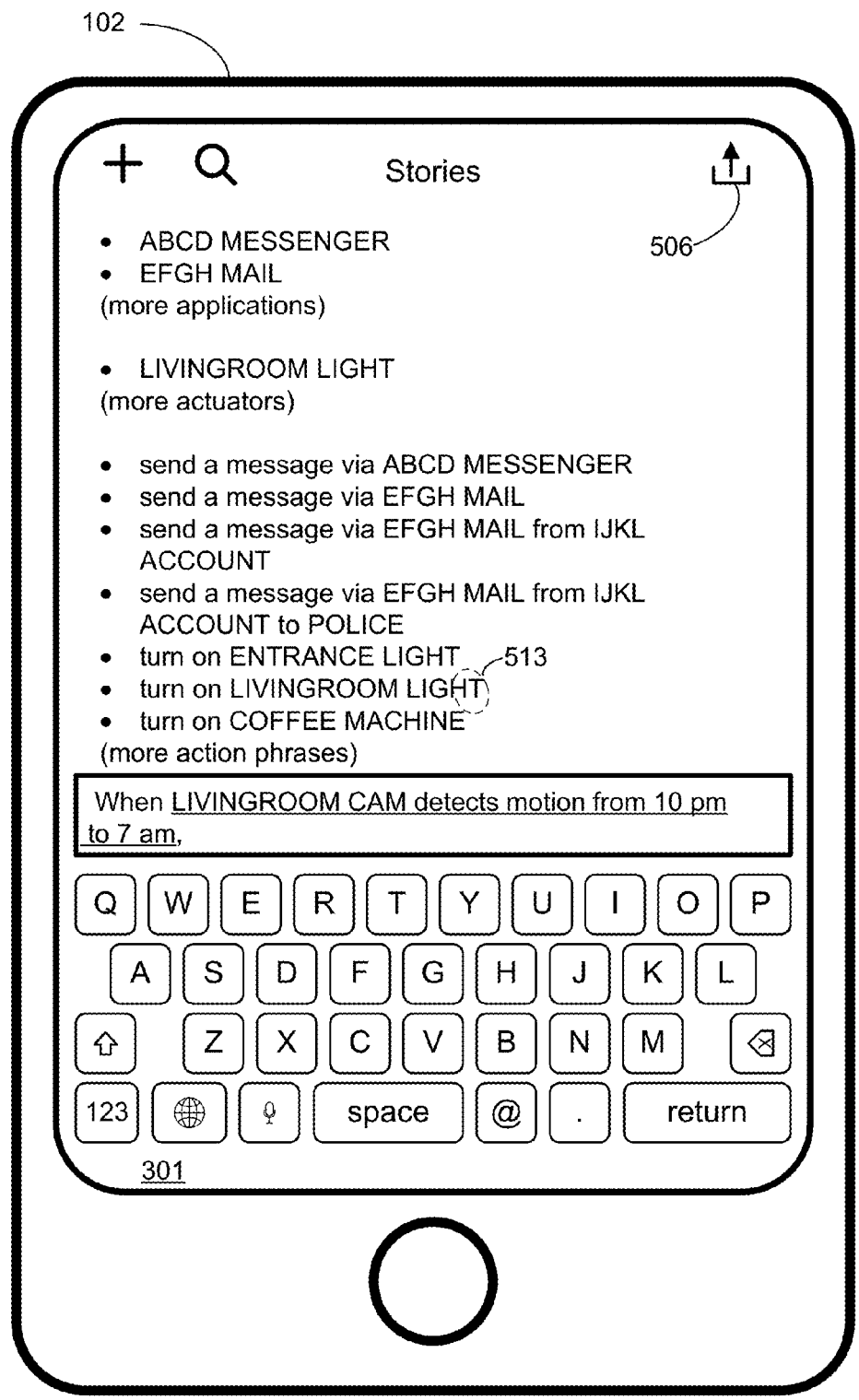
Figure 5H:
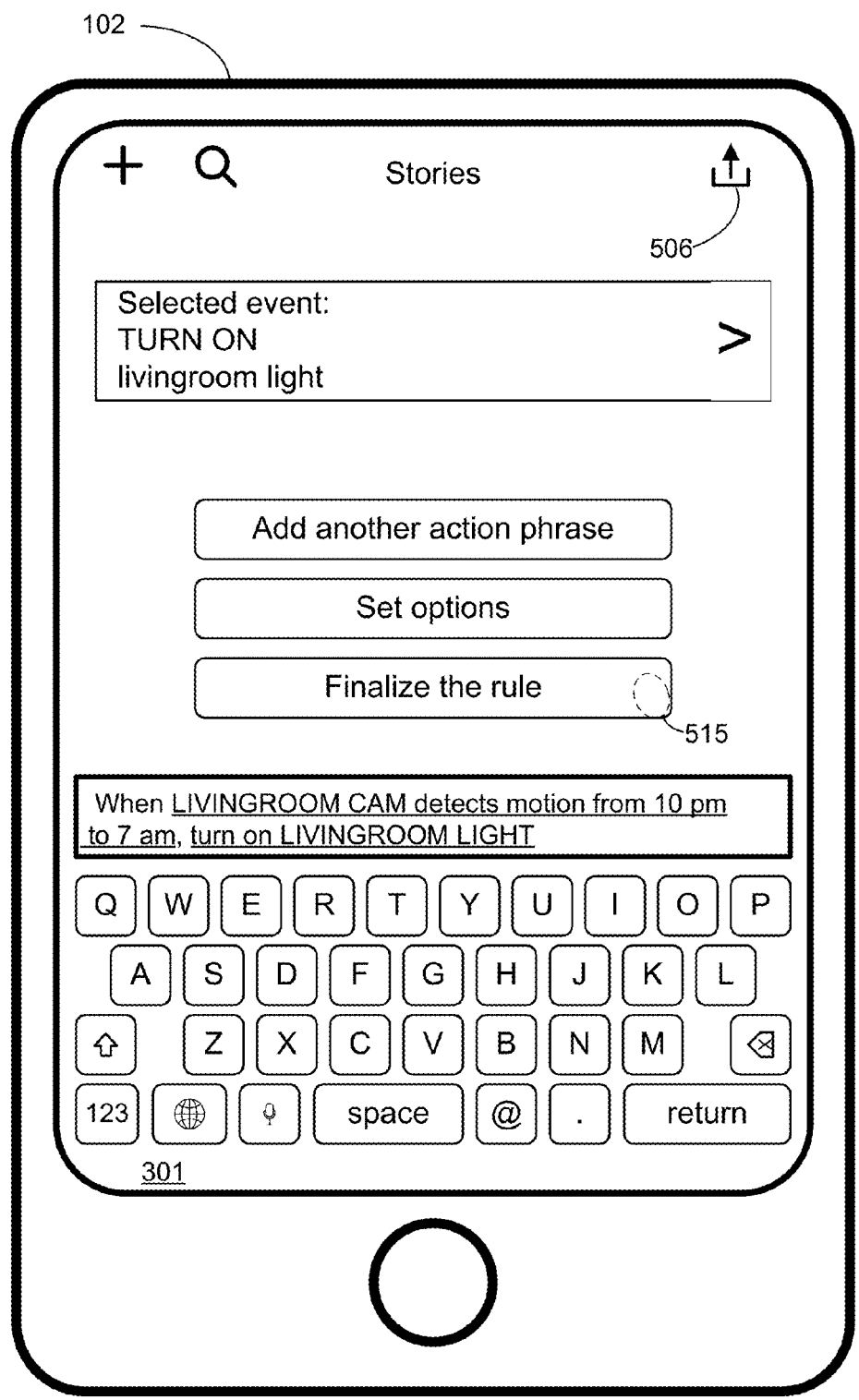
Figure 5I:
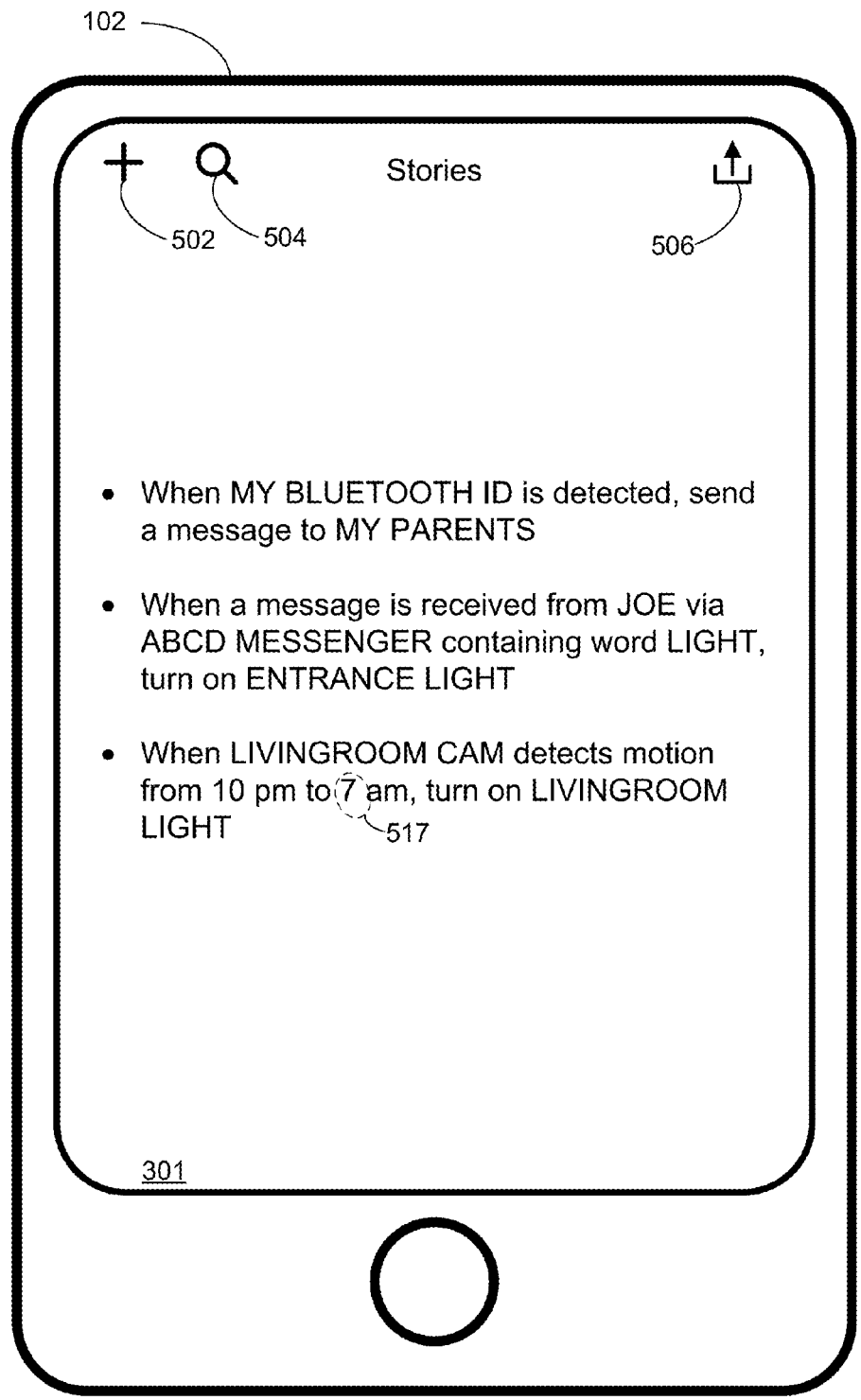
Figure 5J:
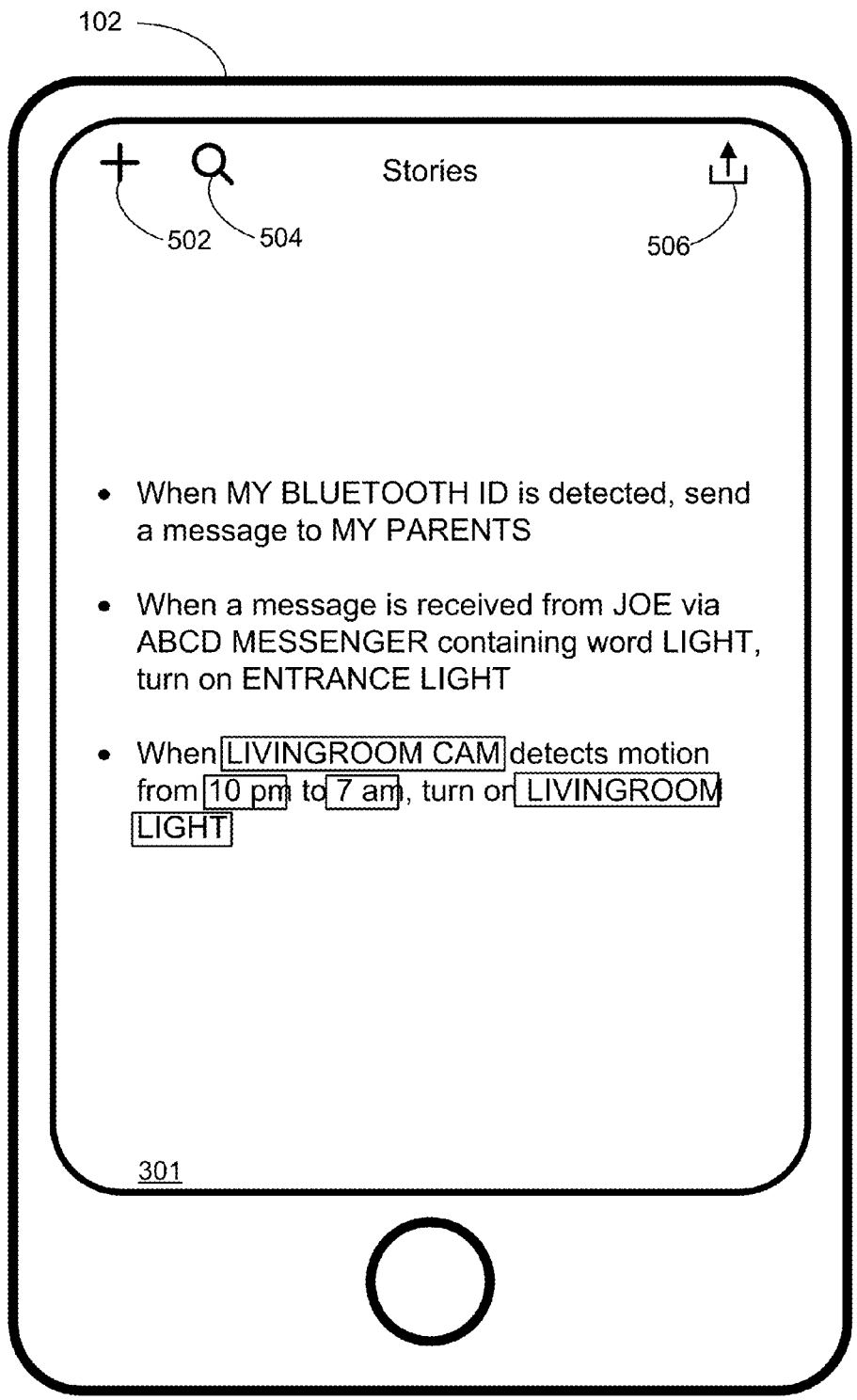
Figure 5K:
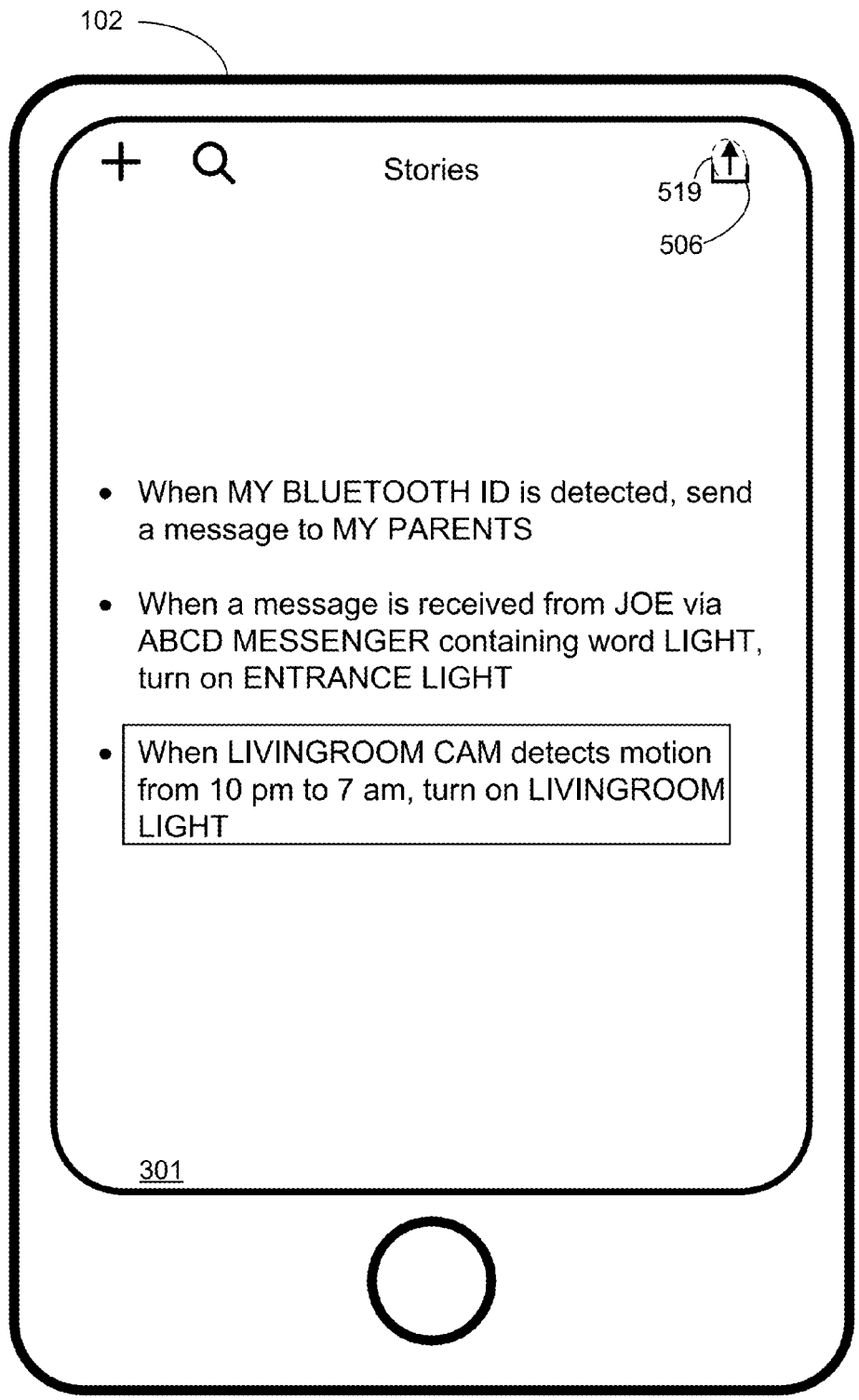
Figure 5L:
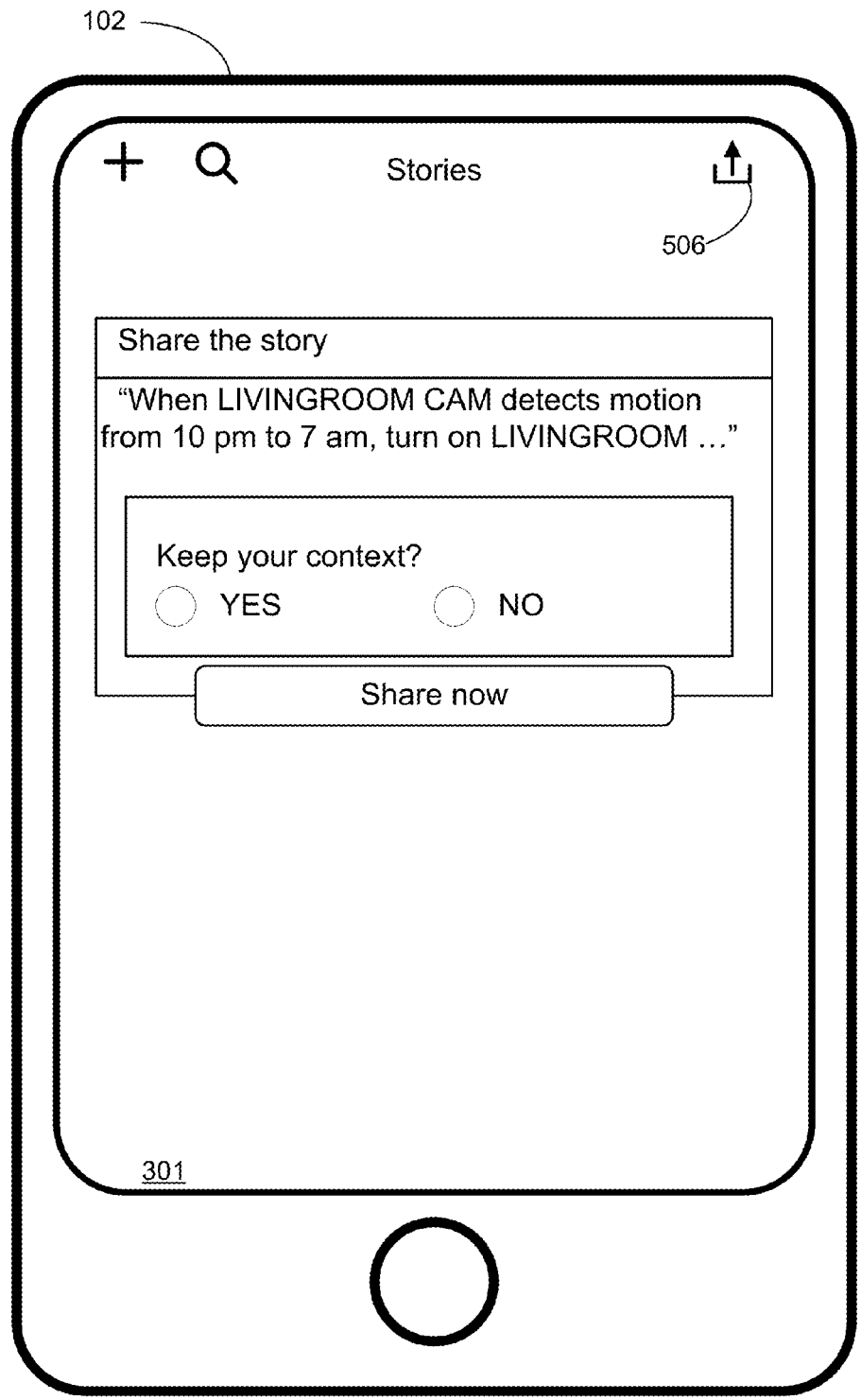
Figure 5M:
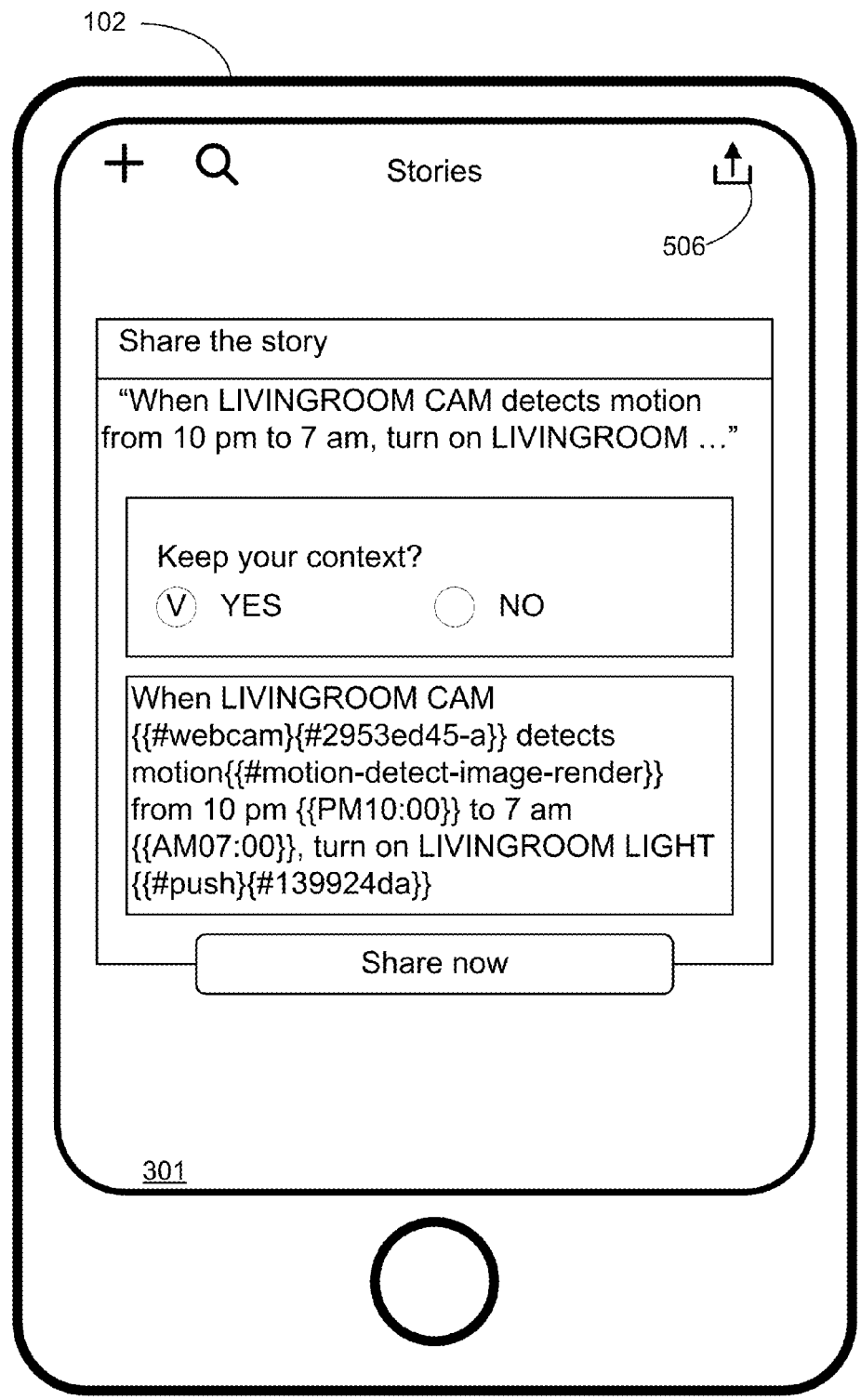
Figure 5N:
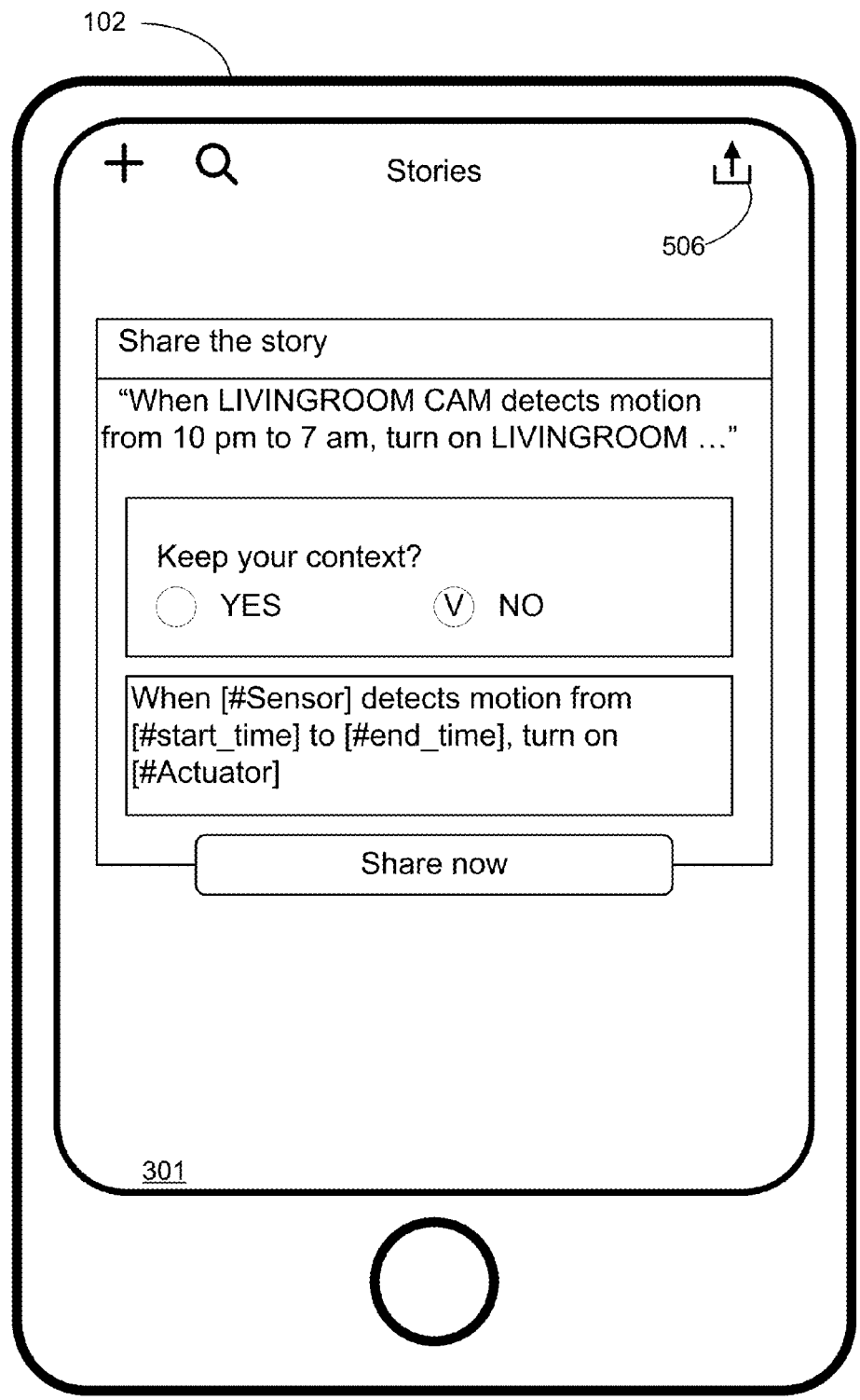
Figure 5O:
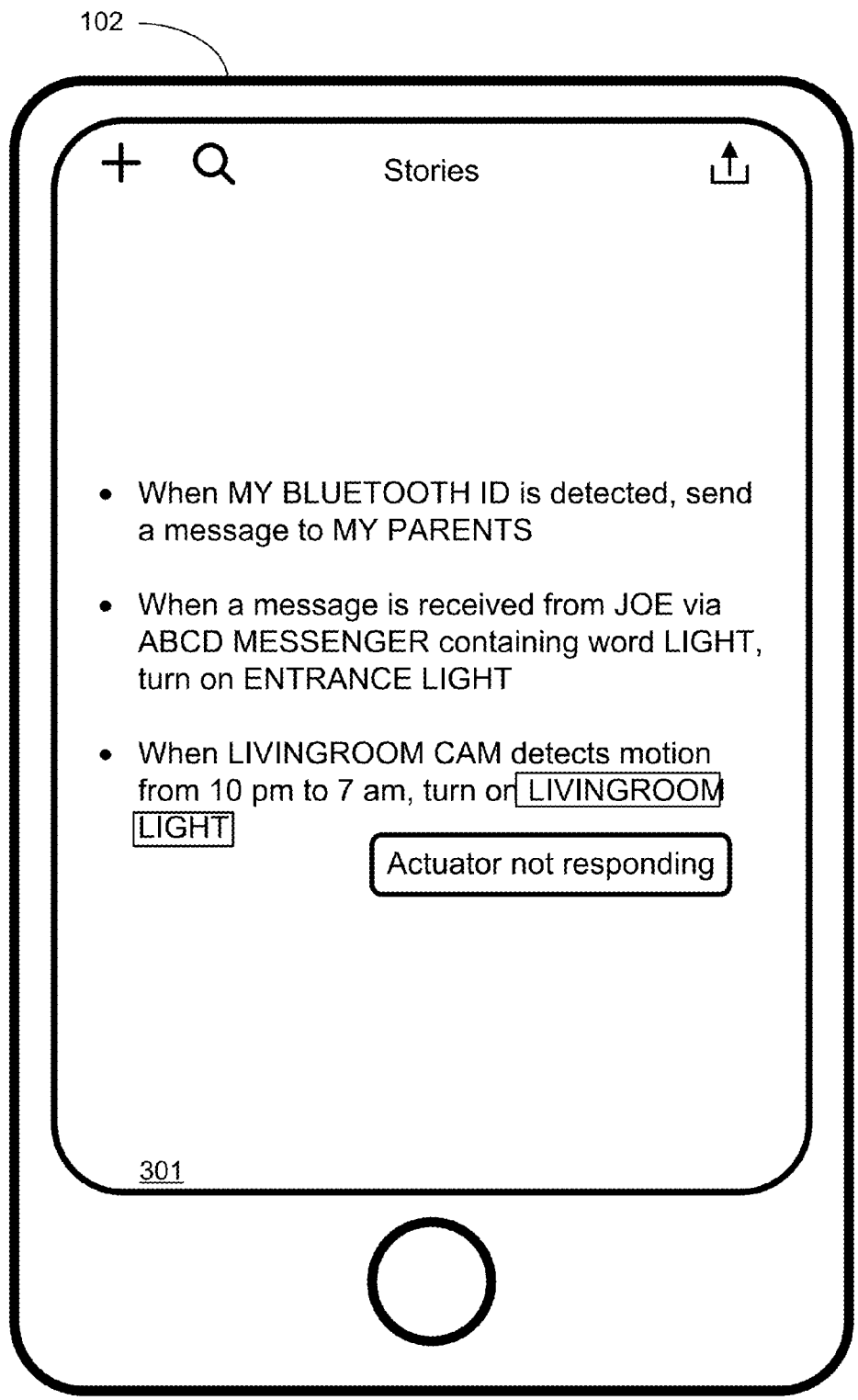

FIGS. 5A-5O illustrate exemplary user interfaces in accordance with some embodiments. In FIGS. 5A-5O, the user interfaces are displayed on touch-sensitive display 301. In some other embodiments, the user interfaces are displayed on a display device that is separate from a touch-sensitive surface (e.g., the display device is not a touch-sensitive display).

In FIG. 5A, the user interface includes a plurality of affordances, such as "add" affordance 502, "search" affordance 504, and "share" affordance 506. The user interface includes a display of two active automation rules.

FIG. 5A illustrates that user input 505 (e.g., a tap gesture) is detected at a location on display 301 that corresponds to "add" affordance 502, thereby selecting (or activating) "add" affordance 502.

FIG. 5B illustrates that, in response to user input 505, a user interface for composing an automation rule is displayed. The user interface in FIG. 5B includes a list of software applications, sensors, predefined condition phrases, and predefined automation rules.

FIG. 5C illustrates that a user input that corresponds to text "CAM" is received. The user provided text is displayed in a text input box on the user interface, as shown in FIG. 5C. The user interface is further updated to provide a list of candidates (e.g., one or more sensors, one or more predefined conditions, and one or more automation rules) that corresponds to the user provided text (e.g., candidates that include the user provided text).

FIG. 5D illustrates that user input 507 (e.g., a tap gesture) is detected at a location on display 301 that corresponds to a predefined condition phrase (e.g., "LIVINGROOM CAM detects motion").

FIG. 5E illustrates that, in response to user input 507, a user interface for setting the condition phrase is displayed. The selected condition phrase is included in the text input box. The user interface for setting the condition phrase includes an affordance for adding another condition phrase and/or an affordance for setting one or more options for the condition.

FIG. 5E illustrates that user input 509 (e.g., a tap gesture) is detected at a location on display 301 that corresponds to the affordance for setting one or more options.

FIG. 5F illustrates that, in response to user input 509, an options user interface is displayed. The options user interface includes a list of optional parameters (e.g., period of time, frequency of measurements, etc.), only one of which is shown in FIG. 5F. When the period of time is selected, the user interface in FIG. 5F also includes multiple fields for setting the start time and the end time for the condition. The selected start time and end time are included in the text input box.

FIG. 5F also illustrates that user input 511 (e.g., a tap gesture) is detected at a location on display 301 that corresponds to an affordance for finalizing the condition phrase.

FIG. 5G illustrates that, in response to user input 511, a user interface including a list of software applications, actuators, and predefined action phrases is displayed. In FIG. 5G, user input 513 (e.g., a tap gesture) is detected at a location on display 301 that corresponds to a predefined action phrase (e.g., "turn on "LIVINGROOM LIGHT").

FIG. 5H illustrates that, in response to user input 513, a user interface for setting the action phrase is displayed. The selected action phrase is included in the text input box. The user interface for setting the action phrase includes an affordance for adding another action phrase, an affordance for setting one or more options for the action, and/or an affordance for storing the automation rule.

FIG. 5H illustrates that user input 515 (e.g., a tap gesture) is detected at a location on display 301 that corresponds to an affordance for storing the automation rule.

FIG. 5I illustrates that, in response to user input 515, the user interface includes a display of three active automation rules, including the added automation rule (e.g., "When LIVINGROOM CAM detects motion from 10 pm to 7 am, turn on LIVINGROOM LIGHT.").

FIG. 5I also illustrates that user input 517 is detected at a location on display 301 that corresponds to the added automation rule.

FIG. 5J illustrates that, in response to user input 517, one or more portions, of the selected automation rule, that can be edited are visually distinguished in the user interface (e.g., such portions are displayed in boxes, underlined, displayed in different colors, and/or displayed in different fonts, etc.).

FIG. 5K illustrates that user input 519 is detected at a location on display 301 that corresponds to an affordance for sharing an automation rule, while one of the automation rules is selected (e.g., indicated by a box around the selected automation rule as shown in FIG. 5K or with another affordance, such as a check box near the selected automation rule).

FIG. 5L illustrates that, in response to user input 519, a user interface for sharing an automation rule is displayed. The user interface in FIG. 5L includes at least a portion of the automation rule to be shared and an affordance for sharing (or sending) the selected automation rule. When the affordance for sharing the selected automation rule is selected (e.g., by a tap gesture on the affordance), the selected automation rule is sent. In some embodiments, the selected automation rule is sent to a server for sharing with the public. In some embodiments, the selected automation rule is sent to a server for sharing with a predefined group of users (e.g., family members, friends, etc.). Optionally, selecting the affordance for sharing the automation rule initiates display of a user interface for selecting one or more recipients of the automation rule. In some embodiments, as shown in FIG. 5L, the user interface for sharing an automation rule includes one or more affordances to select whether to share the context of the automation rule (e.g., identification of particular devices or parameters of the automation rule).

FIG. 5M illustrates that, when the context is to be shared, one or more names of devices (e.g., "LIVINGROOM CAM" and "LIVINGROOM LIGHT"), device identifiers (e.g., "#2953ed45-a" and "139924da"), and one or more parameters (e.g., "PM10:00" and "AM07:00").

In comparison, FIG. 5N illustrates that, when the context is not to be shared, the names of devices and the parameters are replaced with generic names (e.g., "#Sensor" and "#actuator") and predefined names (e.g., field names, such as "#start_time" and "#end_time").

FIG. 5O illustrates that, in some embodiments, in response to detecting an error in an automation rule, a portion of the automation rule that corresponds to the detected error is visually distinguished. For example, when the actuator device that corresponds to the identified actor (e.g., "LIVINGROOM LIGHT") does not respond to a command from the server, the name of the actor is visually distinguished in the user interface. In some embodiments, additional information (e.g., the type of the error or the reason of the error) for the error is also provided in the user interface, as shown in FIG. 5O.

FIG. 6A is a block diagram illustrating an exemplary structure of device data in accordance with some embodiments.

In FIG. 6A, a respective entry in the device data includes a device identifier (e.g., 612-1), a device name (e.g., 614-1), and optionally a device type (e.g., 616-1) and/or a device location (e.g., 618-2). In FIG. 6A, another entry in the device data also includes a device identifier (e.g., 612-2), a device name (e.g., 614-2), and optionally a device type (e.g., 616-2) and/or a device location (e.g., 618-2). Although FIG. 6A shows the device data containing two entries, the device data can include additional entries not shown in FIG. 6A. In addition, the device data may include a subset or a superset of fields shown in FIG. 6A.

Device identifier 612 uniquely identifies a corresponding device. For example, device identifier 612 is a number, a string, or a series of numbers or strings that uniquely identifies the corresponding device (e.g., a media control address, which is also called a physical address).

Device name 614 is a name that is presented in a user interface of client 102 (e.g., "LIVINGROOM CAM") for the corresponding device. In some embodiments, device name 614 is configurable by a user (e.g., a user can change the device name).

Device type 616 identifies a type of the corresponding device (e.g., an IP camera, a motion sensor, a push actuator device, etc.).

Device location 618 identifies a location of the corresponding device. In some embodiments, device location 618 includes a global positioning system coordinate. In some embodiments, device location 618 includes a location provided by a user (e.g., "Living room").

FIG. 6B is a block diagram illustrating an exemplary structure of rule data in accordance with some embodiments.

In FIG. 6B, a respective entry in the rule data includes a rule identifier (e.g., 622-1), a number of conditions provided in the rule (e.g., 624-1), one or more condition pointers (e.g., 626-1), a number of actions provided in the rule (e.g., 628-1), and one or more action pointers (e.g., 630-1). In FIG. 6B, another entry in the rule data includes a rule identifier (e.g., 622-2), a number of conditions provided in the rule (e.g., 624-2), one or more condition pointers (e.g., 626-2), a number of actions provided in the rule (e.g., 628-2), and one or more action pointers (e.g., 630-2). Although FIG. 6B shows the rule data containing two entries, the rule data can include additional entries not shown in FIG. 6B. In addition, the rule data may include a subset or a superset of fields shown in FIG. 6B.

Rule identifier 622 uniquely identifies a corresponding rule. For example, rule identifier 622 is a number, a string, or a series of numbers or strings that uniquely identifies the corresponding rule.

The number of conditions 624, if included, indicates a number of conditions in the corresponding rule. In some embodiments, the number of conditions 624 indicates a number of condition pointers 626 in each entry.

Condition pointer 626 identifies respective conditions associated with the corresponding rule. In some embodiments, condition pointer 626 includes condition identifiers of associated conditions. Alternatively, condition pointer 626 includes pointers to memory or database locations where associated conditions are located.

The number of actions 628, if included, indicates a number of actions in the corresponding rule. In some embodiments, the number of actions 628 indicates a number of action pointers 626 in each entry.

Action pointer 630 identifies respective actions associated with the corresponding rule. In some embodiments, action pointer 630 includes action identifiers of associated actions. Alternatively, action pointer 630 includes pointers to memory or database locations where associated actions are located.

FIG. 6C is a block diagram illustrating an exemplary structure of condition data in accordance with some embodiments.

In FIG. 6C, a respective entry in the condition data includes a condition identifier (e.g., 632-1), a source type (e.g., 634-1), a device identifier (e.g., 636-1), a condition type (e.g., 638-1), and/or parameters (e.g., 640-1). In FIG. 6C, another entry in the condition data also includes a condition identifier (e.g., 632-2), a source type (e.g., 634-2), a device identifier (e.g., 636-2), a condition type (e.g., 638-2), and/or parameters 640-2. Although FIG. 6C shows the condition data containing two entries, the condition data can include additional entries not shown in FIG. 6C. In addition, the condition data may include a subset or a superset of fields shown in FIG. 6C.

Condition identifier 632 uniquely identifies a corresponding condition. For example, condition identifier 632 is a number, a string, or a series of numbers or strings that uniquely identifies the corresponding condition.

Source type 634, if included, indicates whether the source of the condition event is a software application or a sensor.

In some embodiments, device identifier 636 indicates a source device (e.g., a sensor) that provides an event for the corresponding condition. For example, device identifier 636 corresponds to an IP camera, when the condition requires the camera to detect motion.

In some embodiments, a software application identifier is used in place of device identifier 636 when the source type is a software application. For example, the software application identifier corresponds to a messenger application when the condition requires the messenger application to receive a message.

Condition type 638 indicates types of required operations associated with the source device. For example, condition type 638 for an IP camera may indicate that the IP camera needs to detect motion to satisfy the condition.

Parameters 640 indicate additional parameters for the corresponding condition. For example, parameters 640 may indicate a range of time for the condition to be satisfied (e.g., between 10 pm and 7 am, so that the condition is satisfied only when the IP camera detects motion between 10 pm and 7 am).

FIG. 6D is a block diagram illustrating an exemplary structure of action data in accordance with some embodiments.

In FIG. 6D, a respective entry in the action data includes an action identifier (e.g., 642-1), an actor type (e.g., 644-1), a device identifier (e.g., 646-1), an action type (e.g., 648-1), and/or parameters (e.g., 650-1). In FIG. 6D, another entry in the action data also includes an action identifier (e.g., 642-2), an actor type (e.g., 644-2), a device identifier (e.g., 646-2), an action type (e.g., 648-2), and/or parameters (e.g., 650-2). Although FIG. 6D shows the action data containing two entries, the action data can include additional entries not shown in FIG. 6D. In addition, the action data may include a subset or a superset of fields shown in FIG. 6D.

Action identifier 642 uniquely identifies a corresponding action. For example, action identifier 642 is a number, a string, or a series of numbers or strings that uniquely identifies the corresponding action.

Actor type 644, if included, indicates whether the actor of the action is a software application or an actuator.

In some embodiments, device identifier 646 indicates an actuator will perform the corresponding action (e.g., an actuator device, such as a push actuator device shown in FIG. 4C).

In some embodiments, a software application identifier is used in place of device identifier 646 when the actor type is a software application. For example, the software application identifier corresponds to a messenger application when the action requires the messenger application to send a message.

Action type 648 indicates types of required actions by the actuator. For example, action type 648 for an actuator device may indicate that the actuator device needs to push on a switch (or turning on a switch).

Parameters 650 indicate additional parameters for the corresponding condition. For example, parameters 650 may indicate an email address of a message recipient.

Figure 7A:
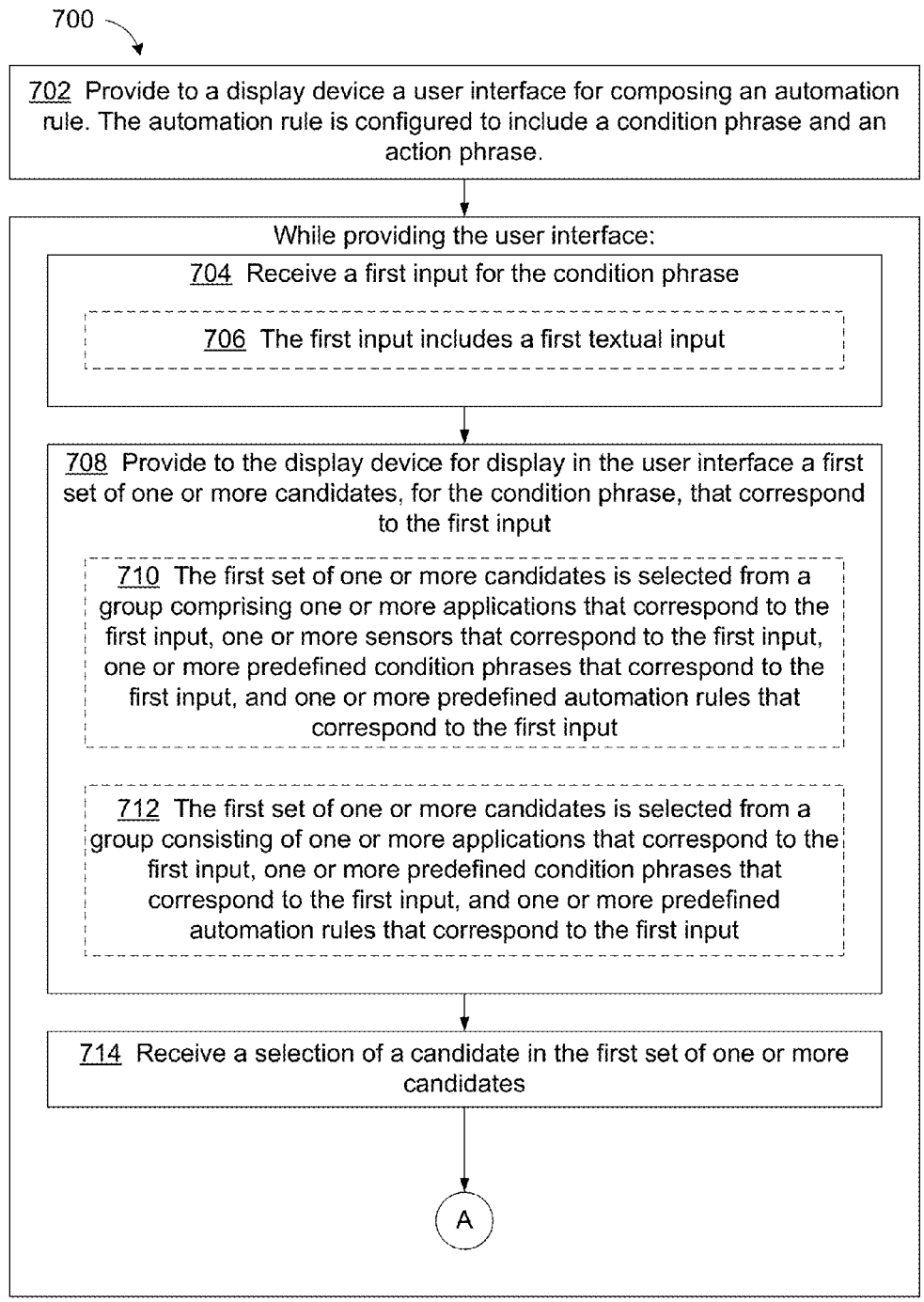
Figure 7B:
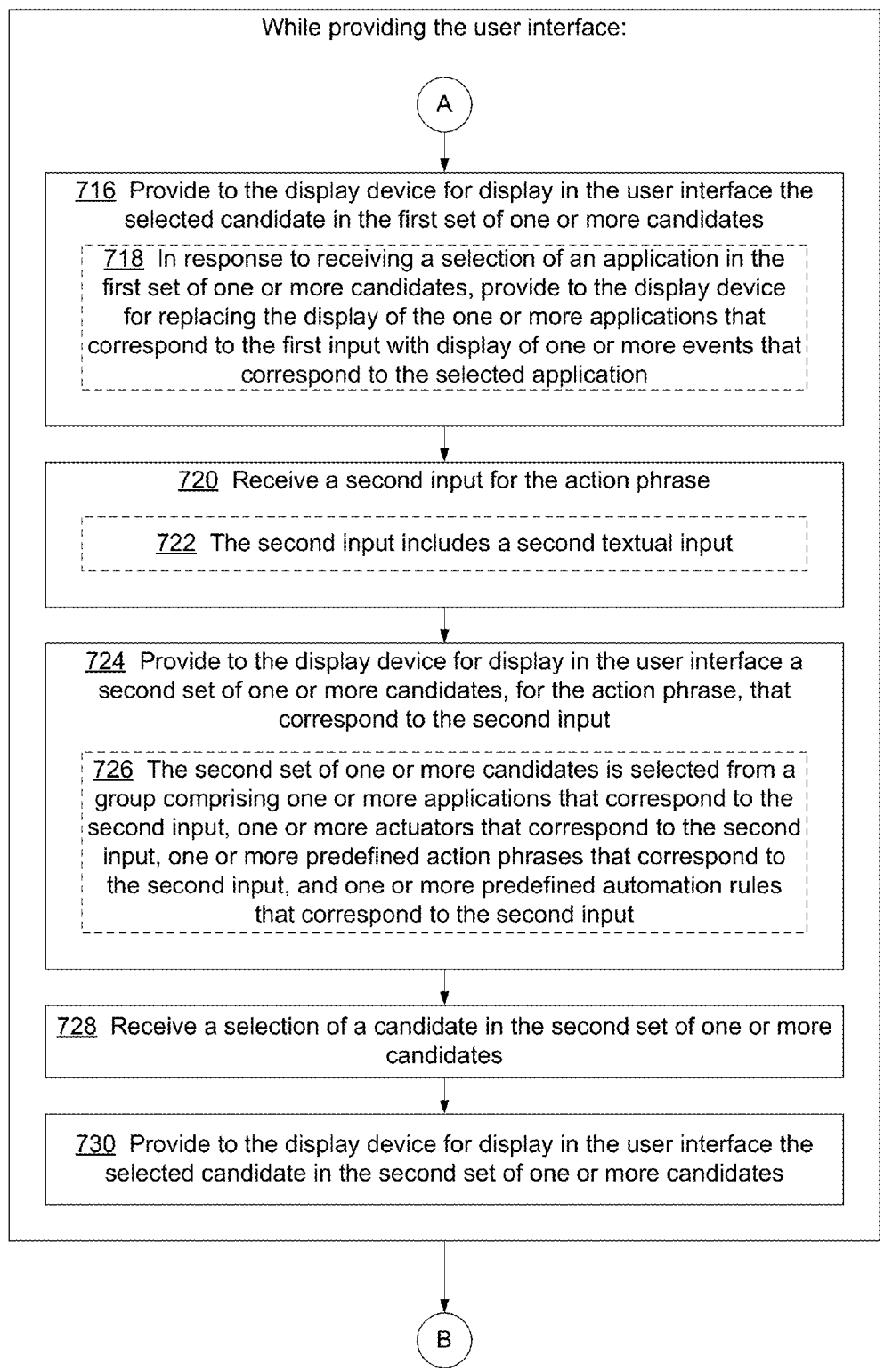

FIGS. 7A-7C are flowcharts representing method 700 of providing an automation rule in accordance with some embodiments.

Method 700 is performed at an electronic device (e.g., server 104) with one or more processors and memory coupled with a display device (e.g., client 102). In some embodiments, method 700 is performed at client 102 coupled with a touch-sensitive display. In some embodiments, method 700 is performed at client 102 coupled with a display and a separate touch-sensitive surface or a keyboard.

The electronic device provides (702) to the display device a user interface for composing an automation rule (e.g., the user interface illustrated in FIG. 5B). The automation rule is configured to include a condition phrase and an action phrase.

While providing the user interface, the electronic device receives (704) a first input for the condition phrase (e.g., a user types text "CAM" using a virtual keyboard displayed on display device 301 as shown in FIG. 5C).

In some embodiments, the first input includes (706) a first textual input (e.g., text "CAM" shown in FIG. 5C).

The electronic device provides (708) to the display device for display in the user interface a first set of one or more candidates, for the condition phrase, that correspond to the first input (e.g., the user interface in FIG. 5C includes one or more sensors, such as "LIVINGROOM CAM," one or more predefined conditions, such as "LIVINGROOM CAM detects motion," and one or more automation rules, such as "When LIVINGROOM CAM detects motion, SEND a message via EFGH MAIL" that correspond to the typed text "CAM.").

In some embodiments, the first set of one or more candidates is selected (710) from a group comprising one or more applications that correspond to the first input, one or more sensors that correspond to the first input, one or more predefined condition phrases that correspond to the first input, and one or more predefined automation rules that correspond to the first input. In some embodiments, the group includes one or more entries other than the one or more applications that correspond to the first input, the one or more sensors that correspond to the first input, the one or more predefined condition phrases that correspond to the first input, and the one or more predefined automation rules that correspond to the first input.

In some embodiments, the first set of one or more candidates is selected from a group consisting of one or more applications that correspond to the first input, one or more sensors that correspond to the first input, one or more predefined condition phrases that correspond to the first input, and one or more predefined automation rules that correspond to the first input. For example, the group includes no entries other than the one or more applications that correspond to the first input, the one or more sensors that correspond to the first input, the one or more predefined condition phrases that correspond to the first input, and the one or more predefined automation rules that correspond to the first input.

In some embodiments, the first set of one or more candidates is selected (712) from a group consisting of one or more applications that correspond to the first input, one or more predefined condition phrases that correspond to the first input, and one or more predefined automation rules that correspond to the first input.

In some embodiments, the electronic device automatically selects the first set of one or more candidates independent of user inputs other than the first input, and provides to the display device for display in the user interface the first set of one or more candidates. In some embodiments, the electronic device has access to a database of candidates (e.g., automation rules 250 in FIG. 2), and retrieves, from the database, candidates that correspond to the first input.

The electronic device receives (714) a selection of a candidate in the first set of one or more candidates (e.g., in FIG. 5D, the electronic device detects tap gesture 507, which corresponds to a predefined condition phrase "LIVING-ROOM CAM detects motion").

The electronic device provides (716, FIG. 7B) to the display device for display in the user interface the selected candidate in the first set of one or more candidates (e.g., in FIG. 5E, the selected condition phrase "LIVINGROOM CAM detects motion" is displayed in the text input box).

In some embodiments, the electronic device, in response to receiving a selection of an application in the first set of one or more candidates, provides (718) to the display device for replacing the display of the one or more applications that correspond to the first input with display of one or more events that correspond to the selected application. For example, when an e-mail application is selected, the display of the one or more applications that correspond to the first input is replaced with display of one or more events that correspond to the selected e-mail application (e.g., receiving an e-mail with the selected e-mail application).

The electronic device receives (720) a second input for the action phrase (e.g., one or more characters may be entered into the text input box using a virtual keyboard).

In some embodiments, the second input includes (722) a second textual input.

The electronic device provides (724) to the display device for display in the user interface a second set of one or more candidates, for the action phrase, that correspond to the second input.

In some embodiments, the second set of one or more candidates is selected (726) from a group comprising one or more applications that correspond to the second input, one or more actuators that correspond to the second input, one or more predefined action phrases that correspond to the second input, and one or more predefined automation rules that correspond to the second input.

In some embodiments, the second set of one or more candidates is selected from a group consisting of one or more applications that correspond to the second input, one or more actuators that correspond to the second input, one or more predefined action phrases that correspond to the second input, and one or more predefined automation rules that correspond to the second input.

In some embodiments, the second set of one or more candidates is selected from a group consisting of one or more applications that correspond to the second input, one or more actuators that correspond to the second input, and one or more predefined action phrases that correspond to the second input.

In some embodiments, the electronic device automatically selects the second set of one or more candidates independent of user inputs other than the second input, and provides to the display device for display in the user interface the second set of one or more candidates. In some embodiments, the electronic device has access to a database of candidates (e.g., automation rules 250 in FIG. 2), and retrieves, from the database, candidates that correspond to the second input.

The electronic device receives (728) a selection of a candidate in the second set of one or more candidates (e.g., in FIG. 5G, the electronic device detects tap gesture 513, which corresponds to a predefined action phrase "turn on LIVINGROOM LIGHT").

The electronic device provides (730) to the display device for display in the user interface the selected candidate in the second set of one or more candidates (e.g., in FIG. 5H, the selected condition phrase "LIVINGROOM CAM detects motion" is displayed in the text input box).

In some embodiments, the electronic device, in response to receiving a selection of an application in the second set of one or more candidates, provides to the display device for replacing the display of the one or more applications that correspond to the second input with display of one or more events that correspond to the selected application.

The electronic device stores (732, FIG. 7C) the automation rule that includes the selected candidate in the first set of one or more candidates in the condition phrase and the selected in the second set of one or more candidates in the action phrase (e.g., the automation rule includes "LIVINGROOM CAM detects motion from 10 pm to 7 am" as the condition phrase and "turn on LIVINGROOM LIGHT" as the action phrase).

In some embodiments, the electronic device executes (734) an action defined in the action phrase of the automation rule in accordance with a determination that a condition defined in the condition phrase of the automation rule is satisfied. For example, the electronic device monitors the LIVINGROOM CAM (e.g., a camera positioned in the living room or a camera labeled "LIVINGROOM CAM") from 10 pm and 7 am for motion, and if a motion is detected by the LIVINGROOM CAM from 10 pm and 7 am, turns on the LIVINGROOM LIGHT (e.g., a light positioned in the living room or a light labeled "LIVINGROOM LIGHT").

In some embodiments, the electronic device, in response to detecting an error in the condition phrase and/or the action phrase in the automation rule, provides (736) to the display device for display the stored automation rule. One or more portions of the stored automation rule that correspond to the detected error are visually distinguished. For example, as shown in FIG. 5O, the electronic device displays an error message "Actuator not responding." In addition, a portion of the stored automation rule, "LIVINGROOM LIGHT," associated with the error message is highlighted.

In some embodiments, the condition phrase of the automation rule identifies (738) one or more sensors, and the electronic device receives one or more inputs from the one or more sensors identified in the condition phrase of the automation rule (e.g., when the condition phrase includes "LIVINGROOM CAM," the electronic device receives information from the LIVINGROOM CAM).

In some embodiments, the action phrase of the automation rule identifies (740) one or more actuators, and the electronic device conditionally activates the one or more actuators (e.g., when the action phrase identifies "LIVINGROOM LIGHT," the electronic device activates the LIVINGROOM LIGHT when the condition specified in the condition phrase is satisfied).

Figure 8:
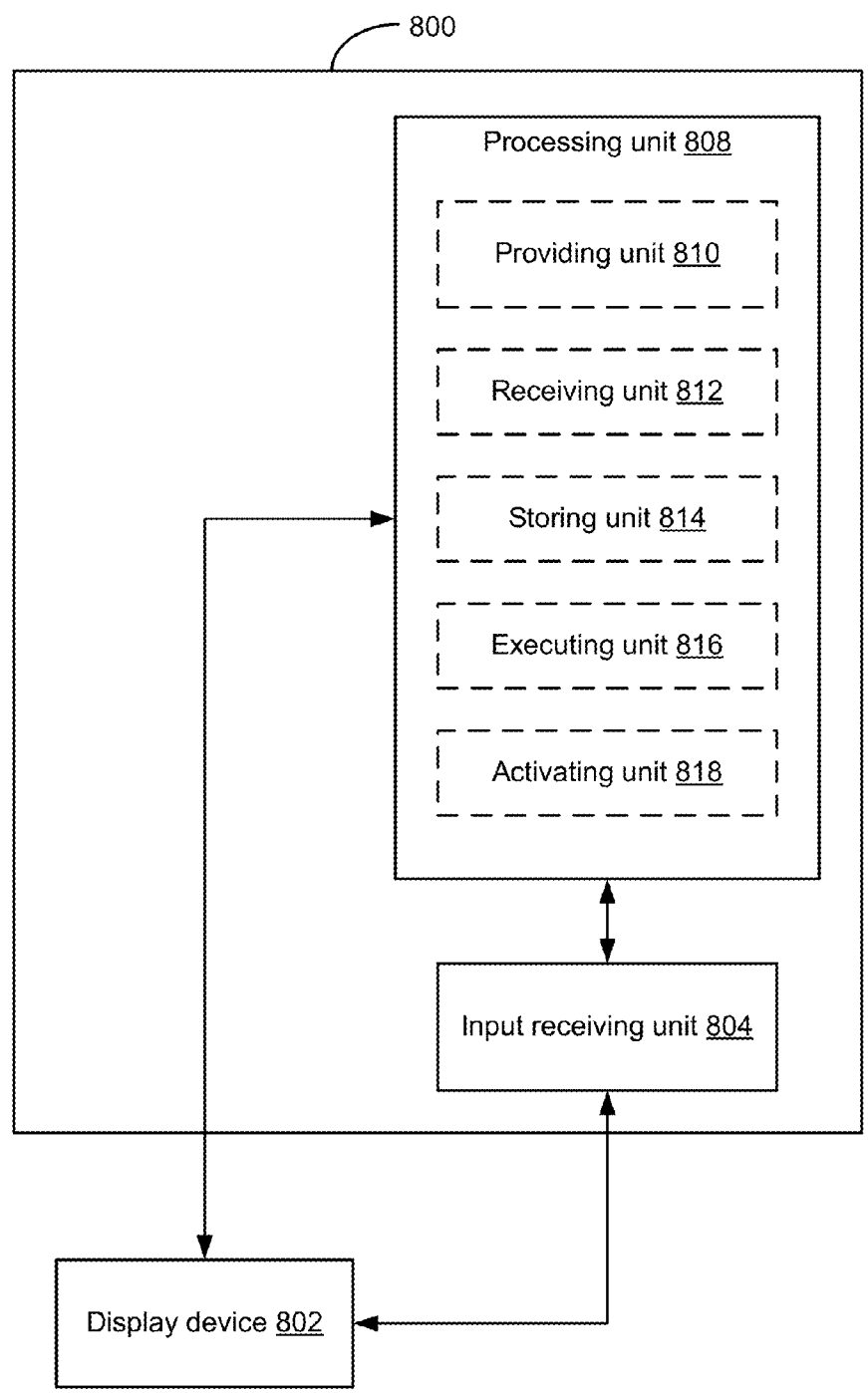
FIG. 8 is a block diagram illustrating an electronic device in accordance with some embodiments.

FIG. 8 is a block diagram illustrating an electronic device in accordance with some embodiments. FIG. 8 shows a functional block diagram of electronic device 800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, electronic device 800 includes input receiving unit 804 configured to receive user selections, and processing unit 808 coupled with display unit 802 and input receiving unit 804. In some embodiments, electronic device 800 includes display device 802. In some other embodiments, display device 802 is located outside electronic device 800 (e.g., display device 802 is located independent of electronic device 800). In some embodiments, processing unit 808 includes providing unit 810, receiving unit 812, storing unit 814, executing unit 816, and activating unit 818.

Processing unit 808 is configured to provide to display device 802 a user interface for composing an automation rule (e.g., with providing unit 810). The automation rule is configured to include a condition phrase and an action phrase.

Processing unit 808 is also configured to, while providing the user interface, receive a first input for the condition phrase (e.g., with input receiving unit 804 and/or receiving unit 812); provide to display device 802 for display in the user interface a first set of one or more candidates, for the condition phrase, that correspond to the first input (e.g., with providing unit 810); receive a selection of a candidate in the first set of one or more candidates (e.g., with input receiving unit 804 and/or receiving unit 812); provide to display device 802 for display in the user interface the selected candidate in the first set of one or more candidates (e.g., with providing unit 810); receive a second input for the action phrase (e.g., with input receiving unit 804 and/or receiving unit 812); provide to display device 802 for display in the user interface a second set of one or more candidates, for the action phrase, that correspond to the second input (e.g., with providing unit 810); receive a selection of a candidate in the second set of one or more candidates (e.g., with input receiving unit 804 and/or receiving unit 812); and provide to display device 802 for display in the user interface the selected candidate in the second set of one or more candidates (e.g., with providing unit 810).

Processing unit 808 is further configured to store the automation rule that includes the selected candidate in the first set of one or more candidates in the condition phrase and the selected in the second set of one or more candidates in the action phrase (e.g., with storing unit 814).

In some embodiments, processing unit 808 is configured to execute an action defined in the action phrase of the automation rule in accordance with a determination that a condition defined in the condition phrase of the automation rule is satisfied (e.g., with executing unit 816).

In some embodiments, processing unit 808 is configured to, in response to detecting an error in the condition phrase and/or the action phrase in the automation rule, provide to display device 802 for display the stored automation rule. One or more portions of the stored automation rule that correspond to the detected error are visually distinguished (e.g., with providing unit 810).

In some embodiments, the condition phrase of the automation rule identifies one or more sensors, and processing unit 808 is configured to receive one or more inputs from the one or more sensors identified in the condition phrase of the automation rule (e.g., with input receiving unit 804 and/or receiving unit 812).

In some embodiments, the action phrase of the automation rule identifies one or more actuators, and processing unit 808 is configured to conditionally activate the one or more actuators (e.g., with activating unit 818).

In some embodiments, the first input includes a first textual input.

In some embodiments, the first set of one or more candidates is selected from a group comprising one or more applications that correspond to the first input, one or more sensors that correspond to the first input, one or more predefined condition phrases that correspond to the first input, and one or more predefined automation rules that correspond to the first input.

In some embodiments, the first set of one or more candidates is selected from a group consisting of one or more applications that correspond to the first input, one or more predefined condition phrases that correspond to the first input, and one or more predefined automation rules that correspond to the first input.

In some embodiments, processing unit 808 is configured to, in response to receiving a selection of an application in the first set of one or more candidates, provide to display device 802 for replacing the display of the one or more applications that correspond to the first input with display of one or more sensors that correspond to the selected application (e.g., with providing unit 810).

In some embodiments, the second input includes a second textual input.

In some embodiments, the second set of one or more candidates is selected from a group comprising one or more applications that correspond to the second input, one or more actuators that correspond to the second input, one or more predefined action phrases that correspond to the second input, and one or more predefined automation rules that correspond to the second input.

Figure 9A:
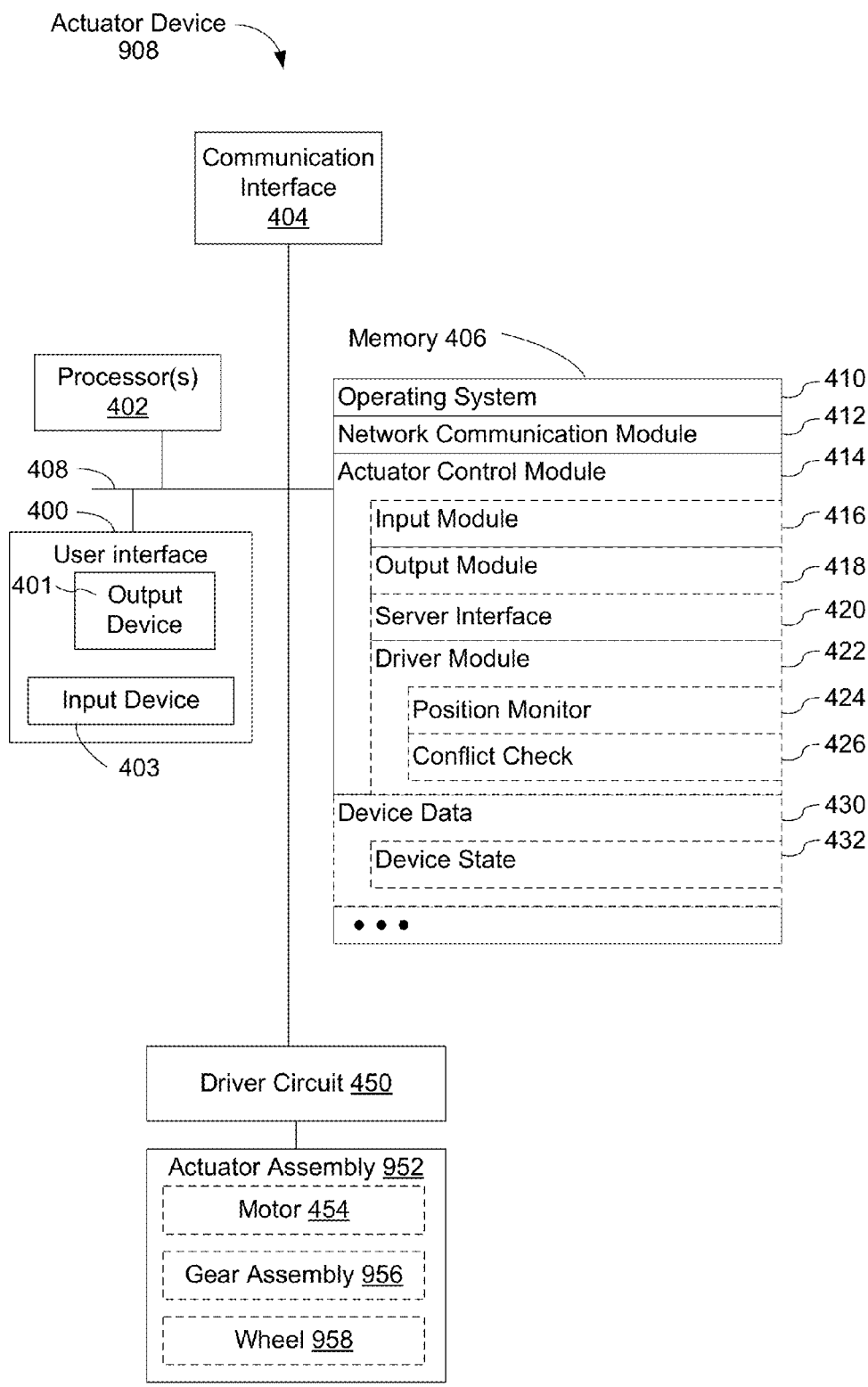
FIG. 9A is a block diagram illustrating an actuator device in accordance with some embodiments.

FIG. 9A is a block diagram illustrating actuator device 908 in accordance with some embodiments. Actuator device 908 is similar to actuator device 408 described above with respect to FIG. 4A. Description of components described above with respect to FIG. 4A is not repeated herein for brevity.

Actuator device 908 differs from actuator device 108 (e.g., FIG. 4A) at least in that:
  driver circuit 450 is configured to activate actuator assembly 952; and
  actuator assembly 452 includes motor 454, gear assembly 956, wheel 958, or a subset or superset thereof.

In some embodiments, device state 432 includes information representing the state of actuator device (e.g., last time of activating actuator assembly 452 and/or a position of wheel 958).

In some embodiments, position monitor 424 is configured to monitor a position of wheel 958 (e.g., by using a separate sensor, such as a rotary encoder, monitoring a current load on motor 454, and/or counting a number of pulses provided to motor 454 when motor 454 is a stepper motor). In some embodiments, when a rotary encoder is included in actuator device 908, the rotary encode is integrated with motor 454.

In some embodiments, in response to one or more instructions from driver module 422, driver circuit 450 provides electrical power to actuator assembly 952 (e.g., in particular, motor 454 in actuator assembly 952). Motor 454 rotates gears in gear assembly 956, which rotates wheel 958. In response to an instruction from driver module 422 to rotate wheel 958 clockwise, driver circuit 450 provides electrical power in a first polarity, which causes motor 454 to rotate in a first direction (e.g., clockwise) to rotate wheel 958 clockwise. In response to an instruction from driver module 422 to rotate wheel 958 counterclockwise, driver circuit 450 provides electrical power in a second polarity that is distinct from the first polarity, which causes motor 454 to rotate in a second direction (e.g., counterclockwise) that is opposite to the first direction to rotate wheel 958 counterclockwise. In response to an instruction from driver module 422 to rotate a rotary control knob counterclockwise, driver circuit 450 provides electrical power in the first polarity, which causes motor 454 to rotate in the first direction (e.g., clockwise) to rotate wheel 958 clockwise (which, in turn, rotates the rotary control knob counterclockwise). In response to an instruction from driver module 422 to rotate the rotary control knob clockwise, driver circuit 450 provides electrical power in the second polarity, which causes motor 454 to rotate in the second direction (e.g., counterclockwise) to rotate wheel 958 counterclockwise (which, in turn, rotates the rotary control knob clockwise).

In some embodiments, driver circuit 450 monitors its current load, which is, in some embodiments, used by position monitor 424 and/or driver circuit 450 to determine whether wheel 958 has reached a terminal position. In some embodiments, driver circuit 450 and/or position monitor 424 ceases to provide power to actuator assembly 452 based on its current load (e.g., based on a determination that wheel 958 has reached a terminal position).

In some embodiments, input device 403 includes two push buttons. Actuator device 908 is configured to rotate wheel 958 clockwise in response to pressing of a first push button of the two push buttons, and rotate wheel 958 counterclockwise in response to pressing of a second push button, distinct from the first push button, of the two push buttons.

Figure 9B:
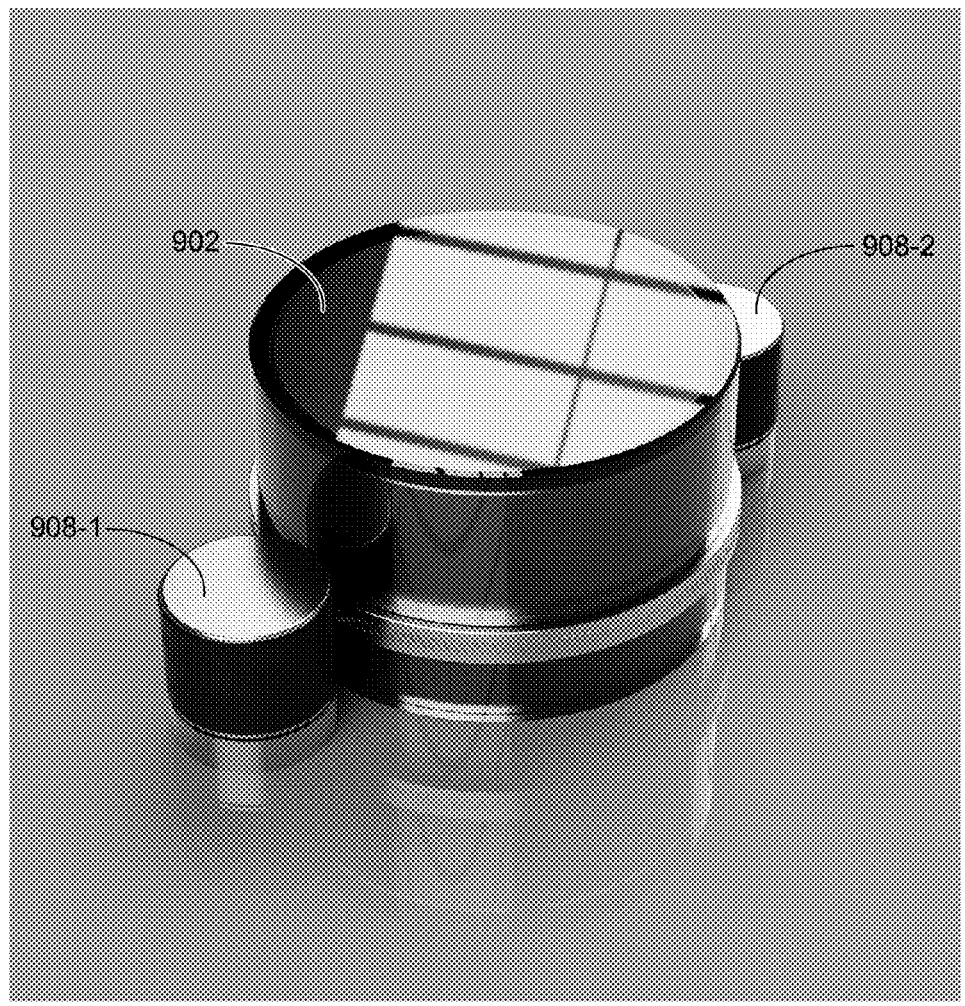
FIG. 9B illustrates actuator devices mounted adjacent to a rotary control knob in accordance with some embodiments.

FIG. 9B illustrates actuator devices 908-1 and 908-2 mounted adjacent to rotary control knob 902 in accordance with some embodiments. Exemplary rotary control knobs 902 include rotary volume control knobs, rotary light control knobs, rotary temperature control knobs, door knobs, and door locks.

In some embodiments, more or fewer actuator devices 908 (e.g., only one actuator device 908-1 or three or four actuator devices 908) are mounted adjacent to rotary control knob 902. The use of multiple actuator devices 908 allows the multiple actuator devices 908 to press on the side of rotary control knob 902, thereby increasing the force applied on rotary control knob 902. This is useful when rotary control knob 902 requires a force, higher than what a single actuator device can provide (e.g., due to the motor and/or the gear assembly within the single actuator device, and/or a mounting mechanism, such as a double-sided tape), to rotate.

In some embodiments, when multiple actuator devices 908 (e.g., actuator devices 908-1 and 908-2) are mounted adjacent to rotary control knob 902, the multiple actuator devices 908 are configured to concurrently rotate rotary control knob 902 (e.g., wheels of the multiple actuator devices 908 rotate concurrently). In some embodiments, when wheels of the multiple actuator devices 908 rotate concurrently, the wheels of the multiple actuator devices 908 rotate in a same direction. In some embodiments, multiple actuator devices 908 are configured to prevent activation of one, or less than all, of the multiple actuator devices 908 mounted adjacent to rotary control knob 902.

In some embodiments, each actuator device 908 (e.g., actuator device 908-1 and actuator device 908-2) includes a separate communication circuit, as shown in FIG. 9A (e.g., actuator device 908-1 includes a first communication circuit, a first actuator, and a first set of one or more processors, and actuator device 908-2 includes a second communication circuit that is distinct from the first communication circuit, a second actuator, and a second set of one or more processors).

In some embodiments, actuator devices 908 (e.g., actuator devices 908-1 and 908-2) are removably mounted adjacent to rotary control knob (e.g., with one or more adhesive tapes, such as double-sided foam tapes). This facilitates easy installation and removal of actuator devices 908.

In some embodiments, actuator devices 908-1 and 908-2 are mounted adjacent to rotary control knob 902 so that wheels of actuator devices 908-1 and 908-2 are in contact with rotary control knob 902.

Figure 9C:
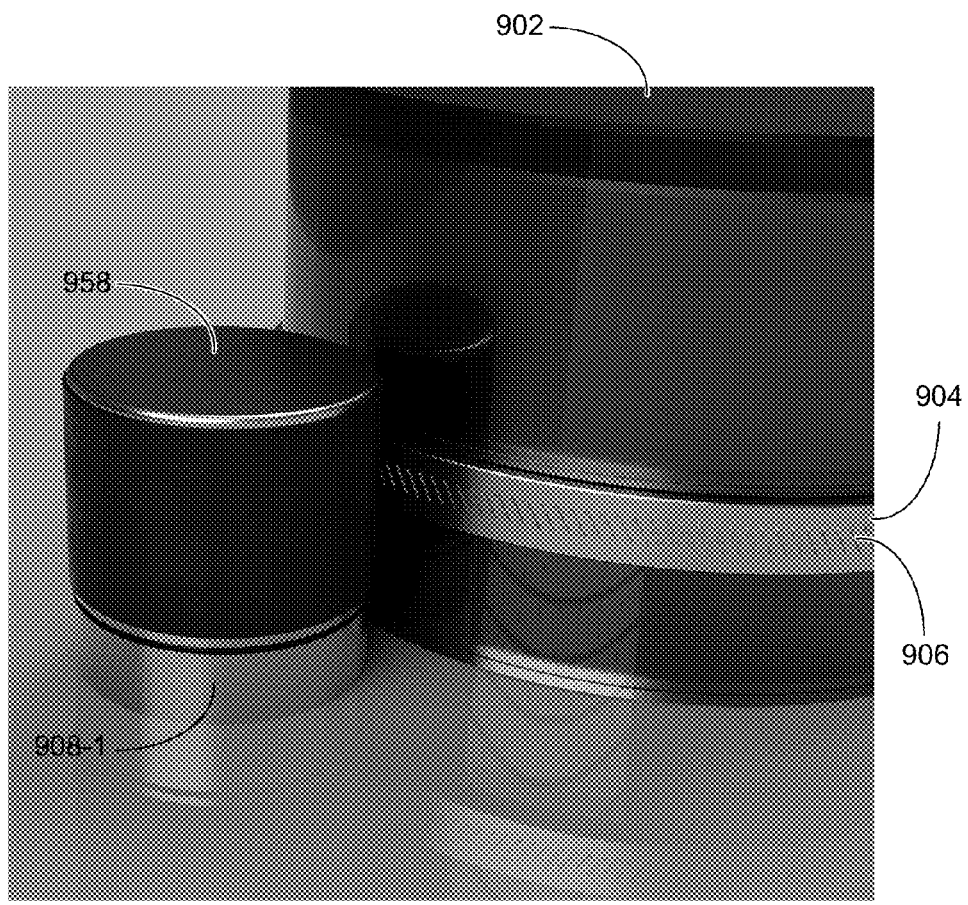
FIG. 9C is a zoomed-in view of the actuator device and the rotary control knob shown in FIG. 9B.

FIG. 9C is a zoomed-in view of actuator device 908-1 and rotary control knob 902 shown in FIG. 9B.

In some embodiments, rotary control knob 902 includes band 904 to increase friction between rotary control knob 902 and wheel 958 of actuator device 908-1. This reduces slipping between rotary control knob 902 and wheel 958 of actuator device 908-1 (e.g., it facilitates rotation of rotary control knob 902 in accordance with rotation of wheel 958 so that a linear speed of rotary control knob 902 at a contact point of rotary control knob 902 and wheel 958 corresponds to a linear speed of wheel 958 at the contact point of rotary control knob 902 and wheel 958).

In some embodiments, rotary control knob 902 includes indentations 906 to increase friction between rotary control knob 902 and wheel 958 of actuator device 908-1. In some embodiments, indentations 906 are included in band 904 of rotary control knob 902, as shown in FIG. 9C.

In some embodiments, wheel 958 includes indentations to increase friction between rotary control knob 902 and wheel 958 of actuator device 908-1. In some embodiments, both wheel 958 and rotary control knob 902 have indentations. In some embodiments, indentations of wheel 958 are configured to mate with indentations 906 of rotary control knob 902 (e.g., indentations of wheel 958 and indentations 906 of rotary control knob 902 have gear teeth).

Figure 9D:
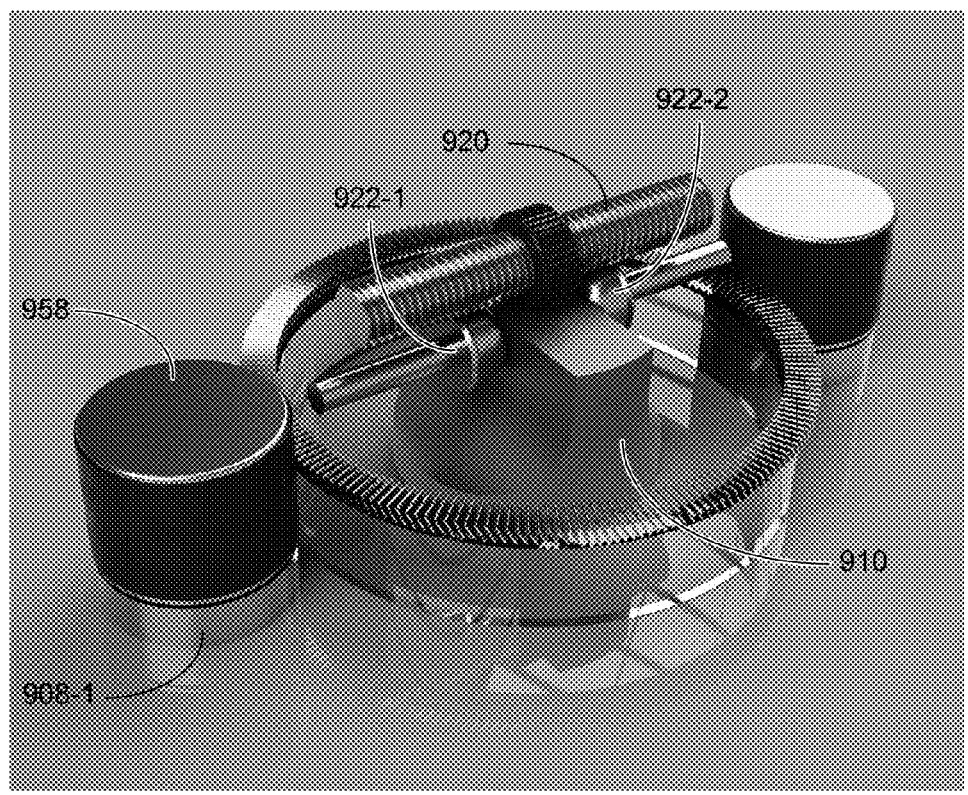
FIG. 9D illustrates components of a rotary control knob cover in accordance with some embodiments.

FIG. 9D illustrates components of a rotary control knob cover in accordance with some embodiments. When a rotary control knob (e.g., rotary control knob 910) is small or has a non-cylindrical shape or has a small side surface for contact with wheel 958 of actuator device 9098-1, a rotary control knob cover can be used to facilitate rotation of the rotary control knob with rotation of wheel 958.

As shown in FIG. 9D, the rotary control knob cover includes clamp 920 that is configured for clamping on the rotary control knob (e.g., rotary control knob 910). Clamp 920 includes two or more fingers or pressure pads 922-1 and 922-2 for holding the rotary control knob. In some embodiments, pressure pads 922-1 and 922-2 are pressed against the rotary control knob with a screw swivel of clamp 920 (e.g., a rotation of a screw pulls pressure pad 922-1 toward pressure pad 922-2 and both pressure pad 922-1 and pressure pad 922-2 press on a portion of the rotary control knob located between pressure pad 922-1 and pressure pad 922-2, as shown in FIG. 9D). In some embodiments, pressure pads 922-1 and 922-2 are pressed against the rotary control knob with one or more magnets. In some embodiments, pressure pads 922-1 and 922-2 are pressed against the rotary control knob with one or more springs. Clamp 920 is coupled with the rotary control knob cover so that a rotation of the rotary control knob cover rotates the rotary control knob (e.g., a clockwise rotation of the rotary control knob cover rotates the rotary control knob clockwise, and a counterclockwise rotation of the rotary control knob cover rotates the rotary control knob counterclockwise). In some embodiments, the rotary control knob cover has a shape of cylinder, similar to rotary control knob 902 shown in FIG. 9B. In some embodiments, the rotary control knob cover includes a portion that has a shape of cylinder.

Details of the actuator devices described above with respect to FIGS. 4A-4K are also applicable in an analogous manner to the actuator devices described above with respect to FIGS. 9A-9H. For example, the mounting of actuator devices, input devices, and motors described above with respect to FIGS. 9A-9H have one or more characteristics of the mounting of actuator devices, input devices, and motors described herein with respect to FIGS. 4A-4K. For brevity, these details are not repeated herein.

Figure 9E:
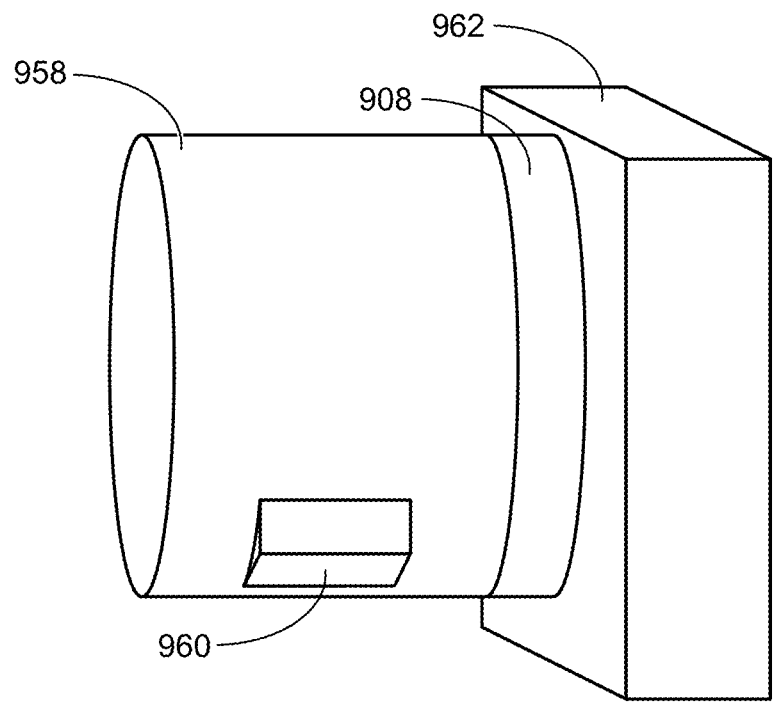
FIG. 9E illustrates an actuator device attached on a mounting plate in accordance with some embodiments.

FIG. 9E illustrates actuator device 908 attached on mounting plate 962 in accordance with some embodiments. Wheel 958 has one or more indentations 960 (e.g., a protrusion and/or a recess) for turning on or off a rocker switch (or a toggle switch). Mounting plate 962 allows a placement of actuator device 908 in a particular orientation so that a rotational axis of actuator device 908 is substantially parallel to a rotational axis of a rocker switch (or a toggle switch) (e.g., an angle between the rotational axis of actuator device 908 and the rotational axis of the rocker switch is 30 degrees, 20 degrees, 15 degrees, 10 degrees, or 5 degrees).

Figure 9F:
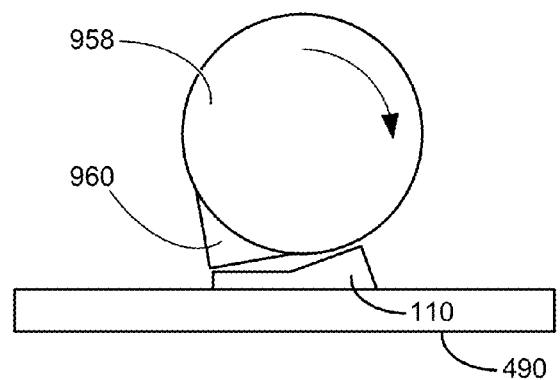
FIGS. 9F-9H illustrate actuator devices mounted adjacent to a rocker switch in accordance with some embodiments.
Figure 9G:
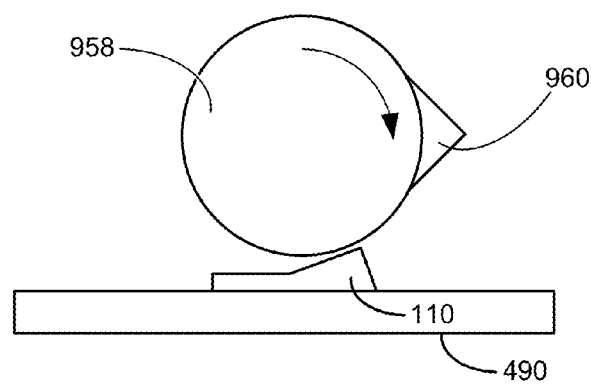
Figure 9H:
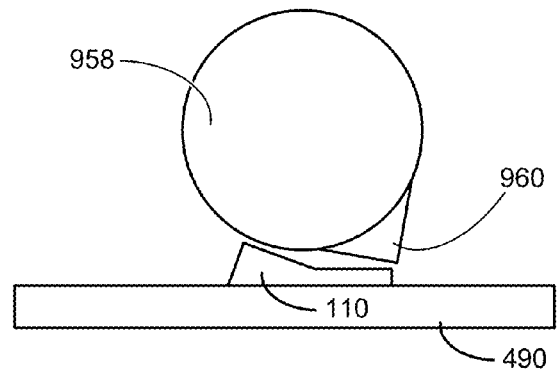

FIGS. 9F-9H illustrate actuator devices mounted adjacent to a rocker switch in accordance with some embodiments.

FIG. 9F illustrates that actuator 958 is at a first position where indentation 960 is in contact with rocker switch 110 so that rocker switch 110 is in a first state (e.g., an "on" state). FIG. 9F also illustrates that actuator 958 starts to rotate (e.g., clockwise, as indicated by the curved arrow).

FIG. 9G illustrates that actuator 958 is in a second position that is distinct from the first position. For example, the second position reflects a clockwise rotation of actuator 958 from the first position shown in FIG. 9F. FIG. 9G also illustrates that actuator 958 continues to rotate (e.g., clockwise, as indicated by the curved arrow).

FIG. 9H illustrates that actuator 958 is in a third position that is distinct from the first position and the second position. For example, the third position reflects a clockwise rotation of actuator 958 from the second position shown in FIG. 9G. FIG. 9H also illustrates that, while actuator 958 is in the third position, indentation 960 is in contact with rocker switch 110 so that rocker switch 110 changes its state from the first state to a second state that is distinct from the first state (e.g., an "off" state). FIG. 9H further illustrates that actuator 958 has ceased to rotate (e.g., as indicated by the absence of a curved arrow).

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the principles of the various described embodiments and their practical applications, to thereby enable others skilled in the art to best utilize the invention and the various described embodiments with various modifications as are suited to the particular use contemplated.

What is claimed is:

1. An apparatus, comprising:
   communication circuit;
   an actuator electrically coupled with the communication circuit; and
   a rotatable switch engagement component mechanically coupled with the actuator;
   wherein:
   the apparatus is configured for mounting adjacent to a switch;
   the communication circuit is configured to activate the actuator in response to one or more instructions received by the communication circuit; and
   the actuator is configured to rotate the switch engagement component; and
   whereby rotating the switch engagement component while the switch is in a first state places the switch in a second state that is distinct from the first state,
   wherein the switch engagement component is configured to rotate about an axis from a first angular position to a second angular position to place the switch in the second state that is distinct from the first state, and a difference between the first angular position and the second angular position is at least 55 degrees.

2. The apparatus of claim 1, wherein:
   the switch engagement component has a non-cylindrical shape.

3. The apparatus of claim 1, wherein:
   the switch includes a moving part and a non-moving part; and
   the switch engagement component has one or more protrusions configured to come in contact with the moving part of the switch.

4. The apparatus of claim 1, wherein:
   the actuator is configured to:
   rotate the switch engagement component in a clockwise direction in response to a first signal from the communication circuit; and
   rotate the switch engagement component in a counter-clockwise direction in response to a second signal, distinct from the first signal, from the communication circuit.

5. The apparatus of claim 1, wherein:
   rotating the switch engagement component in a first direction while the switch is in the first state places the switch in the second state; and
   rotating the switch engagement component in a second direction that is opposite to the first direction while the switch is in the second state places the switch in the first state.

6. The apparatus of claim 1, wherein:
   the first state corresponds to an off state for the switch; and
   the second state corresponds to an on state for the switch.

7. The apparatus of claim 1, wherein the actuator includes a direct current motor.

8. The apparatus of claim 1, including a gear assembly coupled with the actuator and the switch engagement component and configured to rotate the switch engagement component.

9. The apparatus of claim 1, wherein:
   the apparatus is configured for mounting removably adjacent to the switch.

10. The apparatus of claim 1, wherein:
    the actuator is configured to cease rotation of the switch engagement component after the switch is placed in the second state.

11. The apparatus of claim 1, wherein the switch engagement component is positioned and configured to rotate about an axis that extends through the apparatus.

12. The apparatus of claim 1, wherein the actuator is distinct and separate from the switch engagement component.

13. A method, comprising:
    receiving, at communication circuit of an apparatus that includes a rotatable switch engagement component and an actuator electrically coupled with the communication circuit, and mechanically coupled with the switch engagement component, from an electronic device that is distinct and separate from the apparatus, one or more instructions to activate the actuator, the apparatus being mounted adjacent to a switch; and in response to receiving the one or more instructions to activate the actuator, activating the actuator and rotating the switch engagement component;

whereby rotating the switch engagement component while the switch is in a first state places the switch in a second state that is distinct from the first state, including rotating the switch engagement component about an axis from a first angular position to a second angular position to place the switch in the second state that is distinct from the first state, wherein a difference between the first angular position and the second angular position is at least 55 degrees.

14. The method of claim 13, wherein:
the switch engagement component has a non-cylindrical shape.

15. The method of claim 13, wherein:
the switch includes a moving part and a non-moving part;
the switch engagement component has one or more protrusions; and
rotating the switch engagement component causes at least one protrusion of the one or more protrusions to come in contact with the moving part of the switch.

16. The method of claim 13, wherein:
the communication circuit sends to the actuator a first signal to rotate the switch engagement component in a clockwise direction; and
the communication circuit sends to the actuator a second signal that is distinct from the first signal to rotate the switch engagement component in a counterclockwise direction.

17. The method of claim 13, wherein:
rotating the switch engagement component in a first direction while the switch is in the first state places the switch in the second state; and
rotating the switch engagement component in a second direction that is opposite to the first direction while the switch is in the second state places the switch in the first state.

18. The method of claim 13, wherein:
the first state corresponds to an off state for the switch; and
the second state corresponds to an on state for the switch.

19. The method of claim 13, including:
mounting the apparatus adjacent to the switch.

20. The method of claim 13, including:
mounting the apparatus removably adjacent to the switch.

21. The method of claim 13, including:
ceasing to rotate the switch engagement component after the switch is placed in the second state.

22. A method, comprising:
at an electronic device having one or more processors and memory:
sending, to an apparatus that is distinct and separate from the electronic device and mounted adjacent to a switch and includes communication circuit, a rotatable switch engagement component, and an actuator electrically coupled with the communication circuit and mechanically coupled with the switch engagement component, one or more instructions to activate the actuator;
whereby:
in response to the one or more instructions to activate the actuator, the apparatus activates the actuator and rotates the switch engagement component; and
rotating the switch engagement component while the switch is in a first state places the switch in a second state that is distinct from the first state, including rotating the switch engagement component about an axis from a first angular position to a second angular position to place the switch in the second state that is distinct from the first state, wherein a difference between the first angular position and the second angular position is at least 55 degrees.

* * * * *